United States Patent [19]
Sasaki et al.

[11] Patent Number: 5,822,077
[45] Date of Patent: Oct. 13, 1998

[54] DETERMINATION UNIT FOR DETERMINING, THROUGH DETECTING INFORMATION ASSOCIATED WITH EXTERNAL OBJECT, WHETHER OR NOT EXTERNAL OBJECT WILL USE FUNCTIONAL APPARATUS OR WHO IS EXTERNAL OBJECT, SO AS TO PROVIDE APPROPRIATE SERVICE

[75] Inventors: Eiichi Sasaki, Sagamihara; Fumio Kishi, Yokohama; Mitsuhisa Kanaya, Tokyo; Yoshinori Arai, Yokohama; Kouji Ichimiya, Yokohama; Kenji Namie, Yokohama, all of Japan

[73] Assignee: Ricoh Company, Ltd., Tokyo, Japan

[21] Appl. No.: 739,734

[22] Filed: Nov. 7, 1996

Related U.S. Application Data

[63] Continuation of Ser. No. 120,219, Sep. 13, 1993, abandoned.

[30] Foreign Application Priority Data

Sep. 14, 1992 [JP] Japan ................................ 4-272436

[51] Int. Cl.⁶ .................................................. H04N 1/21
[52] U.S. Cl. ............................. 358/296; 399/38; 399/85; 395/90; 364/461; 340/435; 340/541; 340/540; 367/93
[58] Field of Search ........................ 399/85, 38; 358/296; 395/81, 82, 90, 93, 22; 364/461; 324/207.23, 207.26; 250/221; 356/375; 73/597; 342/28, 114; 340/435, 436, 903, 540, 541, 556, 557; 367/93, 94

[56] References Cited

U.S. PATENT DOCUMENTS

| | | | |
|---|---|---|---|
| 3,737,902 | 6/1973 | O'Hagan et al. ........................ | 343/9 |
| 3,869,601 | 3/1975 | Metialf ................................ | 235/150.2 |
| 3,939,334 | 2/1976 | Roth et al. ............................ | 364/461 |
| 4,205,313 | 5/1980 | Pense .................................. | 343/5 DP |
| 4,399,431 | 8/1983 | Satomi et al. ........................ | 367/93 X |
| 4,541,080 | 9/1985 | Kodaira ................................ | 367/94 |
| 4,558,321 | 12/1985 | Kago et al. ........................... | 340/904 |
| 4,589,081 | 5/1986 | Massa et al. .......................... | 364/554 |
| 4,621,705 | 11/1986 | Etoh .................................... | 180/169 |
| 4,670,845 | 6/1987 | Etoh .................................... | 364/461 |
| 4,703,429 | 10/1987 | Sakata .................................. | 364/426 |
| 4,706,195 | 11/1987 | Yoshino et al. ....................... | 364/426 |
| 4,733,081 | 3/1988 | Mizukami et al. ..................... | 250/341 |
| 4,800,540 | 1/1989 | Annala ................................. | 367/93 X |
| 5,107,279 | 4/1992 | Yamamoto et al. .................... | 355/202 X |
| 5,165,497 | 11/1992 | Chi ...................................... | 180/169 |
| 5,268,670 | 12/1993 | Brasch et al. ......................... | 340/541 |
| 5,293,097 | 3/1994 | Elwell .................................. | 250/221 X |
| 5,305,390 | 4/1994 | Frey et al. ............................ | 340/556 X |

FOREIGN PATENT DOCUMENTS

| | | | |
|---|---|---|---|
| 62-1279858 | 6/1987 | Japan ................................... | 355/208 |
| 63-261270 | 10/1988 | Japan . | |
| 3-19020 | 1/1991 | Japan . | |
| 3-70020 | 3/1991 | Japan . | |
| 4-97169 | 3/1992 | Japan ................................... | 355/208 |
| 6-66944 | 3/1994 | Japan ................................... | 355/202 |

OTHER PUBLICATIONS

Japanese Publication Robot, written by Yoshiaki Shirai, "An Extra Number of a Magazine Bit", pp. 711–724.

Journal of The Robotics Society of Japan, "Stereo Vision", written by Kokichi Sugihara, vol. I, pp. 30–35, 1983.

*Primary Examiner*—Michael L. Gellner
*Assistant Examiner*—Randy W. Gibson
*Attorney, Agent, or Firm*—Woodcock Washburn Kurtz Mackiewicz & Norris LLP

[57] ABSTRACT

A determination unit is used for a functional apparatus, for determining whether or not an external object will use the functional apparatus. The determining unit comprises a detecting unit, a determining sub-unit, a service providing unit. The detecting unit detects movement of an external object. The determining sub-unit determines, based on the result of the detection by the detection unit, whether or not the external object will use the functional apparatus. The service providing unit provides a service which is appropriate based on the determination performed by the determining sub-unit.

13 Claims, 39 Drawing Sheets

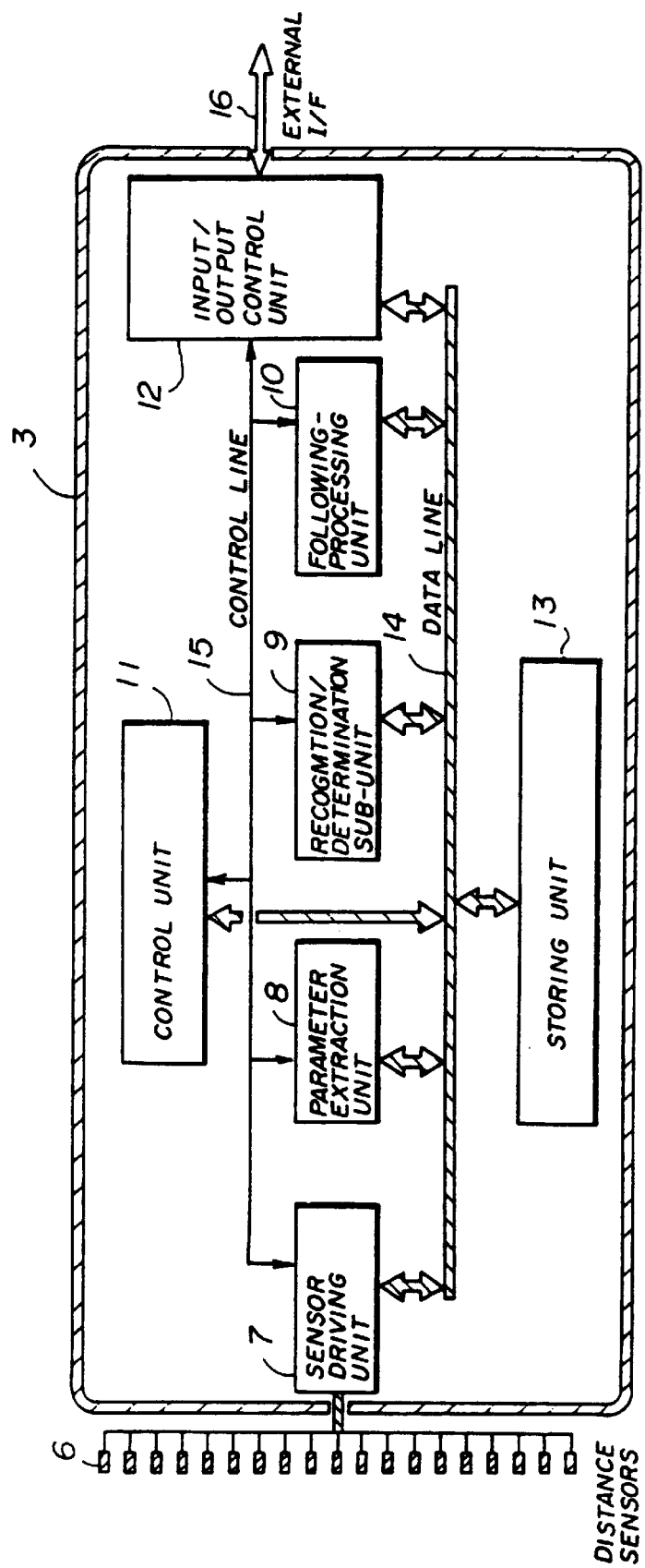

FIG.5

| DIRECTION | ① | ② | ③ | ④ | ⑤ | ⑥ | ⑦ | ⑧ | ⑨ | ⑩ | ⑪ | ⑫ | ⑬ | ⑭ | ⑮ | ⑯ | ⑰ | ⑱ | ⑲ |
|---|---|---|---|---|---|---|---|---|---|---|---|---|---|---|---|---|---|---|---|
| DISTANCE | ∞ | ∞ | ∞ | ∞ | ∞ | ∞ | $r_7$ | $r_8$ | $r_9$ | $r_{10}$ | $r_{11}$ | $r_{12}$ | $r_{13}$ | ∞ | $r_{15}$ | $r_{16}$ | $r_{17}$ | $r_{18}$ | $r_{19}$ |

FIG. 6

| DIRECTION | ① | ② | ③ | ④ | ⑤ | ⑥ | ⑦ | ⑧ | ⑨ | ⑩ | ⑪ | ⑫ | ⑬ | ⑭ | ⑮ | ⑯ | ⑰ | ⑱ | ⑲ |
|---|---|---|---|---|---|---|---|---|---|---|---|---|---|---|---|---|---|---|---|
| DISTANCE | $\Gamma_{1max}$ | $\Gamma_{2max}$ | $\Gamma_{3max}$ | $\Gamma_{4max}$ | $\Gamma_{5max}$ | $\Gamma_{6max}$ | $\Gamma_{7max}$ | $\Gamma_{8max}$ | $\Gamma_{9max}$ | $\Gamma_{10max}$ | $\Gamma_{11max}$ | $\Gamma_{12max}$ | $\Gamma_{13max}$ | $\Gamma_{14max}$ | $\Gamma_{15max}$ | $\Gamma_{16max}$ | $\Gamma_{17max}$ | $\Gamma_{18max}$ | $\Gamma_{19max}$ |

FIG. 7

| DIRECTION | ① | ② | ③ | ④ | ⑤ | ⑥ | ⑦ | ⑧ | ⑨ | ⑩ | ⑪ | ⑫ | ⑬ | ⑭ | ⑮ | ⑯ | ⑰ | ⑱ | ⑲ |
|---|---|---|---|---|---|---|---|---|---|---|---|---|---|---|---|---|---|---|---|
| DISTANCE | ∞ | ∞ | ∞ | ∞ | ∞ | ∞ | $r_7$ | $r_8$ | $r_9$ | $r_{10}$ | $r_{11}$ | $r_{12}$ | $r_{13}$ | ∞ | $r_{15}$ | $r_{16}$ | $r_{17}$ | $r_{18}$ | $r_{19}$ |

FIG.9

| DIRECTION | ① | ② | ③ | ④ | ⑤ | ⑥ | ⑦ | ⑧ | ⑨ | ⑩ | ⑪ | ⑫ | ⑬ | ⑭ | ⑮ | ⑯ | ⑰ | ⑱ | ⑲ |
|---|---|---|---|---|---|---|---|---|---|---|---|---|---|---|---|---|---|---|---|
| DISTANCE | $\infty$ | $\infty$ | $\infty$ | $\infty$ | $r_{510}$ | $\infty$ | $r_{710}$ | $r_{810}$ | $r_{910}$ | $r_{1010}$ | $r_{1110}$ | $r_{1210}$ | $r_{1310}$ | $\infty$ | $r_{1510}$ | $r_{1610}$ | $r_{1710}$ | $r_{1810}$ | $r_{1910}$ |

FIG.10

| DIRECTION | ① | ② | ③ | ④ | ⑤ | ⑥ | ⑦ | ⑧ | ⑨ | ⑩ | ⑪ | ⑫ | ⑬ | ⑭ | ⑮ | ⑯ | ⑰ | ⑱ | ⑲ |
|---|---|---|---|---|---|---|---|---|---|---|---|---|---|---|---|---|---|---|---|
| DISTANCE | 0 | 0 | 0 | 0 | ∞ −r₅₁₀ | 0 | 0 | 0 | 0 | 0 | 0 | 0 | 0 | 0 | 0 | 0 | 0 | 0 | 0 |

FIG.17

| TIME t | DISTANCE r | DIRECTION $\theta$ | MOVING SPEED V | MOVING DIRECTION $\phi$ |
|---|---|---|---|---|
| t0 | $r_5t_0$ | $\theta_5$ | $V_5$ | $\phi_5$ |
| t1 | $r_6t_1$ | $\theta_6$ | $V_6$ | $\phi_6$ |
| t2 | $r_7t_2$ | $\theta_7$ | $V_7$ | $\phi_7$ |
| t3 | $r_8t_3$ | $\theta_8$ | $V_8$ | $\phi_8$ |
| t4 | ⋮ | ⋮ | ⋮ | ⋮ |
| t5 | ⋮ | ⋮ | | |
| t6 | | ⋮ | | |

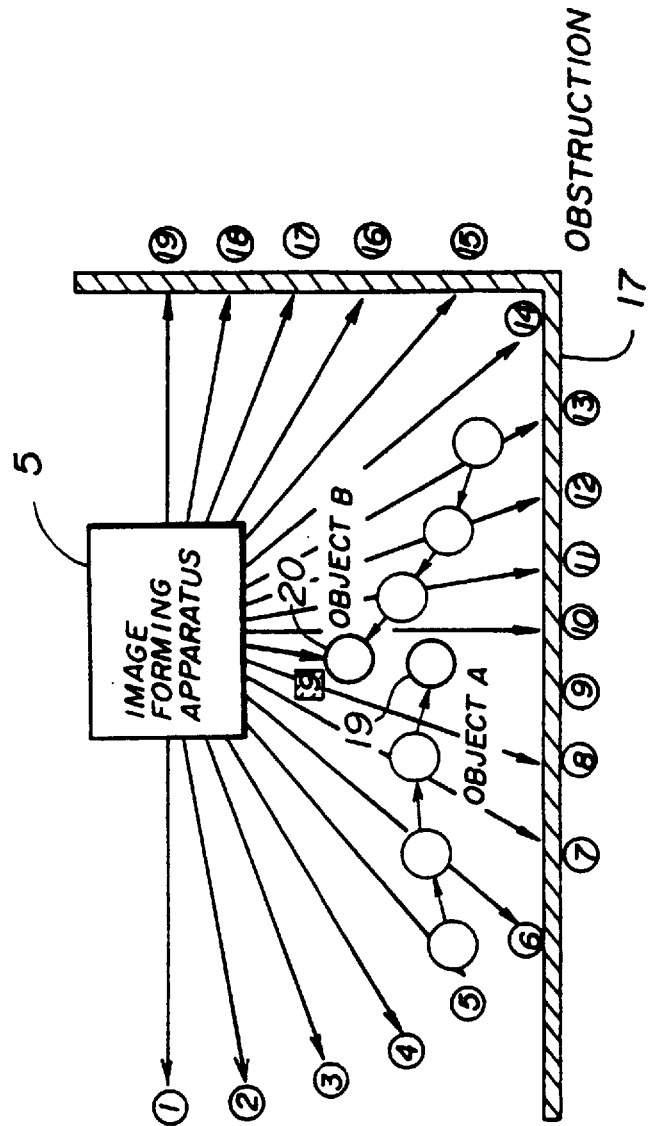

FIG. 25

| DISTANCE r | DIRECTION θ | MOVING SPEED V | MOVING DIRECTION φ | MOVING-SPEED VARIATION AMOUNT ΔV | MOVING-DIRECTION VARIATION AMOUNT Δφ |
|---|---|---|---|---|---|
| L0 | $\theta_{L0}$ | $V_{L0}$ | $\phi_{L0}$ | — | — |
| L1 | $\theta_{L1}$ | $V_{L1}$ | $\phi_{L1}$ | $\Delta V_{L1} = V_{L1} - V_{L0}$ | $\Delta \phi_{L1} = \phi_{L1} - \phi_{L0}$ |
| L2 | $\theta_{L2}$ | $V_{L2}$ | $\phi_{L2}$ | $\Delta V_{L2} = V_{L2} - V_{L1}$ | $\Delta \phi_{L2} = \phi_{L2} - \phi_{L1}$ |
| L3 | $\theta_{L3}$ | $V_{L3}$ | $\phi_{L3}$ | $\Delta V_{L3} = V_{L3} - V_{L2}$ | $\Delta \phi_{L3} = \phi_{L3} - \phi_{L2}$ |
| L4 | ⋮ | ⋮ | ⋮ | ⋮ | ⋮ |
| L5 | ⋮ | | | | |
| ⋮ | ⋮ | ⋮ | ⋮ | ⋮ | ⋮ |
| L(n-2) | $\theta_{L(n-2)}$ | $V_{L(n-2)}$ | $\phi_{L(n-2)}$ | $\Delta V_{L(n-2)} = V_{L(n-2)} - V_{L(n-3)}$ | $\Delta \phi_{L(n-2)} = \phi_{L(n-2)} - \phi_{L(n-3)}$ |
| L(n-3) | $\theta_{L(n-1)}$ | $V_{L(n-1)}$ | $\phi_{L(n-1)}$ | $\Delta V_{L(n-1)} = V_{L(n-1)} - V_{L(n-2)}$ | $\Delta \phi_{L(n-1)} = \phi_{L(n-1)} - \phi_{L(n-2)}$ |

DETERMINATION UNIT FOR DETERMINING, THROUGH DETECTING INFORMATION ASSOCIATED WITH EXTERNAL OBJECT, WHETHER OR NOT EXTERNAL OBJECT WILL USE FUNCTIONAL APPARATUS OR WHO IS EXTERNAL OBJECT, SO AS TO PROVIDE APPROPRIATE SERVICE

This is a continuation, of application Ser. No. 08/120,219, filed Sep. 13, 1993, now abandoned.

BACKGROUND OF THE INVENTION

The present invention relates to a determination unit, used for a functional apparatus, for determining whether or not an external object will use the functional apparatus, or who is the external object. The functional apparatus comprises, for example, an image forming apparatus such as a duplicator, facsimile apparatus, or printer.

The term external object herein means an object located outside of the functional apparatus. Further, the external object may use or operate the functional apparatus. Thus, in many cases, the external object comprises a user (human being) of the functional apparatus.

Recently, to improve user convenience in using the functional apparatus, automating of the functional apparatus has been realized to a higher degree. For accomplishing such a higher-degree automating, existence and/or movement of a user of the functional apparatus may be detected. In particular, a user's approach and/or departure from the functional apparatus may be detected. Then, a service may be provided by the functional apparatus according to the result of the detection.

Examples for such automation are described below. A door may be opened and closed automatically as a result of detecting a person's approach. A kind of a cash dispenser may automatically switch to a power on state or to a power off state a display screen comprising a liquid crystal device (it will be abbreviated as LCD hereinafter) in an input/display unit provided therein. Such cash dispenser may be provided in a bank and the automatic power switching on/off will be executed as a result of detection of an user's approach thereto.

An image forming apparatus is devised which utilizes such automatic power on/off switching, in which image forming apparatus, power is automatically switched on or off to a display screen comprising an LCD in an input/display unit provided therein. Further, a similar function is also utilized in an image fixing mechanism provided therein. In the image fixing mechanism, an objective image having been represented on a sheet (of paper) by means of toner is then fixed by means of heat. The unit for fixing the toner image comprises a roller having a heater therein.

The heater is controlled so that a temperature of the roller of the fixing unit is at a first temperature when the image forming apparatus is not being used and the temperature of the roller is at a second temperature when the image forming apparatus will be used. The first temperature is lower than the second temperature. The first temperature is one for pre-heating the fixing unit and the second temperature is enabling one for the above-mentioned fixing operation performed by the fixing unit. The determination as to whether or not the image forming apparatus is not used or will be used is executed based on the detection of the existence of a user approaching the image forming apparatus. That is, when the user's existence is detected, it is determined that the user will use the image forming apparatus soon, whereas the image forming apparatus is not to be used when no user's existence is detected. Such a function is called auto-pre-heating function.

A non-automatic pre-heating function itself has been widely used. However, such a non-automatic function is such that whether a pre-heating is executed or a main-heating is started is selected by means of the user's manual input. In the image forming apparatus in the related art, the auto-pre-heating function immediately detects a user's approach the image forming apparatus. Thus, before the user reaches the image forming apparatus, the mode of the fixing unit has been changed from the pre-heating mode to the main heating condition. Thus, the user may use the image forming apparatus sooner than if the user himself or herself had changed the mode of the fixing unit.

There, the above-mentioned pre-heating mode includes the following conditions: no power is supplied to the input/display unit (LCD); and the temperature of the fixing unit is lower than the temperature necessary for fixing the objective image. Further, the above-mentioned main-heating mode (in other words, the mode where the pre-heating mode has been canceled) includes the following conditions: power is supplied to the input/display unit; and the temperature of the fixing unit is the temperature necessary for fixing the objective image. In this image forming apparatus in the related art, switching operation of main power for driving the image forming apparatus, is executed through a manual switching by a user. In this switching, a main power switch provided on the image forming apparatus is operated by the user.

A problem occurring in such an image forming apparatus in the related art will now be described. In many case where such an image forming apparatus is used, people move in the vicinity of the image forming apparatus, in the course of their work, while not intending to use the image forming apparatus. Such near-by movement may cause mal-operation of such an auto-pre-heating function provided in the image forming apparatus. This is because, the auto-pre-heating function in the related art automatically changes the mode from a pre-heating mode to a main heating mode as mentioned above. This mode change is executed at any occasion a human-being detecting system included in the pre-heating function detects existence of a human being within a predetermined area associated with the image forming apparatus for a predetermined time. Further, this auto-pre-heating function automatically changes the mode from the main heating mode to the pre-heating mode such as mentioned above. This mode change is executed when the human-being detecting system detects an absence of a human being within the predetermined area for a predetermined time.

Thus, a person who has no intention to use the image forming apparatus but is present within the predetermined area for the predetermined time for another purpose automatically causes the auto-pre-heating function to change mode. If such a case occurs frequently, the original purposes of the auto-pre-heating function is defeated. The original purposes include improving durability of the input/display unit, that is, the durability of the LCD by reducing the time during which power is supplied thereto. The original purposes also include saving energy consumed in the fixing unit for heating it as mentioned above. This purpose is achieved by reducing the time for which the fixing unit is heated at the higher temperature necessary for fixing the objective image. Such time reduction may be realized by the relevant power being appropriately controlled when the image forming apparatus is not in use.

The auto-pre-heating function in the related art also includes a function in which various image forming specifications are forced to become their initial values when the pre-heating mode becomes effective. That is, certain specifications from among the various image forming specifications set as a result of particular input by a user are canceled. The various image forming specifications include, for example, a number of hard copies to be made for each draft, manner in which size of a draft is to be varied, a manner in which an orientation of a draft is varied, and/or a manner in which a density of a draft image is to be varied. The initial specifications are, in other words, default specifications respectively predetermined for the image forming apparatus. Such a function is called auto-reset function.

Such an auto-reset function acts when the pre-heating mode becomes effective as mentioned above. This may cause a problem as follows. An user having set various image forming specifications such as mentioned above, may temporarily recede from the image forming apparatus, as necessary, even when the user has not yet completed the using the image forming apparatus. In this case, if the user recedes from the above-mentioned predetermined area for the predetermined time, undesirably, the pre-heating mode becomes effective. This condition causes the pre-heating mode to become effective, the various image forming specifications set thus being canceled. Therefore, the user must input again the same various image forming specifications on the image forming apparatus. This condition is inconvenient of the user.

Further, a manual main-power ON/OFF switch on the image forming apparatus is troublesome for a user; particularly it is inconvenient where frequent main-power ON/OFF switching is needed so as to save energy.

SUMMARY OF THE INVENTION

An object of the present invention is to provide a determination unit and an image forming apparatus each of which determines whether or not there is a person approaching so as to use the image forming apparatus, from among a plurality of persons approaching the image forming apparatus. If it is determined that a person is present who will use the image forming apparatus, an operation mode is automatically changed from a pre-heating mode to a main heating mode as mentioned above. As a result, energy is saved or power consumption therein is reduced; and durability of an input/display unit such as mentioned above can be improved so as to maintain the original purposes of the pre-heating function; and convenience to the user can be improved.

Another object of the present invention is to provide a determination unit and an image forming apparatus each of which determines whether or not there is a person who is using (that is, has not yet finished using) the image forming apparatus, from among plurality of persons receding from the image forming apparatus. If it is determined that there is a person using the image forming apparatus even though the person recedes from the image apparatus, an operation mode is not automatically changed from a pre-heating mode to a main heating mode such as mentioned above. As a result, convenience to the user can be improved therefor.

Another object of the present invention is to provide a determination unit and an image forming apparatus each of which determines whether or not there is a person approaching the image forming apparatus so as to make use thereof, from among plurality of persons approaching the image forming apparatus. It is also determined whether or not there is a person who is receding from the image forming apparatus because the person has completed using the image forming apparatus. If it is determined that there is a person who will use the image forming apparatus, it automatically switches power be switched on in the image forming apparatus. If it is determined that there is a person who has completed using the image forming apparatus, power is, automatically switched off in the image forming apparatus. As a result, convenience to the user can be improved.

Various aspects of the present invention will now be described with respective identification numbers.

(1) To achieve the objects of the present invention, a determination unit according to the present invention, used for a functional apparatus, for determining whether or not an external object will use the functional apparatus, comprises:

detecting means for detecting movement of an external object;

determining means for determining, based on the detecting result, whether or not the external object will use the functional apparatus; and service providing means for providing an appropriate service based on the determination performed by the determining means;

wherein:

the functional apparatus has an input/display unit for inputting to the functional apparatus specifications concerning usage by an external object of the functional apparatus wherein the input/display unit is also for displaying information associated with the functional apparatus; and wherein if the determining means determines that an external object will use the functional unit, then the service providing means changes, prior to the external object reaching the functional apparatus, a condition of the input/display unit from a no-input condition to a input condition, wherein an external object can input specification concerning usage of the functional apparatus through the input/display unit in the input condition and an external object cannot input specifications concerning usage of the functional apparatus through the input/display unit in the no-input condition.

By this construction, it is possible to determine whether or not there is a person who approaches so as to use the image forming apparatus, among plurality of persons approaching the image forming apparatus. If it is determined that there is a person who will use the image forming apparatus, an operation mode is automatically changed from a pre-heating mode (no-input condition or power off the relevant LCD in the input/display unit) to a main heating mode (input condition or power on the LCD in the input/display unit) such as mentioned above. As a result, energy is saved or power consumption in the apparatus can be reduced; and durability of an input/display unit such as mentioned above can be improved, so as to maintain the original purposes of the pre-heating function; and convenience to the user can be improved.

(2) The determination unit further comprises a moving-manner determination means for determining a moving manner of the external object which has been determined as one that will use the functional apparatus. The service providing means controls a time when the condition of the input/display unit is so changed, based on the result of the determination by the movement-manner determination means.

By this construction, it is possible to appropriately change the condition of the input/display unit prior to the external object reaching the functional apparatus with certainty. Thus a more sure and convenient changing operation of the input/display unit can be realized.

(3) The determination unit further comprises manual condition changing means for manually changing the condition of the input/display unit to and from the relevant conditions. The service providing means inhibits this manual changing operation through the manual condition changing means for a predetermined time from the time the service providing means has so changed the condition of the input/display unit.

By this construction, mal-operation is prevented in which mal-operation an external object changes the condition of the input/display unit from the main heating condition to the pre-heating condition through the manual condition changing means even though the service providing means has recently changed the condition from the pre-heating condition to the main heating condition.

(4) In the determination unit described in the above item (1):

the determining means may determine that an external object has finished using the functional unit, then the service providing means changes a condition of the input/display unit from an input condition to a no-input condition, wherein an external object can input specifications concerning usage of the functional apparatus through the input/display unit in the input condition whereas an external object cannot input specification concerning usage of the functional apparatus through the input/display unit in the no-input condition.

By this construction, it is possible to determine whether or not there is a person, from among persons receding from the functional apparatus, who is still using the functional apparatus, that is, who has not yet completed the using thereof. If it is determined that there is a person who is still using the functional apparatus, change from the main heating condition to the pre-heating condition is prevented. As a result, more convenient operation performed on the functional apparatus can be realized.

(5) The determination unit according to the present invention, used for a functional apparatus, for determining whether or not an external object will use the functional apparatus comprises:

detecting means for detecting movement of an external object;

determining means for determining, based on the detecting result, whether or not the external object will use the functional apparatus; and service providing means for providing an appropriate service based on the determination performed by the determining means;

wherein:

the functional apparatus, comprising the image forming apparatus, has a fixing unit for fixing an objective image on a recording sheet, the objective image having been previously represented thereon; and wherein the determining means may determine that an external object will use the functional unit, the service providing means then changing, prior to the external object reaching the functional apparatus, a condition of the fixing unit from a non-fixing condition (a first temperature) to a fixing condition (a second temperature), wherein the functional apparatus can fix an objective image on a recording sheet through the fixing unit in the fixing condition whereas the functional apparatus cannot fix an objective image on a recording sheet through the fixing unit in the non-fixing condition.

By this construction, it is possible to determine whether or not there is a person who approaches so as to use the image forming apparatus, from among a plurality of persons approaching the image forming apparatus. If it is determined that there is a person who will use the image forming apparatus, an operation mode is automatically changed from a pre-heating mode (non-fixing condition in the fixing unit) to a main heating mode (fixing condition in the fixing unit) such as mentioned above. As a result, energy is saved or power consumption in the apparatus can be reduced; and durability of an input/display unit such as mentioned above can be improved, so as to maintain the original purposes of the pre-heating function; and convenience to the user can be improved.

(6) The determination unit further comprises a moving-manner determination means for determining a moving manner of the external object which has been determined as one that will use the functional apparatus. The service providing means controls a time when the condition of the fixing unit is changed, based on the result of the determination by the movement-manner determination means.

By this construction, it is possible to change the condition of the fixing unit prior to the external object reaching the functional apparatus, with certainty. Thus a more sure and convenient changing operation of the fixing unit can be realized.

(7) The determination unit further comprises manual condition changing means for manually so changing the condition of the fixing unit from and to the relevant conditions. The service providing means inhibits this manual changing operation through the manual condition changing means for a predetermined time starting from the time the service providing means recently changed the condition of the fixing unit.

By this construction, mal-operation is prevented in which mal-operation an external object changes the condition of the fixing unit from the main heating condition to the pre-heating condition through the manual condition changing means even though the service providing means has recently changed the condition from the pre-heating condition to the main heating condition.

(8) In the determination unit described in the above item (5):

the determining means may determine that an external object has finished using the functional unit, the service providing means then changing a condition of the fixing unit from an fixing condition to a non-fixing condition, wherein an external object can input specification concerning usage of the functional apparatus through the fixing unit in the input condition whereas an external object cannot input specifications concerning usage of the functional apparatus through the fixing unit in the non-fixing condition.

By this construction, it is possible to determine whether or not there is a person who is still using the functional apparatus, that is, who has not finished the using thereof, from among persons receding from the functional apparatus. If it is determined that there is a person who is still using the functional apparatus, change from the main heating condition to the pre-heating condition is prevented. As a result, a more convenient operation of the functional apparatus can be realized.

(9) Further in the construction in the above item (8): a third temperature is preset, which temperature is further lower than the first temperature, which first temperature cannot enable the fixing operation. Further, the detecting means detects whether an external object exists in a first area or in a second area, or exists neither in the first area nor in the second area. A distance between the second area and the functional apparatus being shorter than a distance between the first area and the functional apparatus. When the detecting means detects an external object neither in the first area nor in the second area, the service providing means makes the temperature of the fixing unit become the third temperature. When the detecting means detects an external object in the first area, the service providing means makes the temperature of the fixing unit become change to the first temperature from the third temperature. When the detecting means detects an external object in the second area, the service providing means makes the temperature of the fixing unit change to the second temperature from the first temperature.

By this construction, a stepwise temperature control based on the external object's degree of nearness is realized. Thus, convenience in using the functional apparatus and reduction of power consumption are realized as compared to apparatus of previous technology.

(10) Further in the construction in the above item (8): a third temperature is preset, which temperature is further lower than the first temperature which cannot enable the fixing operation. Further, the detecting means detects whether an external object exists in a first area or in a second area, or exists neither in the first area nor in the second area. A distance between the second area and the functional apparatus being shorter than a distance between the first area and the functional apparatus. When the detecting means detects an external object in the second area, the service providing means makes the temperature of the fixing unit be the second temperature. When the detecting means detects an external object in the first area, the service providing means makes the temperature of the fixing unit change to the first temperature from the second temperature. When the detecting means detects an external object neither in the first area nor in the second area, the service providing means makes the temperature of the fixing unit change to the third temperature.

By this construction, a stepwise temperature control based on the external object's degree of nearness is realized. Thus, convenience in using the functional apparatus and reduction of power consumption are realized as compared to previous technology.

(11) In the construction in the above item (10), the service providing means further stores or saves information concerning an image forming specifications such as mentioned above, the specification having been set by the external object. This storing is executed within a predetermined time period starting from the time the external object recedes from the second area.

By this construction, when the external object (user) comes back to the functional apparatus after receding therefrom, it is not necessary to again set the same image forming specification on the functional apparatus. Rather, the returning user may use the functional apparatus under the same specification. Thus, operation efficiency and convenience can be improved in the functional apparatus.

(12) In the construction of the above item (11): the service providing means further cancels the stored specifications when the detecting means does not detect the external object within the second area or at a time after a predetermined time elapses without the detecting means detecting the external object within the second area.

By this construction, the image forming specifications set by the first person, which specifications are not necessary for a second person, is canceled when a second person comes to the functional apparatus after the first person recedes from the second area. Thus, it is prevented that the second person uses the functional apparatus in the unnecessary specifications previously entered.

(13) In the construction in the above item (11), the service providing means further executes the following operations. The person may be again detected by the detecting means in the second area within a predetermined time from the time the person who last used the functional apparatus was not detected in the second area by the detecting means. In this case, the service providing means resets the second temperature in the fixing unit and also resets the stored image forming specification in the input/display unit.

By this construction, better efficiency in using the functional apparatus is obtained.

(14) In the construction in the above item (10), the service providing means further executes the following operations. When, a certain trouble occurs in the functional apparatus, resulting in un-usableness of the functional apparatus, the service providing means makes the temperature of the fixing unit change from the second temperature to the third temperature. Then, after the trouble has been eliminated, the service providing means makes the temperature of the fixing unit change from the third temperature to the second temperature.

By this construction, power consumption can be appropriately controlled as a result of the third temperature, that is the lower one between the two pre-heating temperatures (the first and third temperatures), being set in the fixing unit when such a trouble occurs. Trouble such as above mentioned, comprises, for example, a paper jam, exhausting the paper supply, or exhausting the toner supply.

(15) A determination unit according to the present invention, used for a functional apparatus, for determining whether or not an external object will use the functional apparatus, the determining unit comprising:

detecting means for detecting a movement of an external object;

determining means for determining, based on the detecting result, whether or not there is an external object that will use the functional apparatus; and service providing means for automatically switching power on in the functional apparatus when the determining means determines that the external object (person) will soon use the functional apparatus.

By this construction, the determination unit can determine whether or not there is a person approaching the functional apparatus so as to use it, from among persons approaching the functional apparatus. If the determination unit determines a person approaching will use the functional apparatus, power is automatically switched on in the functional apparatus. Thus, better efficiency and convenience can be obtained in the functional apparatus. (16) In the determination unit described in the above item (15):

the determining means may determine that a person has finished using the functional unit, the service providing means then automatically switching power off in the functional apparatus.

By this construction, if the determination unit determines there is a person, who has finished the using the functional apparatus, from among persons receding from the functional apparatus, power is automatically switched off in the functional apparatus. Thus, better efficiency and convenience can be obtained in the functional apparatus.

(17) In addition to the construction in the above item (15), a moving-manner determining means such as mentioned above is provided. There, the service providing means adjusts a time when power is to be switched on in the functional apparatus, based on the determined movement manner (for example, moving speed) of the approaching person who will use the functional apparatus.

By this construction, power can be surely switched on before the user reaches the functional apparatus. Thus, better reliability and convenience are realized in the functional apparatus.

Other objects and further features of the present invention will become more apparent from the following detailed description when read in conjunction with the accompanying drawings.

BRIEF DESCRIPTION OF THE DRAWINGS

FIG. 3 shows a principle block diagram of a recognition/determination unit shown in FIG. 1;

FIG. 5 shows a table representing the relationship between the image forming apparatus and the obstruction;

FIG. 6 shows an example of circumstance information associated with the image forming apparatus;

FIG. 7 shows circumstance information according to the relationship shown in FIG. 4;

FIG. 9 shows distance data in a condition as a result of variation shown in FIG. 8;

FIG. 10 shows a difference between the original circumstance information shown in FIG. 7 and the distance data shown in FIG. 9;

FIG. 17 shows a concept of moving-trajectory information associated with a moving object;

FIGS. 18, 19, 20A, 20B, 21, 22A and 22B respectively show variations in circumstance information:

FIG. 25 shows a concept of parameters generated for each distance in the example shown in FIG. 24:

DESCRIPTION OF THE PREFERRED EMBODIMENTS

A principle of an automatic response system of one embodiment according to the present invention will now be described with reference to FIG. 1.

Figure 1:
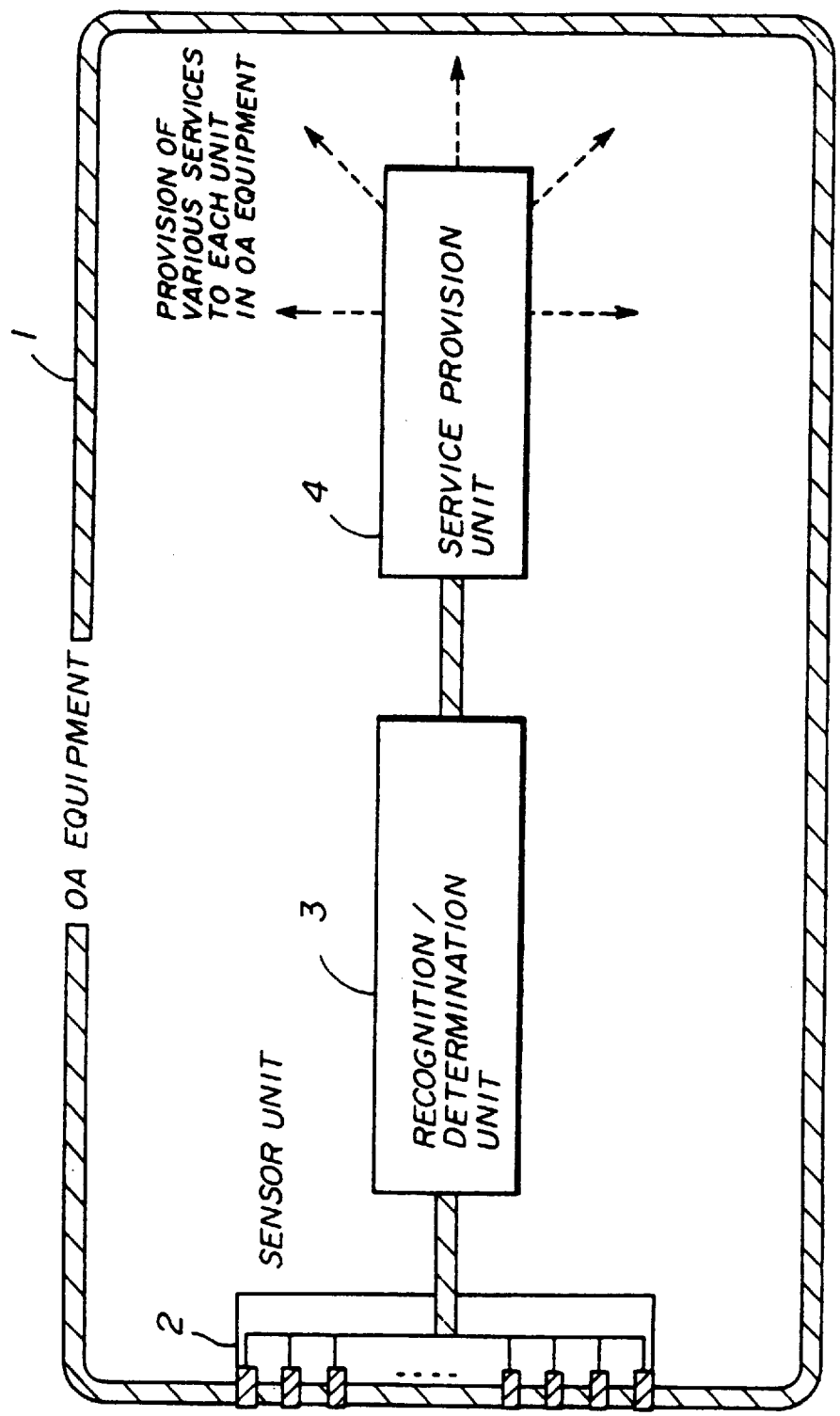
FIG. 1 shows a constructional principle of an automatic response system according to the present invention, which system is applied in an Office Automation (abbreviated OA hereinafter) equipment.

In FIG. 1, the automatic response system is applied in an OA equipment. In FIG. 1, the automatic response system comprises a sensor unit 2 comprising at least one sensor, a recognition/determination unit 3 and a service provision unit 4. This automatic response system may be provided in various OA equipments 1 so as to realize automatic response functions. Each of automatic response functions is such that the automatic response system provides various service as a result of appropriately responding as described below and it does not need an active operation to be performed thereon by a user of the OA equipment 1.

The sensor unit 2 is mounted on the surface or inside of the OA equipment 1 so as to generate various data for recognition of an object (for example, an approaching person). Such an object causes an automatic response action in the automatic response system. The sensor unit 2 sends the generated data to the recognition/determination unit 3. The kinds of sensors provided, the positions where the sensors are mounted and the number of sensors mounted are appropriately determined depending on conditions including: parameters to be obtained using data sent from the sensors; directions from the OA equipment 1 in which directions the sensors are effective (for example, the direction may be a direction in which an operation panel of the OA equipment 1 faces, that is, a direction in which the front surface of the OA equipment faces); dimensions (width, height) of an object to which the automatic response system is to respond; and/or detecting accuracy (resolution, detecting time-period or time-interval or detecting frequency) of the sensors.

An image forming apparatus 5 of one embodiment according to the present invention will now be described with reference to FIGS. 2A and 2B. This image forming apparatus 5 acts as the above-mentioned OA equipment and includes the above-mentioned automatic response system therein. This image forming apparatus 5 may comprise, for example, a facsimile apparatus, a duplicator, or a laser-beam printer. A sensor unit comprising a plurality of sensors 6 are mounted in the image forming apparatus 5. FIG. 2A shows an entire perspective view of the image forming apparatus 5, and FIG. 2B shows a top view of the image forming apparatus 5.

Figure 2B:
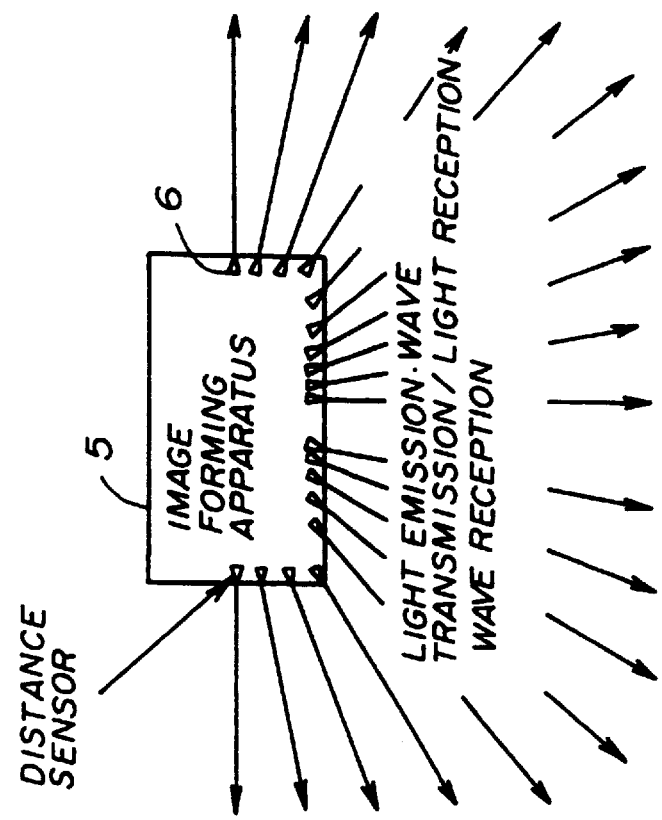
FIGS. 2A and 2B show an example of an image forming apparatus, according to the present invention, in which sensors are used.
Figure 2A:
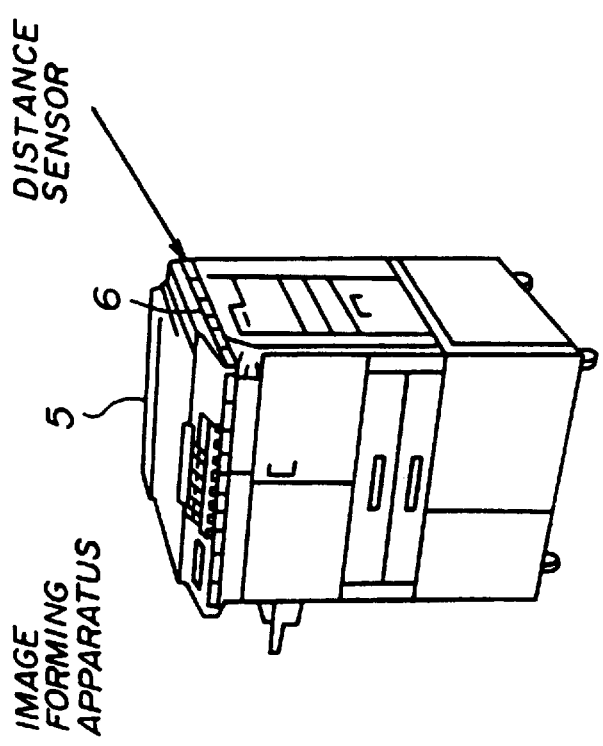

In the example of FIGS. 2A and 2B, an object to which the automatic response system is to respond comprises a person (who may operate the image forming apparatus 5). Further, data to be obtained through the sensors 6 comprises a distance between the image forming apparatus 5 and the objective person. Directions relevant to which the data is obtained through the sensors 6 comprise a direction in which the front face of the image forming apparatus 5 faces and a direction in which the sides of the image forming apparatus 5 respectively face.

Further, a direction from the image forming apparatus 5 in which direction an objective person is detected is also obtained through the sensors 6. For this purpose, relatively sharp directivity is required of the sensors 6 which may comprise distance sensors respectively measuring distances in a plurality of directions. A kind of a sensor useful for this purpose may comprise, for example, a sensor for emitting infrared rays, from an emitting portion thereof, in an objective direction. Such a sensor receives and then measures the light quantity reflected by the object with a receiving portion thereof. Another kind of a sensor also useful for the above-mentioned purpose emits supersonic waves from a wave-transmitting portion thereof. This sensor then receives, with a wave receiver thereof, waves reflected by the object and then measures the phase difference so as to derive the corresponding distance. Other kinds of sensors having substantially the same functions may be also used for the same purpose.

In the example of FIGS. 2A and 2B, the plurality of sensors 6 are provided for obtaining high-resolution data in a relatively short time period. For this purpose, the respective distance sensors 6 measure distances in parallel. In order to obtain data concerning a direction of the object from the image forming apparatus 5, the respective sensors 6 are mounted as follows. The respective sensors 6 have directions of light-emission or wave-transmission/light-reception or wave-reception differing slightly from one another by a 10 degree pitch each.

In this sensing, data concerning a direction of the object is not needed, which direction may vary along a vertically extending imaginary plane. That is, data concerning a body height of the objective person is not needed. Thus, these directions respectively associated with the sensors 6 are arranged along a horizontally extending imaginary plane.

The sensor unit may comprise, instead of such distance sensors, an image inputting device comprising a CCD (Charge Coupled Device). In this case, image data obtained through the image inputting device is sent to the recognition/determination unit 3 shown in FIG. 1.

In FIG. 1, the recognition/determination unit 3 may be either provided inside of or externally connected to the OA equipment 1. The recognition/determination unit 3 recognizes, and makes determinations as to the object using data sent from the sensor unit 2. In the example of FIGS. 2A and 2B, data obtained through the sensors 6, such as a distance between the object and the image forming apparatus 5 and a direction in which the object can be viewed from the image forming apparatus 5 is used as follows. The recognition/determination unit 3 recognizes a stationary object and a moving object to which the automatic response system is to respond. Further, the recognition/determination unit 3 determines (or predicts) whether the objective person will use the OA equipment 1, or whether he or she has already finished using of the OA equipment 1. Such determination is called action determination.

In the case where the sensor unit 2 comprises an image inputting device as mentioned above, the recognition/determination unit 3 extracts characteristics of the object (person) from the relevant image data. As a result, personal identification is carried out using the extracted characteristics. In the personal identification, using pre-registered personal data concerning many persons, one person, from among the registered persons, is determined to be the objective person. As a result, the recognition/determination unit 3 sends to a service provision unit 4 the following information concerning the identified person: for example, the name, identification number.

The service provision unit 4 has functions for driving various portions in the OA equipment 1 so as to provide services resulting from various automatic response functions. In one example for such services resulting from various automatic response functions, the following operation is performed. In the case where an object to which the automatic response system is to respond approaches the OA equipment 1, the recognition/determination unit 3 may determine that this approaching object will use the OA equipment, and send information concerning this determination to the service provision unit 4. As a result, the service provision unit 4 automatically cancels a pre-heating mode or removes a pre-heating condition such as mentioned above so as to prepare for usage thereof by initiating a main heating mode or by enabling a main heating condition.

Alternatively, if the recognition/determination unit 3 sends information concerning determination according to which using of the OA equipment has finished, the following operation is carried out. The service provision unit 4 initiates the pre-heating mode.

In the case where a personal identification data concerning the approaching object is sent from the recognition/determination unit 3 as mentioned above, the following operation is carried out. An environment which is associated with use of the OA equipment 1 and which is optimum to the identified person is activated in the OA equipment 1. That is, for example, an input/display unit which is provided with the OA equipment 1 is automatically transformed to an optimum form. This transformation may comprise transformation of key layout therein and/or a representation on a display screen thereof.

A particular hardware may be provided for this service provision unit 4 but it may be also possible to incorporate the functions of the service provision unit 4 in the central processing unit of the conventional OA equipment by modifying the software thereof.

A principle of the recognition/determination unit 3 will now be described with reference to FIG. 3. In this description, one example is described in which the OA equipment 1 incorporating the automatic response system comprises an image forming apparatus such as mentioned above. Further, in this example, the sensor unit 2 sending detecting data to the recognition/determination unit 3 comprises, as shown in FIGS. 2A and 2B, a plurality of distance sensors having strong directivity. These distance sensors are mounted so that directions of light-emission or wave-transmission/light-reception or wave-reception therein are arranged along a horizontally extending imaginary plane.

The recognition/determination unit 3 in FIG. 3 comprises a sensor driving unit 7, a parameter extraction unit 8, a recognition/determination sub-unit 9, a following unit 10, a control unit 11, an input/output control unit 12, a storing unit 13, a data line 14, a control line 15, an external I/F (interface) line 16.

The sensor driving unit 7 drives the distance sensors 6 and then receives distance data obtained through measurement by means of the sensors 6. In this driving, the sensor driving unit 7 makes the respective sensors 6 measure distances from the to the sensors to an object, in a sampling manner according to a sampling signal provided by the control unit 11. As a result, the obtained data is sent to the parameter extraction unit 8.

The parameter extraction unit 8 then generates characteristic-quantity parameters needed for recognition of an object to which the automatic response system is to respond and for various determinations described below. This generation is executed using the distance data sent from the sensor driving unit 7. The parameter extraction unit 8 then sends the generated parameters and associated information to the recognition/determination sub-unit 9, which are also appropriately written in the storing unit 13. This stored data may be read by another unit from among the units in the recognition/determination unit 3 described above.

The recognition/determination sub-unit 9, in response to a request signal provided by the control unit 11, makes determinations as to an object to which the automatic response system is to respond. In these determinations, the recognition/determination sub-unit 9 uses parameters generated by the parameter extraction unit 8 transferred to the sub-unit 9 directly from the unit 8 or via the storing unit 13. This determination may comprise, for example, determination as to whether or not an object to which the automatic response system is to respond is to be a user of the OA equipment 1 (that is, whether or not the object will use the image forming apparatus). This determination may comprise, for example, determination as to whether or not an object to which the automatic response system is to respond has finished using the OA equipment 1 (that is, whether the object is using the image forming apparatus or has finished his or her use thereof).

The following-processing unit 10 receives the determination results and processes them so as to convert them to a form for providing outside the OA. One example of processing executed by the unit 10 is a process required for the case where there exist a plurality of objects to which the automatic response system is to respond.

A control unit 11 controls the entire recognition/determination unit 3. The unit 11 carries out a communication with the outside (that is, with the other parts of the image forming apparatus 5) via the input/output control unit 12. The unit 11 controls each block in the recognition/determination unit 3 by sending a control signal thereto.

The input/output control unit 12 carries out interface with the above-mentioned outside via the external I/F line 16. The unit 12 also acts as a buffer for performing synchronization with the outside. The signals to be input/output under the control of the unit 12 include not only the determination data generated by the following-processing unit 10, which are consequently sent to the service provision unit 4, but these include also a control signals such as various request signals, timing signals transferred between the recognition/determination unit 3 and the other parts in the image forming apparatus 5.

The storing unit 13 comprises a RAM (Random Access Memory) and a ROM (Read Only Memory). The RAM stores data generated by each block in the recognition/determination unit 3 as occasion demands. The ROM stores programs and data necessary for driving each block. The information stored in the storing unit 13 is read by each block and/or each block writes information therein.

The data line 14 is used for each data transfer.

The control line 15 is used for control-signal transfer.

The external I/F line 16 is used for transferring a control signal for interface with the outside (the other parts in the image forming apparatus 5) and used for transferring data.

The sensor driving unit 7 will now be described.

The sensor driving unit 7 drives sensors 6 according to a sampling signal sent from the control unit 11 via the control line 15 and having a sampling time period T. This period T should be so short as to follow, by sampling sequential distances to an object, a movement of the object to which the automatic response system is to respond. Each distance sensor 6 is driven simultaneously (in parallel) with each other. Then, each sensor 6 carries out one distance measurement for each sampling period T. The measurement data is then converted from analog data to digital data. Then the converted measurement data is sent to the parameter extraction unit 8. In the sending, the sent signal has a form so that each part of data in the measurement signal can be identified. One example for achieving such identification is to provide an identification number for each part of data.

Figure 4:
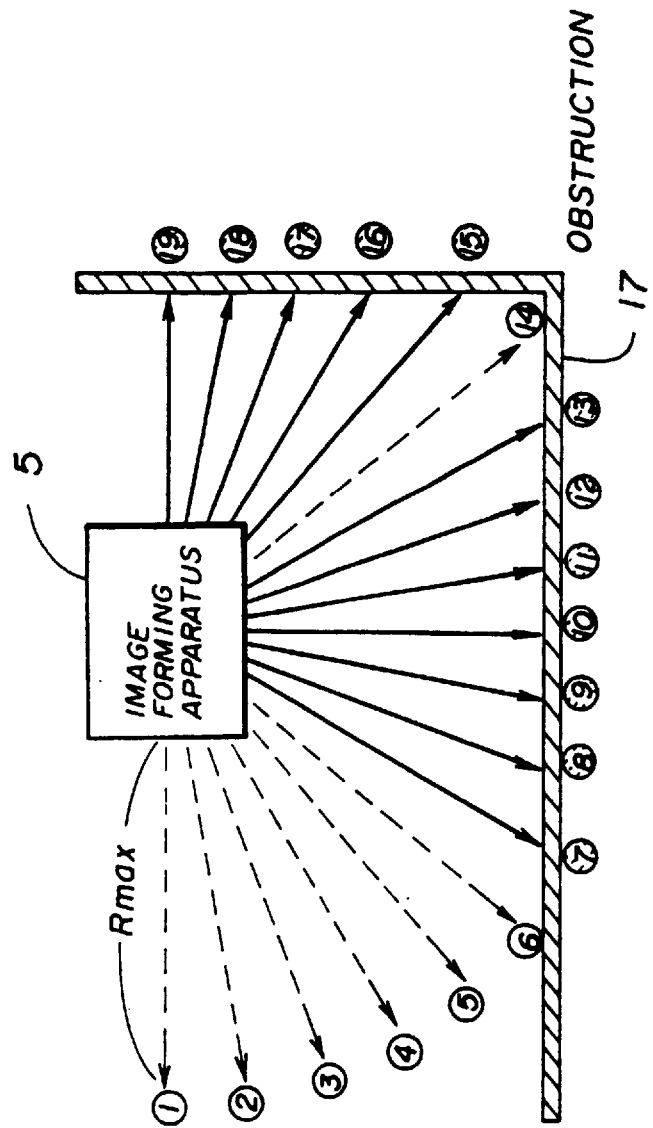
FIG. 4 shows a relationship between the image forming apparatus shown in FIGS. 2A and 2B and an obstruction described below.

The parameter extraction unit 8 will now be described. The parameter extraction unit 8 extracts, from the distance data sent from the sensor driving unit 7, parameters necessary for recognizing various relevant information. Each distance sensor 6 is mounted on the image forming apparatus 5 so that distance measurements will be carried out therethrough for directions such as shown in FIG. 4. In FIG. 4, each direction refers to an encircled number shown in FIG. 4. These 19 numbers, 1, 2, 3, 4, 5, 6, 7, 8, 9, 10, 11, 12, 13, 14, 15, 16, 17, 18 and 19 will be respectively referred to as #1 to #19 in the specification. These 19 directions are arranged so as to provide a 10 degree difference between the adjacent directions using to the image forming apparatus 5 as the origin of the directions (arrows). In this arrangement, the directions are directions facing the front and the side directions of the image forming apparatus 5 as shown in FIG. 4; the back side direction of the image forming apparatus 5 is not included in the directions #1 to #19. These sensors for the directions #1 to #19 respectively repeatedly carry out distance measurements for each measurement time-period (or time-interval) T as mentioned above. The arrows #1 to #19 shown in FIG. 4 respectively indicate directions of light-emission or wave-transmission/light-reception or wave-reception by the sensors.

The parameter extraction unit 8 carries out the following processes for each time interval T after the corresponding measurement is carried out.

A position detection process is carried out with the following steps.

(1) Storing of the measurement results:

A circumstance of the image forming apparatus 5 may be such as shown in FIG. 4. In this circumstance, an obstruction 17 is arranged at the front and at one side (right direction in FIG. 4) of the image forming apparatus 5. The obstruction 17 may comprise a stationary object such as a wall. A maximum measurable distance or maximum measuring distance Rmax is respectively assigned for each sensor. This distance Rmax is predetermined by factors such as sensor sensitivity for each sensor and also due to the following second condition. The above mentioned second condition is a limitation resulting from a sensor condition. Because the directions of detection of each sensor extend radially with distance from the apparatus 5, the greater the distance away from the apparatus 5, along a detecting paths, the wider an interval between adjacent detecting paths becomes. This interval is a non-detecting area where the sensors are unable to detect. Thus, the farther an object (a person to which the automatic response system it to respond) is located away from the apparatus 5, the greater a possibility that the object will be located in an interval. The above mentioned limitation is imposed to prevent such an occurrence (that is to reduce to zero the possibility that the object will be located in an interval as mentioned above), the limitation consisting in that a detecting distance away from the apparatus 5 is limited according to the size of an object. That is a maximum measuring (measurable) distance, or maximum detecting distance Rmax is imposed.

In the example of FIG. 4, there are directions, among the directions #1 to #19, in which directions the obstruction 17 exists within the distances Rmax. These directions comprise #7–#13, #15–#19, these corresponding numbers are shown, as indicating manners such as hatching being performed in the background of numerals within the circles, in FIG. 4. The parameter extraction unit 8 stores data concerning distances with corresponding measurement directions (distance sensor numbers #1–#19) corresponding to distances measured through the sensors, to the storing unit (memory) 13.

An example of data stored in the storing unit 13 by the parameter extraction unit 8 for the example of FIG. 4 is described with reference to FIG. 5. In FIG. 5, the distances indicated as rd ($r_7$–$r_{13}$, and $r_{15}$–$r_{19}$) respectively indicate distances for the directions d. In FIG. 5, each distance indicated as symbol ∞ indicates that there is no object within the maximum distance Rmax for the distance. The parameter extraction unit 8 writes the measured results in predetermined addresses in the storing unit 13.

(2) Updating of circumstance information:

Information concerning a position at which an object exists, which object is an object not actively affecting the image forming apparatus 5, will be referred to circumstance information. Such an object not actively affecting the image forming apparatus 5 comprises an obstruction such as, for example, a wall, desk, or chair. The parameter extraction unit 8 distinguishes between such an inactive object and another kind of object which may actively affect the image forming apparatus 5 (an active object). Such an active object comprises a moving object such as, for example, a person. Such an active object will be referred to simply as an object or an active object. For such distinguishing, the parameter extraction unit 8 then refers to the circumstance information stored in the storing unit 13.

The circumstance information generally has a form of a table shown in FIG. 5, which table indicates the measured distances for the respective directions. This circumstance information indicates a distance of the obstruction from the apparatus 5 for each direction.

The circumstance information is formed by selecting maximum distances $r_d$max for the respective directions #1–#19. This selection of the maximum distances $r_d$max is carried out as follows. Each distance sensor measures the distances at a given time, for example, after power is switched on in the image forming apparatus 5. In this measurement, a maximum distance value is obtained, for each direction, for a time period sufficiently longer than a time period for which the object normally acts within the above-mentioned measurable area. Thus obtained maximum distance values are the $r_d$max. These $r_d$max are generally shown in FIG. 6.

Then, such measurement is carried out for each measurement time-interval (or time-period) T for each direction. Then, the currently measured distances $r_d$ and the circumstance-information distances $r_d$max are respectively compared for each time after each measurement is carried out. As a result of each comparison, if $r_d$>$r_d$max, then the circumstance-information distance $r_d$max is updated to the currently measured distance $r_d$. Thus, after a sufficient time elapsed while such comparison and if-necessary updating are carried out, a final circumstance information is obtained.

In the example of FIG. 4, after a sufficient time period elapses, the obtained circumstance information is as shown in FIG. 7. That is, sufficient time period is a time period which includes a chance at which no active object is present within the measurable area for each sensor. In FIG. 7, the distances $r_d$ respectively indicate distances from the OA equipment to the obstruction 17 along the respective directions d in FIG. 4.

Figure 8:
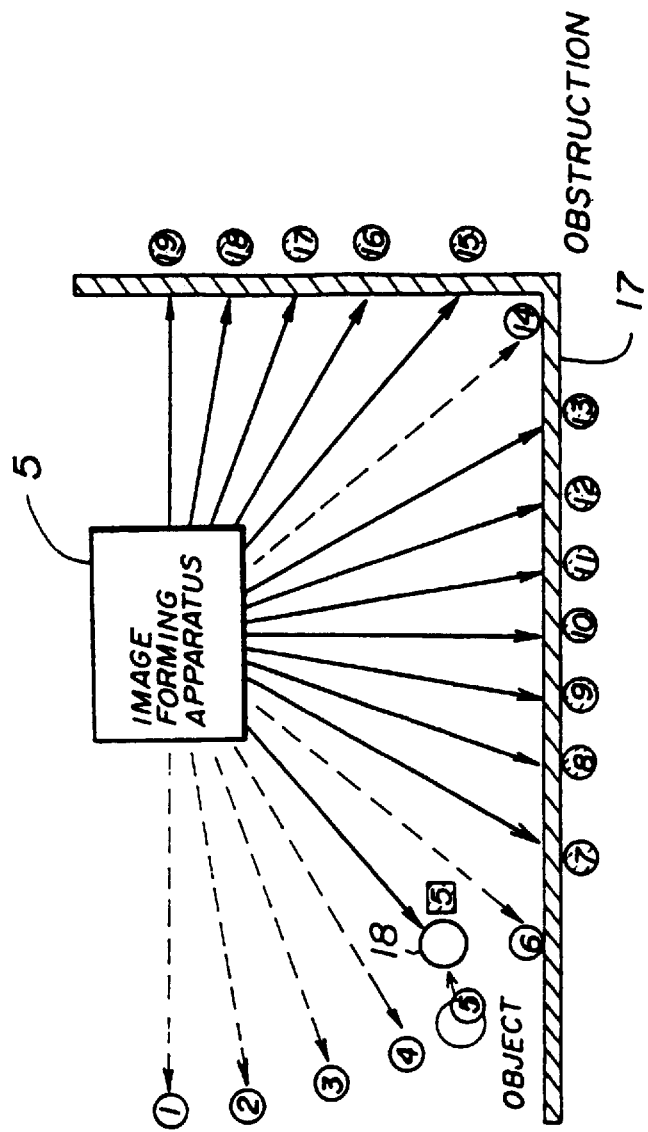
FIG. 8 shows a manner in which circumstance information varies.

(3) Detection of an object:

After finishing the updating of the circumstance information, the parameter unit 8 detects an object as illustrated in the following example. In this example, as shown in FIG. 8, an active object 18 approaches the image forming apparatus 5 along the direction #5. FIG. 8 shows a condition at a time t0.

Distance data stored in the storing unit 13 through the step (1) described above is shown in FIG. 9. There, each $r_{dt}$ indicates a measured distance for the direction d at a time t. The parameter extraction unit 8 detects the active object 18 by comparing the obtained distance data including the $r_{dt}$ and the circumstance information formed through the above-mentioned step (2). In this comparison, the parameter extraction unit 8 calculates a difference between the circumstance-information distances and the currently obtained distances for each direction. FIG. 10 shows a result of calculating differences therebetween for the case of FIG. 9.

In FIG. 10, a difference appears only for the direction #5. That is, the circumstance-information data is not equal to the currently obtained data due to the active object 18. As a result, the active object 18 is detected.

Polar coordinates (r, θ) are utilized for representing the position of the active object 18. In these polar coordinates, an origin is a central point of the image forming apparatus 5 and a direction θ=0 corresponds to the direction #10. There, In the example of FIG. 8, the position of the active object 18 corresponds to ($r_{5t0}$, 50°) in the polar coordinates. After the active object 18 is detected or recognized, the corresponding position is stored in the storing unit 13 at a predetermined address.

In such a case where the active object 18 approaches the image forming apparatus 5, there may be a time when a plurality of sensors simultaneously measure the same active object. In such a case, the position of the measured active object is determined as follows. In an example of FIG. 11, the same object 18 is measured by both the sensors #5 and #7. In these measurements, the respective two measured positions are respectively ($r_6$, $θ_6$(=40°)) and ($r_7$, $θ_7$(=30°)) in the polar coordinates.

In such a case where a plurality of measured results are obtained as positions with respect to the object, the following operation is carried out. Distances among the obtained positions for the same object are calculated. As a result, it is determined whether or not all of the calculated positions for the same object are smaller than a predetermined distance Lmin and whether or not the relevant measuring directions are adjacent into one another. There, the distance Lmin is predetermined depending on a size of the object (=human being) to which the automatic response system is to respond. As a result of this determination, if the calculated distances are smaller than the Lmin and the measuring directions are adjacent to one another, the relevant positions are integrated to one position. If these relevant positions comprise two positions, these positions are integrated to determine a center position between the two positions as the active object position. If these relevant positions comprise three positions or more, these positions are integrated to become a center of gravity among these positions.

Figure 11:
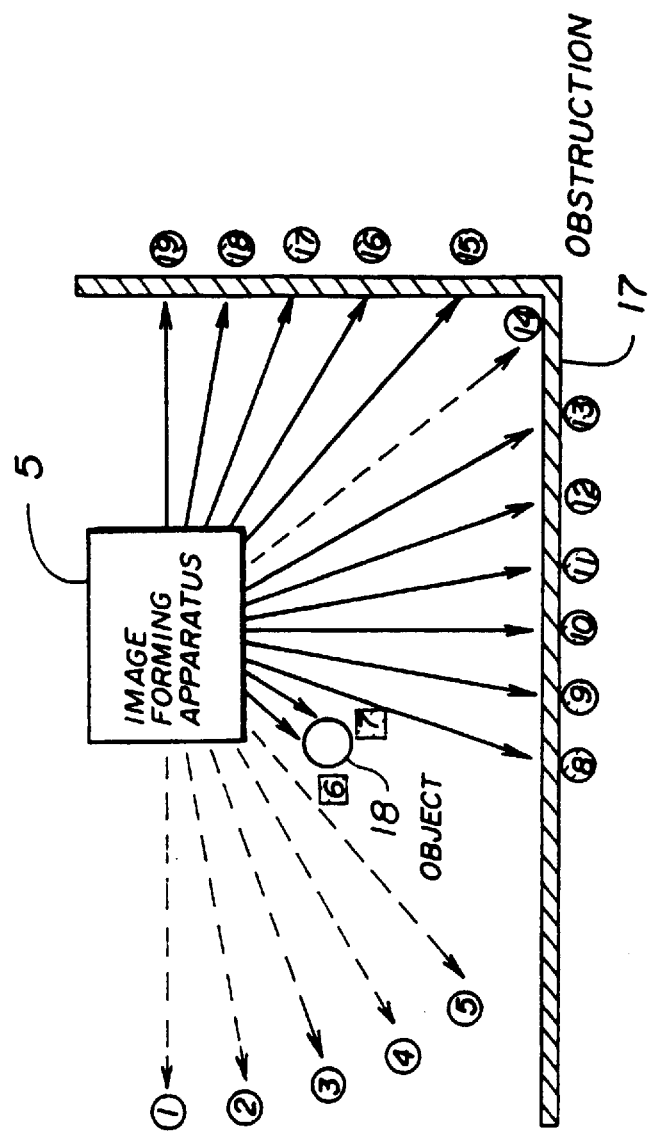
FIG. 11 shows a variation in circumstance information.

In the example of FIG. 11, the distance l between the two obtained relevant positions are calculated by the following equation (1):

$$l=[r_6^2+r_7^2-2 \cdot r_6 \cdot r_7 \cdot \cos(|\theta_6-\theta_7|)]^{1/2} \qquad (1).$$

Figure 12:
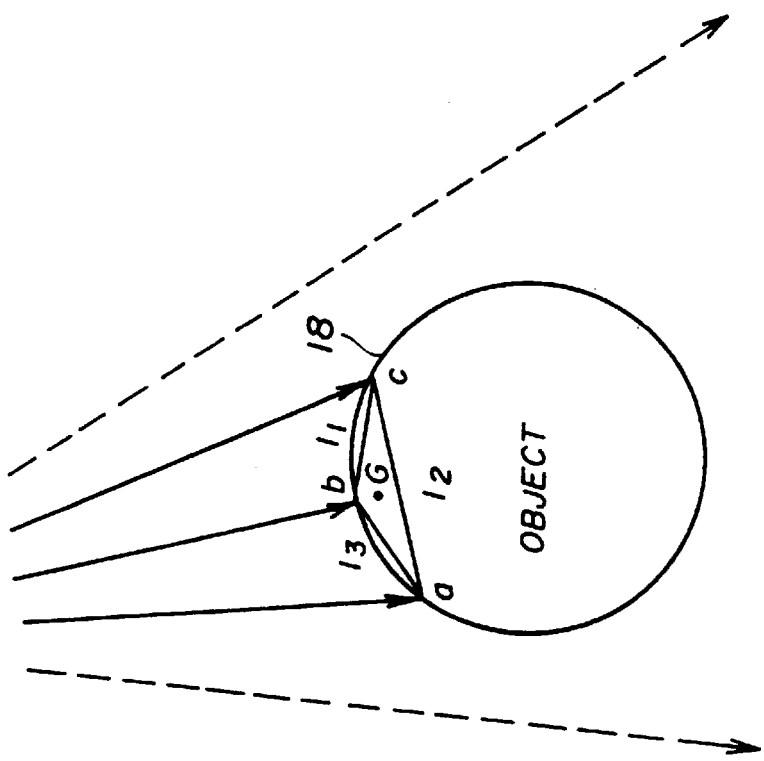
FIG. 12 shows the relevant part of FIG. 11 in more detail.

As a result of this calculation, if l<Lmin, the relevant two positions are integrated into one position which is a center position between the relevant two positions. If the relevant obtained positions are three positions or more, the three relevant positions are integrated only if $l_1$<Lmin, $l_2$<Lmin, $l_3$<Lmin as shown in FIG. 12. If these three positions are to be integrated, the resulting position will comprise the center G of gravity among the three positions a, b, and c. The resulting position is then stored in the storing unit 13 as the position of the active object 18.

Tracking of the object will now be described.

(1) Tracking of one object:

If the object is once recognized within the measurable area of the distance sensor(s), that is, the object is present within an area for which the distance sensor(s) can measure the object or the measurable area is an area defined by the above-mentioned distances Rmax, the recognized object is then tracked.

Figure 13:
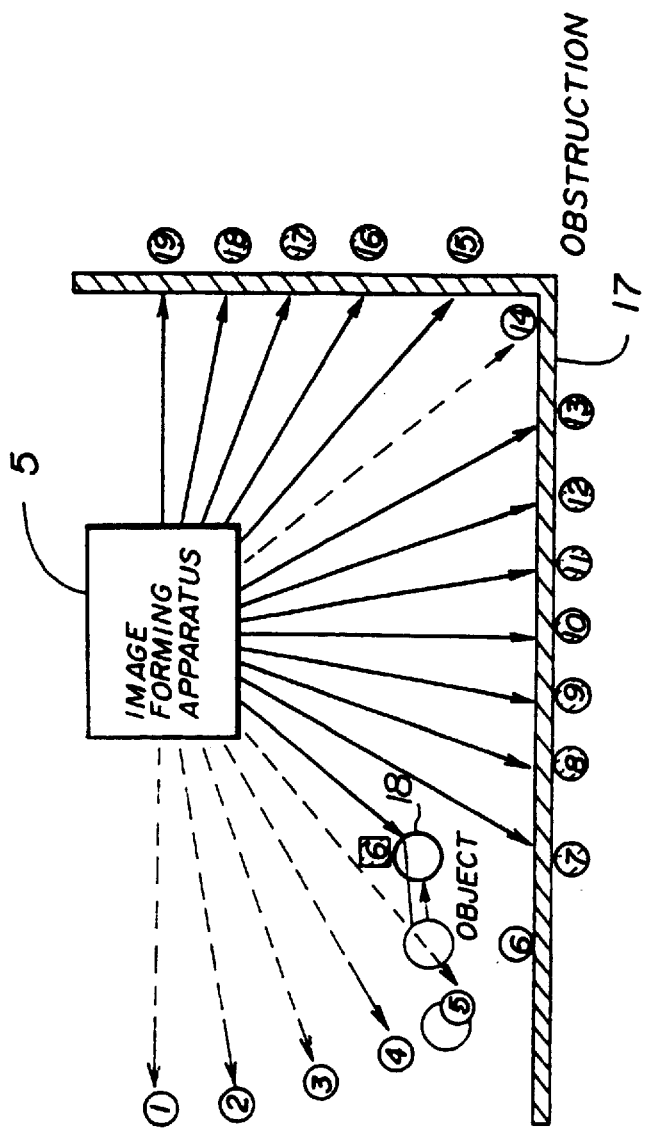
FIG. 13 shows a variation in circumstance information.

In one example, the object 18 shown in FIG. 8 may move as shown in FIG. 13 after the time t0 and before a time t1 (=t0+T). If so, then the current position of the object 18 is detected through the above-mentioned step, the detected position being indicated as ($r_{6t1}$, 40°). There, information concerning a position of the object measured at a time one measuring time interval T prior to the current time may have been stored in the storing unit 13. If so, using the stored information, the relevant moving speed v and the moving direction φ are then calculated. In the example of FIG. 13, such objects 18 one-time-interval-prior position information as mentioned above was stored in the storing unit 13. This stored information is that obtained for the example of FIG. 8. As a result, the moving speed v and the moving direction φ are calculated.

This calculation method will now be described using the example of FIGS. 8 and 13. There, a distance by which the object 18 moves for a time period starting at the time t0 and ending at the time t1 is referred to $l_{t1}$ An average speed for this movement is referred to as $v_{t1}$. An angle, corresponding to the moving direction, is referred to as $\phi_{t1}$, which angle is formed between two lines one of which connects the origin of the coordinate plane (the center of the image forming apparatus 5) and the position of the object 18 at the time t0. The other line, corresponding to a motion direction, connects between the positions of the object 18 at the times t0 and t1. These parameters are shown in FIG. 14.

Figure 14:
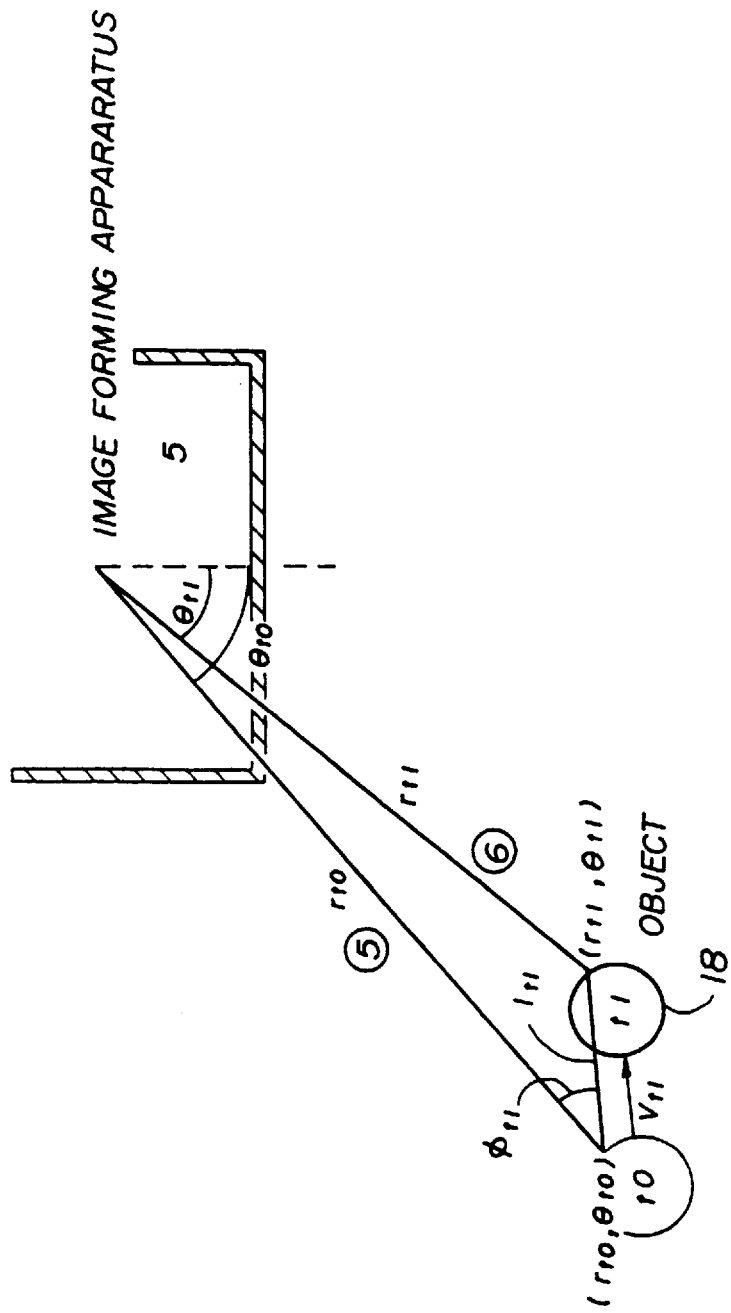
FIG. 14 shows the relevant part of FIG. 13 in more detail.

In FIG. 14, the distance $l_{t1}$ is obtained by the following equations (2) and (3):

$$l_{t1}^2 = r_{t0}^2 + r_{t1}^2 - 2 \cdot r_{t0} \cdot r_{t1} \cdot \cos(|\theta_{t0}-\theta_{t1}|) \qquad (2); \text{ and}$$

$$l_{t1} = [r_{t0}^2 + r_{t1}^2 - 2 \cdot r_{t0} \cdot r_{t1} \cdot \cos(|\theta_{t0}-\theta_{t1}|)]^{1/2} \qquad (3).$$

The direction $\phi_{t1}$ is obtained by the following equations (4), (5) and (6):

$$r_{t1}/(\sin\phi_{t1}) = l_{t1}/[\sin(|\theta_{t1}-\theta_{t0}|)]; \qquad (4)$$

$$\phi_{t1} = \sin^{-1}[r_{t1} \cdot \sin(|\theta_{t1}-\theta_{t0}|)/l_{t1}] \qquad (5)$$

$$= \sin^{-1}\left[\frac{r_{t1} \cdot \sin(|\theta_{t1}-\theta_{t0}|)}{\{r_{t0}^2+r_{t1}^2-2 \cdot r_{t0} \cdot r_{t1} \cdot \cos(|\theta_{t0}-\theta_{t1}|)\}^{\frac{1}{2}}}\right]$$

and thus, $v_{t1}$ is obtained by the following equation (6):

$$v_{t1} = l_{t1}/(t1-t0) = \{r_{t0}^2+r_{t1}^2-2 \cdot r_{t0} \cdot r_{t1} \cdot \cos(|\theta_{t0}-\theta_{t1}|)\}^{1/2}/T \qquad (6).$$

The moving speed v, moving direction φ calculated using the above equations (3), (5) and (6) are stored in the storing unit 13 together with the previously calculated position (r, φ).

The above operations are repeated for each time interval T. As a result, trajectory information for the object is successively stored in the storing unit 13 for each time interval T, which information comprises the position information (r, φ), and the corresponding information concerning the moving speed and the moving direction if one-time-interval-prior position information is available. Such trajectory information for the object 18 is stored in the storing unit 13 as a data format such as a list or a data format of a ring buffer. However, such a data format may be generally understood as a format such as a table.

Figure 15:
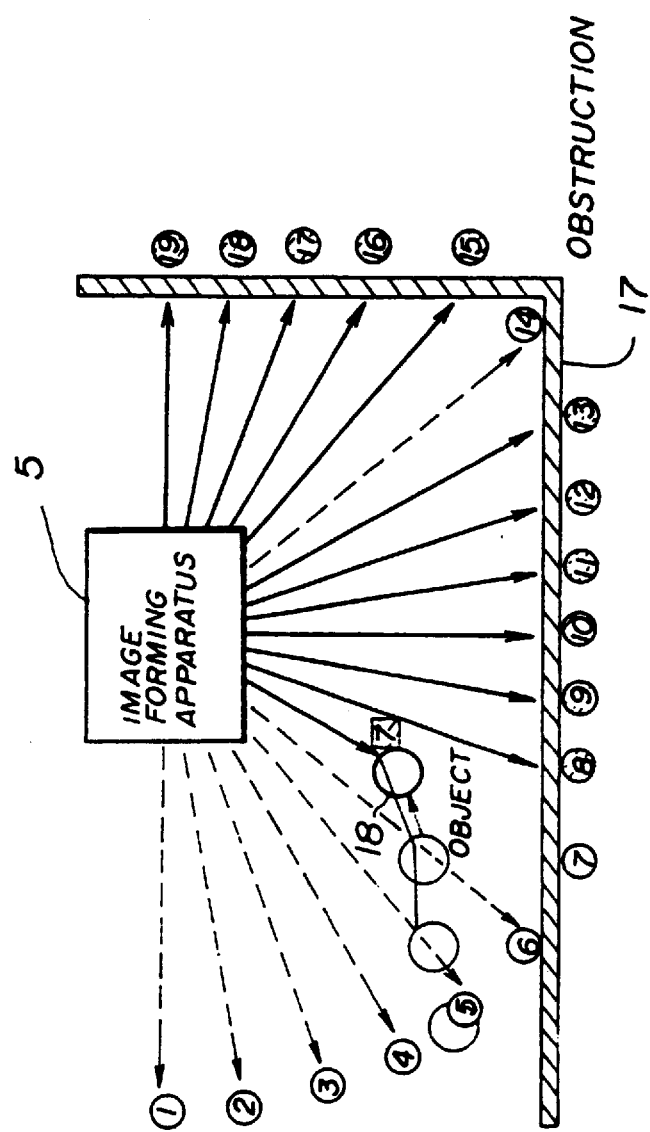
FIG. 15 shows a variation in circumstance information.
Figure 16:
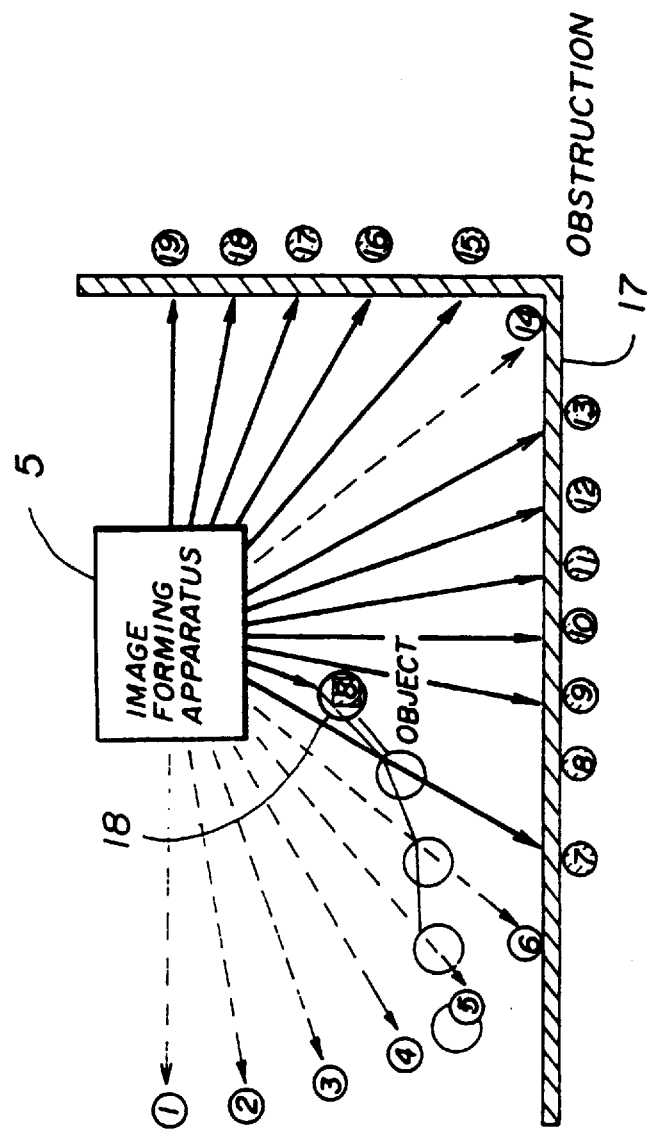
FIG. 16 shows a variation in circumstance information.

A moving manner of the object 18 during the time interval T starting from the time t1 (when the position of the object 18 is as shown FIG. 13 with the solid-line circle) and ending at a time t2 is shown in FIG. 15. A moving manner of the object 18 during the time interval T starting from the time t2 (when the position of the object 18 is as shown FIG. 15 with the solid-line circle) and ending at a time t2 is shown in FIG. 16. Trajectory information obtained concerning the motion of the object 18, such as shown in FIGS. 8, 13, 15 and 16, starting from the time t0 and ending at the time t3 is generally shown in FIG. 17.

(2) Tracking of a plurality of objects:

A plurality of active objects may exist within measurable areas of the distance sensors such as mentioned above. If so, the corresponding respective plurality of sets of trajectory information are then stored in the storing unit 13 and the objects corresponding thereto are respectively tracked using the stored sets of trajectory information.

Figure 18:
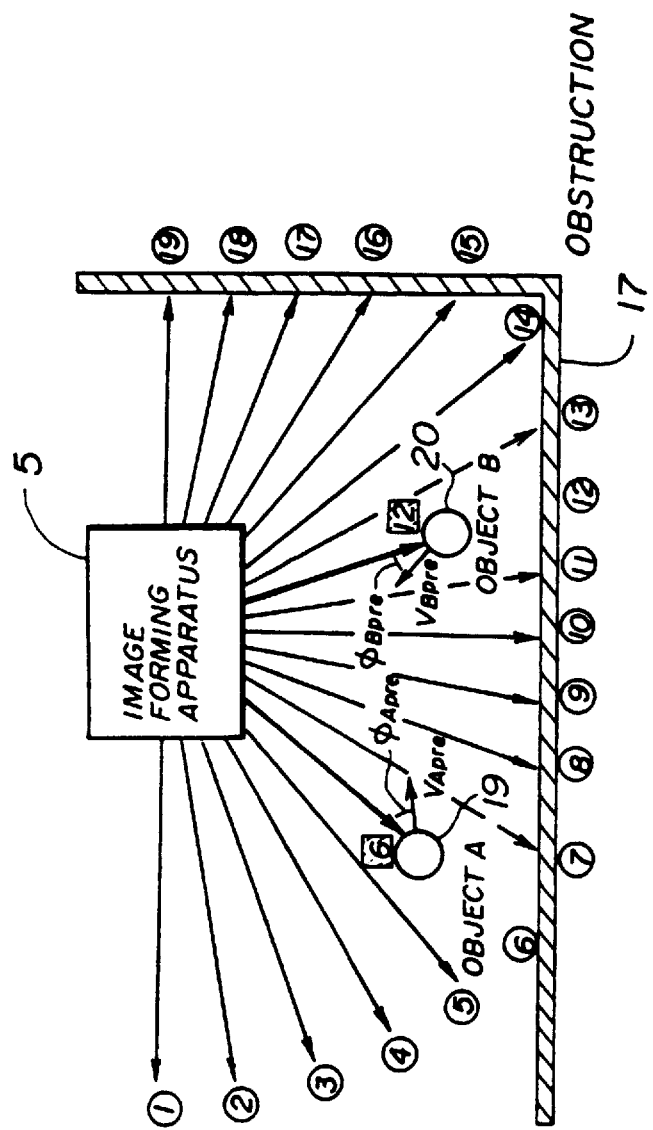

An example of FIG. 18 will be used for the description where two objects A and B exist. As a result, the corresponding two respective sets of trajectory information are stored in the storing unit 13. In the example of FIG. 18, a position of the object A is detected as ($r_6$, $\theta_6$(=40°)) and a position of the object B is detected as ($r_{12}$, $\theta_{12}$(=−20°)). Information concerning the position information is stored in the storing unit 13.

Figure 19:
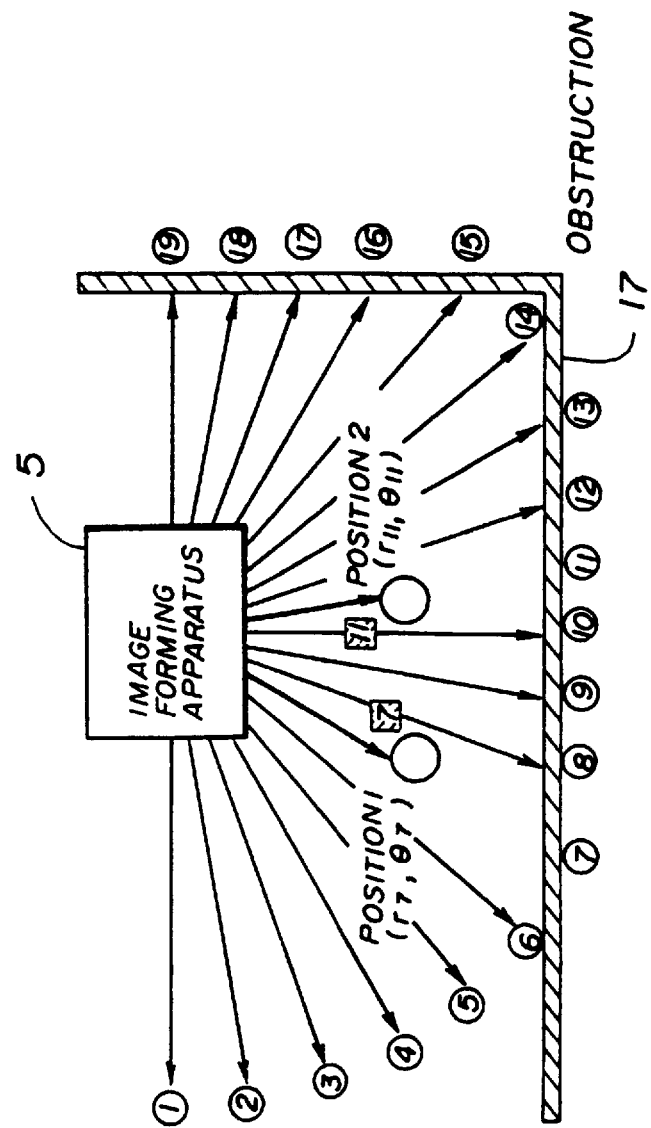

FIG. 19 shows a condition after a time interval T (sampling period) elapses since the condition shown in FIG. 18. In this condition of FIG. 19, the corresponding respective position information is detected as a position 1 ($r_7$, $\theta_7$(=30°)) and a position 2 ($r_{11}$, $\theta_{11}$(=−10°)).

Figure 20A:
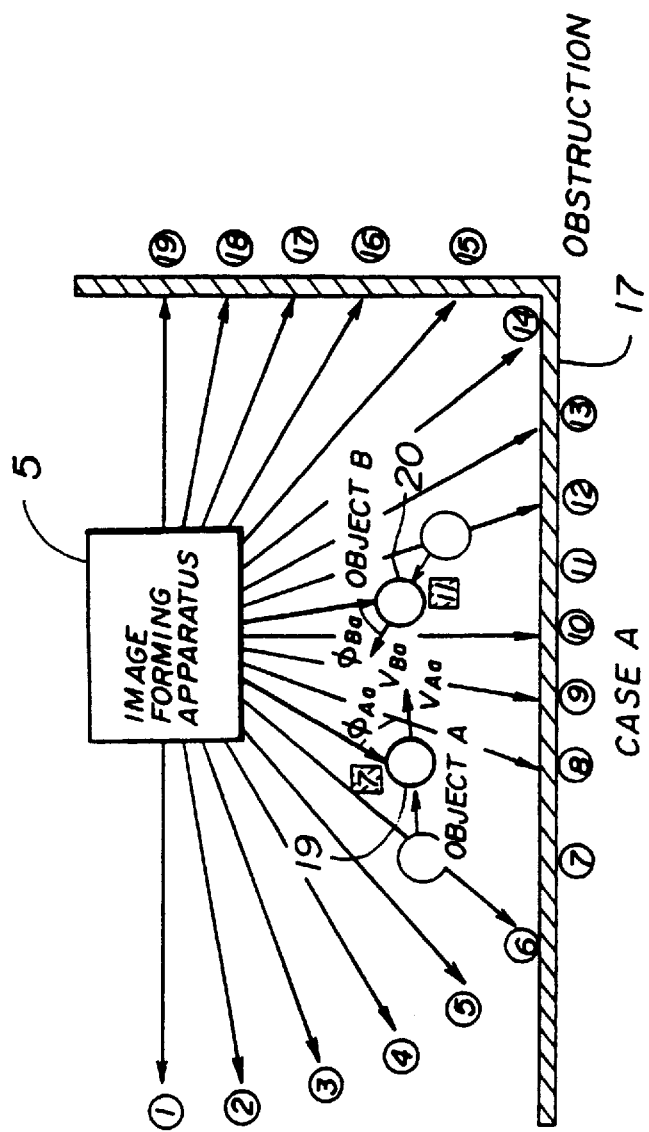
Figure 20B:
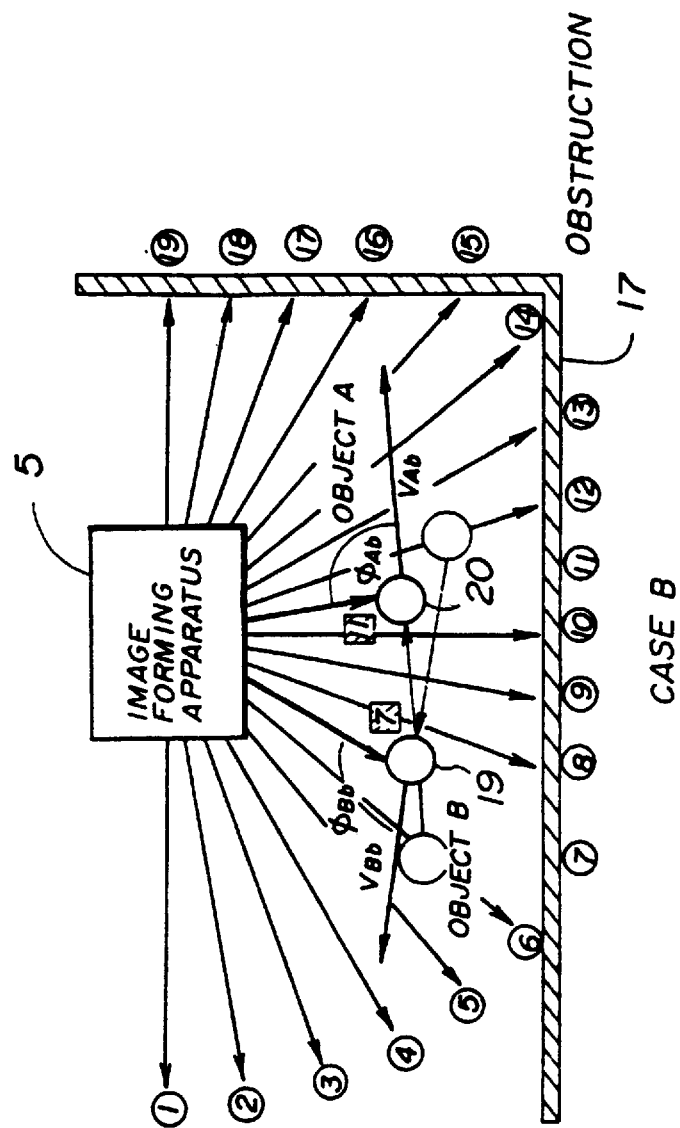

There are two possibilities, shown in FIGS. 20A and 20B, as to how the state shown in FIGS. 18 is changed into the state shown in FIG. 19. In a case A of FIG. 20A, the object A moves to the position 1 while the object B moves to the position 2. In a case B of FIG. 20B, the object A moves to the position 2 while the object B moves to the position 1. It will now be described how it is determined which possibility between the above-mentioned two possibilities is selected.

Moving speeds v and moving directions φ are calculated according to the equations (5) and (6) for each case. Then, the moving direction of the object A in the case A will be referred to as $\phi_{Aa}$; the moving speed of the object A in the same case will be referred to as $v_{Aa}$; the moving direction of the object B in the same case will be referred to as $\phi_{Ba}$; the moving speed of the object B in the same case will be referred to as $v_{Ba}$. The moving direction of the object A in the case B will be referred to as $\phi_{Ab}$; the moving speed of the object A in the same case will be referred to as $v_{Ab}$; the moving direction of the object B in the same case will be referred to as $\phi_{Bb}$; and the moving speed of the object B in the same case will be referred to as $v_{Bb}$.

The moving direction of the object A at the time (corresponding to the condition shown in FIG. 18) one sampling period (time interval T) prior to the time (corresponding to the condition shown in FIG. 19) will be referred to as $\phi_{Apre}$. The moving speed of the object A at the same time will be referred to as $v_{Apre}$. The moving direction of the object B at the same time will be referred to as $\phi_{Bpre}$. The moving speed of the object B at the same time will be referred to as $v_{Bpre}$. A variation quantity of the object A in the moving direction thereof will be referred to as $\delta\phi_A$. A variation quantity of the object A in the moving speed thereof will be referred to as $\delta v_A$. A variation quantity of the object B in its moving direction will be referred to as $\delta\phi_B$. A variation quantity of the object A in the moving speed thereof will be referred to as $\delta v_B$. Then, these values $\delta\phi_A$, $\delta v_A$, $\delta\phi_B$ and $\delta v_B$ are obtained by the following equations (7A), (7B), (8A) and (8B):

$\delta\phi_A = \phi A - \phi_{Apre}$ (7A);

$\delta\phi_B = \phi B - \phi_{Bpre}$ (7B);

$\delta v_A = vA - v_{Apre}$ (8A); and $\delta v_B = vB - v_{Bpre}$ (8B).

Then, a variation quantity for the object i is defined as $e_i$ and is obtained by the following equation (9). In addition a total variation quantity is defined as En and it is obtained by the following equation (10):

$$e_i = \alpha\delta\phi_i + \beta\delta v_i \quad (9) \text{ and}$$

$$En = \Sigma_i(\alpha\delta\phi_i + \beta\delta v_i) \quad (10).$$

Here, α and β are constants for respectively giving weights for the variation quantity $\delta\phi_i$ in the moving direction and the variation quantity $\delta v_i$ in the moving speed. The selection of the possible combination of the objects and the detected positions such as mentioned above is carried out so that the corresponding total variation quantity Ei is minimized.

In the above example, the total variation quantities Ea and Eb respectively for the above-mentioned cases A and B are respectively calculated by the following equations (11) and (12):

$$\begin{aligned} Ea &= (\alpha\delta\phi_{Aa} + \beta\delta v_{Aa}) + (\alpha\delta\phi_{Ba} + \beta\delta v_{Ba}) \\ &= (\alpha(\phi_{Aa} - \phi_{Apre}) + \beta(v_{Aa} - v_{Apre})) + \\ &\quad (\alpha(\phi_{Ba} - \phi_{Bpre}) + \beta(v_{Ba} - v_{Bpre})); \text{ and} \end{aligned} \quad (11)$$

$$\begin{aligned} Eb &= (\alpha\delta\phi_{Ab} + \beta\delta v_{Ab}) + (\alpha\delta\phi_{Bb} + \beta\delta v_{Bb}) \\ &= (\alpha(\phi_{Ab} - \phi_{Apre}) + \beta(v_{Ab} - v_{Apre})) + \\ &\quad (\alpha(\phi_{Bb} - \phi_{Bpre}) + \beta(v_{Bb} - v_{Bpre})). \end{aligned} \quad (12)$$

Then, if Ea<Eb, the above-mentioned combination of the objects and the detected positions according to case A is selected, and, as a result, the following parameters are then determined and stored in the storing unit 13 for the trajectory information of the object A: the position is ($r_7$, $\theta_7(=30°)$); the moving direction is $\phi_{Aa}$; and the moving speed is $v_{Aa}$. The following parameters are then determined and stored in the storing unit 13 for the trajectory information of the object B: the position is ($r_{11}$, $\theta_{11}(=-10°)$); the moving direction is $\phi_{Ba}$; and the moving speed is $v_{Ba}$.

Similarly, all the possibilities of combinations of an object and a corresponding detected position are made if there exist three objects or more within an measurable areas of the distance sensors such as mentioned above. Then, total variation quantities E such as mentioned above are calculated for the respective possible combinations. Consequently, data to be written as the corresponding trajectory information can be determined.

There may be a case where there is an object for which a total variation quantity cannot be calculated. In such a case, a process to be carried out is such as determining a correspondence between the object and the corresponding detected position so that the moving distance 1 (a distance the object has moved through) is a minimum. This may be achieved by, for example, by determining a correspondence between detected positions respectively for objects located near one another as compared to a condition existing one sampling time (time interval T) prior to the current time.

There may be a case where a plurality of objects, such as objects A and B shown in FIG. 12, appear to overlap one another when viewed from the image forming apparatus 5. That is, the objects A and B exist at a direction associated with the same sensor. In such a case, the number of detected objects is temporarily reduced, the following tracking is then carried out and resulting trajectory information is then generated.

In the example of FIG. 21, the object is detected in a direction #9 when the objects A and B respectively exist in the same direction respective to the image forming apparatus. The detected position is ($r_9$, $\theta_9(=10°)$). Positions of the objects A and B one sampling time (time interval T) prior to the current time will be respectively referred to as ($r_{Apre}$, $\theta_{Apre}$) and ($r_{Bpre}$, $\theta_{Bpre}$).

Figure 22A:
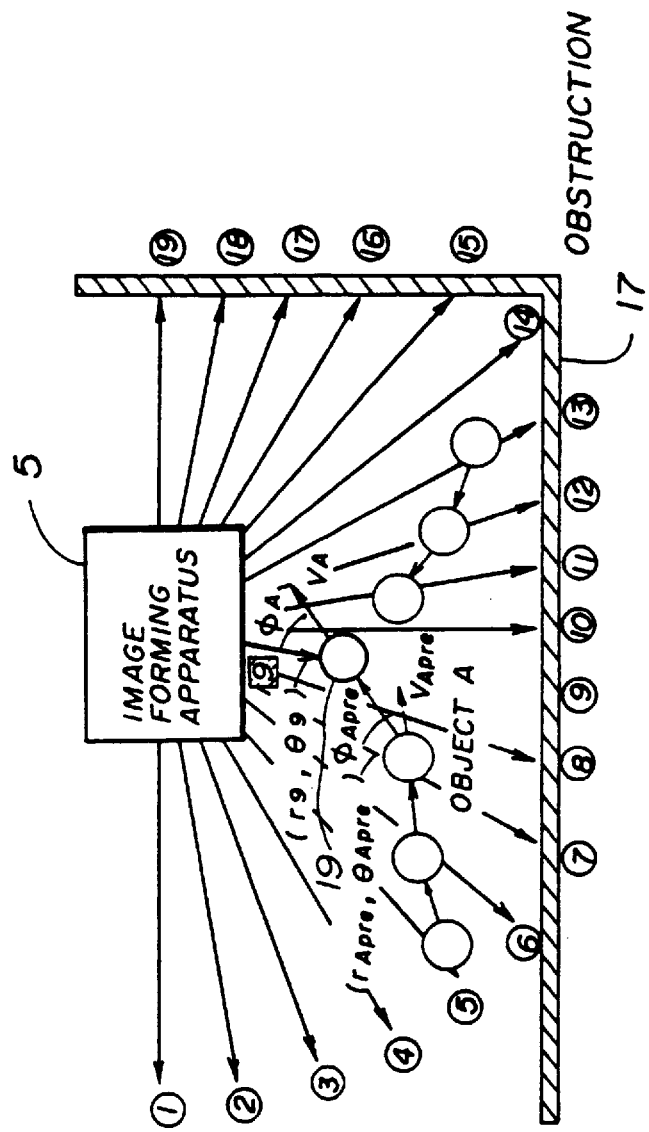
Figure 22B:
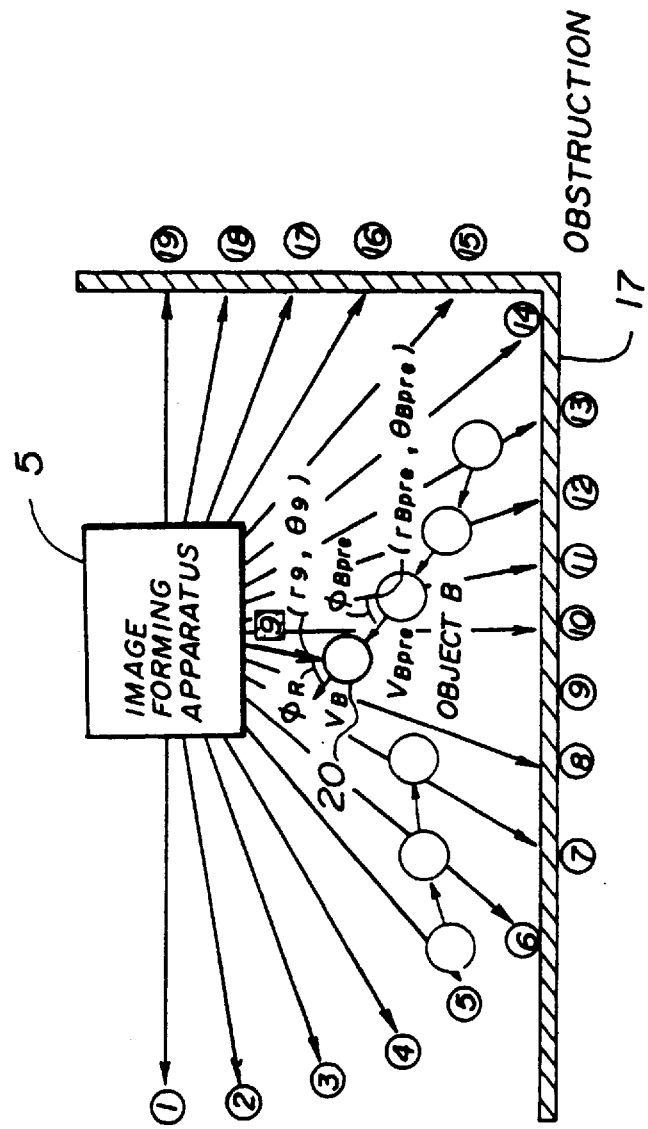

There are two possibilities; cases A and B where either the object A or the object B reaches the detected position at the time when both objects A and B actually exist along the direction #9. These cases are respectively shown in FIGS. 22A and 22B. The moving directions and moving speeds of the objects A and B for the respective cases A and B will be referred to as $\phi_A$, $v_A$, $\phi_B$, and $v_B$. These parameters are calculated using the following equations (13), (14), (15), and (16) (these equations are obtained from the equations (5) and (6)):

$$\phi_A = \sin^{-1}\left[\frac{r_9 \cdot \sin(|\theta_9 - \theta_{Apre}|)}{\{r_{Apre}^2 + r_9^2 - 2 \cdot r_{Apre} \cdot r_9 \cdot \cos(|\theta_9 - \theta_{Apre}|)\}^{\frac{1}{2}}}\right]; \quad (13)$$

$$v_A = \{r_{Apre}^2 + r_9^2 - 2 \cdot r_{Apre} \cdot r_9 \cdot \cos(|\theta_{Apre} - \theta_9|)\}^{\frac{1}{2}} /T; \quad (14)$$

$$\phi_B = \sin^{-1}\left[\frac{r_9 \cdot \sin(|\theta_9 - \theta_{Bpre}|)}{\{r_{Bpre}^2 + r_9^2 - 2 \cdot r_{Bpre} \cdot r_9 \cdot \cos(|\theta_9 - \theta_{Bpre}|)\}^{\frac{1}{2}}}\right]; \text{ and} \quad (15)$$

$$v_B = \{r_{Bpre}^2 + r_9^2 - 2 \cdot r_{Bpre} \cdot r_9 \cdot \cos(|\theta_{Bpre} - \theta_9|)\}^{\frac{1}{2}} /T. \quad (16)$$

The moving directions and moving speeds of the objects A and B will be respectively referred to as $\phi_{Apre}$, $v_{Apre}$, $\phi_{Bpre}$, and $v_{Bpre}$. The respective variation quantities will be referred to as $e_A$ and $e_B$. Then, according to the equation (9), $e_A$ and $e_B$ will be calculated by the following equations (17) and (18):

$$e_A = \alpha\delta\phi_A + \beta\delta v_A = \alpha(\phi_A - \phi_{Apre}) + \beta(v_A - v_{Apre}) \quad (17); \text{ and}$$

$$e_B = \alpha\delta\phi_B + \beta\delta v_B = \alpha(\phi_B - \phi_{Bpre}) + \beta(v_B - v_{Bpre}) \quad (18).$$

It may be determined that the detected position is a position associated with an object of the objects A and B so that the variation quantity associated with the determined object should be smaller. If so, in the example of FIG. 22, because $e_B < e_A$, the detected position, at the time the objects A and B actually exist along the direction #9, is determined as that relevant to the object B. As a result, the detected position is written in the storing unit 13 as the trajectory information for the object B. In this case, a position of the object A cannot be determined at the same time. Hence, no corresponding trajectory information is written for the object A at this time. The trajectory information for the object A at the same time may be retroactive written corresponding to the same time after the position of the object A is determined.

In the above-mentioned example, a position of the object A may be determined to be $(r_{Apost}, \theta_{Apost})$ after one sampling period (time interval T) elapses since the time under consideration. Consequently the center point between the two points $(r_{Apre}, \theta_{Apre})$ and $(r_{Apost}, \theta_{Apost})$ is then assigned to be the not-yet-determined position $(r_A, \theta_B)$ associated with the time under consideration.

In the above-mentioned example, a position of the object A may be determined as to be $(r_{Anpost}, \theta_{Anpost})$ at a time after n sampling periods (time interval nT) elapse since the time under consideration. Consequently the points resulting from interior division to n-pieces of the two points $(r_{Apre}, \theta_{Apre})$ and $(r_{Anpost}, \theta_{Anpost})$ are then respectively assigned to be the not-yet-determined positions associated with the times under consideration. Information concerning the determined positions is then written as the trajectory information of the object A.

When three objects or more appear to overlap each other as a result of these objects existing along the same measuring direction of a distance sensor within the measurable are of the sensor such as mentioned above, operations may be carried out similarly to the case where the two objects appear to overlap, such as mentioned above. That is, a correspondence between the detected position and the corresponding object from among the plurality of objects is determined by calculating variation quantities e for each object.

Generation of a recognition/determination trigger signal will now be described.

The parameter extraction unit 8 send a recognition/determination trigger signal to the control unit 11 when an object 17 approaches the image forming apparatus 5 and a distance r therebetween becomes less than a certain value Lmin. This operation is carried out so as to carry out determination of the distance r. Such operation is carried out at any time when each of a plurality of objects approaches the image forming apparatus 5 and a distance r between the image forming apparatus 5 and the object becomes within a certain value Lmin. The recognition/determination trigger signal is then converted into a recognition/determination request signal in the control unit 11 and the resulting signal is then sent to the recognition/determination sub-unit 9.

Figure 23:
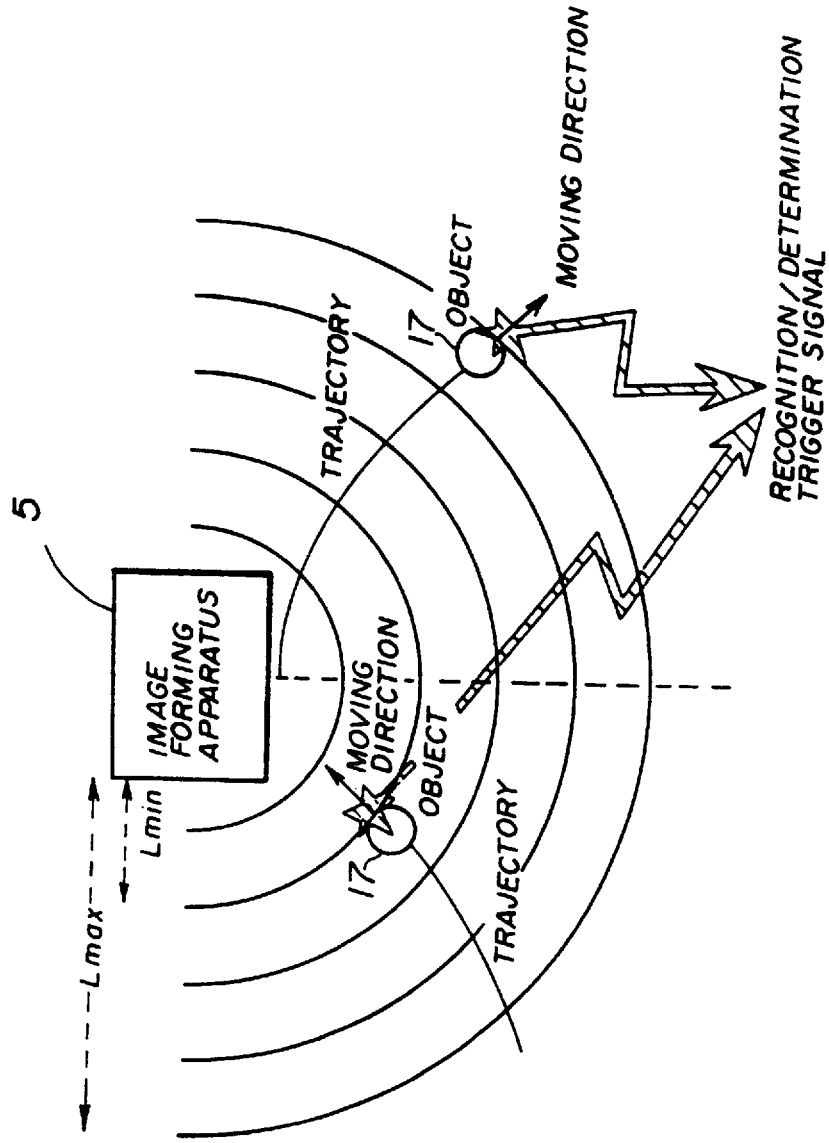
FIG. 23 illustrates recognition/determination for a moving object.

Similarly, the parameter extraction unit 8 sends a recognition/determination trigger signal to the control unit 11 when an object recedes from the image forming apparatus 5 and a distance r therebetween becomes equal to or more than a certain value Lmax. This operation is carried out so as to carry out determination of the distance r. There may be a case where a plurality of objects exist within the measurable area of the distance sensors such as mentioned above. If so, an operation to be carried out is similar to that in the case of the object approaching the image forming apparatus 5. FIG. 23 shows manners for generating recognition/determination triggers signal.

The amount of the Lmin is predetermined so that when an object is within the distance Lmin the recognition/determination unit 3 sends a recognition/determination result to the service provision unit 4. The recognition/determination result comprises, for example, information whether or not the object (person) will operate the image forming apparatus 5. Such a distance Lmin may be determined appropriately to a kind of service to be provided as a result of the corresponding recognition/determination result. This determination of the Lmin may also depend on a time period required for initiating the relevant service after receiving the recognition/determination result. This determination of the Lmin may also depend on a moving speed of the object.

The above-mentioned distance Lmax is suitably determined within the maximum measurable distance (Rmax shown in FIG. 4) of the distance sensors.

The parameter extraction unit 8 sends data to the recognition/determination sub-unit 9 after sending such a recognition/determination trigger. The data to be sent comprises data required for accessing, by the recognition/determination sub-unit 9, trajectory information such as mentioned above stored in the storing unit 13. This data to be sent includes addresses in the storing unit 13 where the trajectory information is stored, sizes of the stored data, and/or information as to whether the object under consideration approaches or recedes from the image forming apparatus 5.

Functions of the recognition/determination sub-unit 9 will now be described.

The recognition/determination sub-unit 9, in response to a request from the control unit 11, carries out determination as to an object to which the automatic response system is to respond. After receiving a recognition/determination request signal from the control unit 11, the recognition/determination sub-unit 9 receives data from the parameter extraction unit 8. This data is such as mentioned above, and comprises data required for accessing, by the recognition/determination sub-unit 9, trajectory information such as mentioned above stored in the storing unit 13. This data to be received includes addresses in the storing unit 13 where the trajectory information is stored, sizes of the stored data, and/or information as to whether the object approaches or recedes from the image forming apparatus 5.

After that, the recognition/determination sub-unit 9 accesses the trajectory information stored in the storing unit 13. The trajectory information to be accessed is information concerning an object as to which recognition/determination is to be executed. The recognition/determination sub-unit 9 then performs a predetermined processing of the accessed trajectory information. As a result, the recognition/determination sub-unit 9 determines as follows. This determination may comprise, for example, a determination as to whether or not an object which approaches the image forming apparatus 5 is to be a user thereof (that is, the object will use or not use it). This determination also may comprise a determination as to whether or not an object which recedes from the image forming apparatus 5 has already finished using thereof (that is, whether the object is using or finished using the image forming apparatus). A result of such a determination is then sent to the following processing unit 10.

Some examples will now be described as to a process for determining whether or not an object which approaches will use or not use the image forming apparatus.

Preliminary processing to be executed so as to make the determination will now be described.

The recognition/determination sub-unit 9 generates some parameters from the trajectory information.

Figure 24:
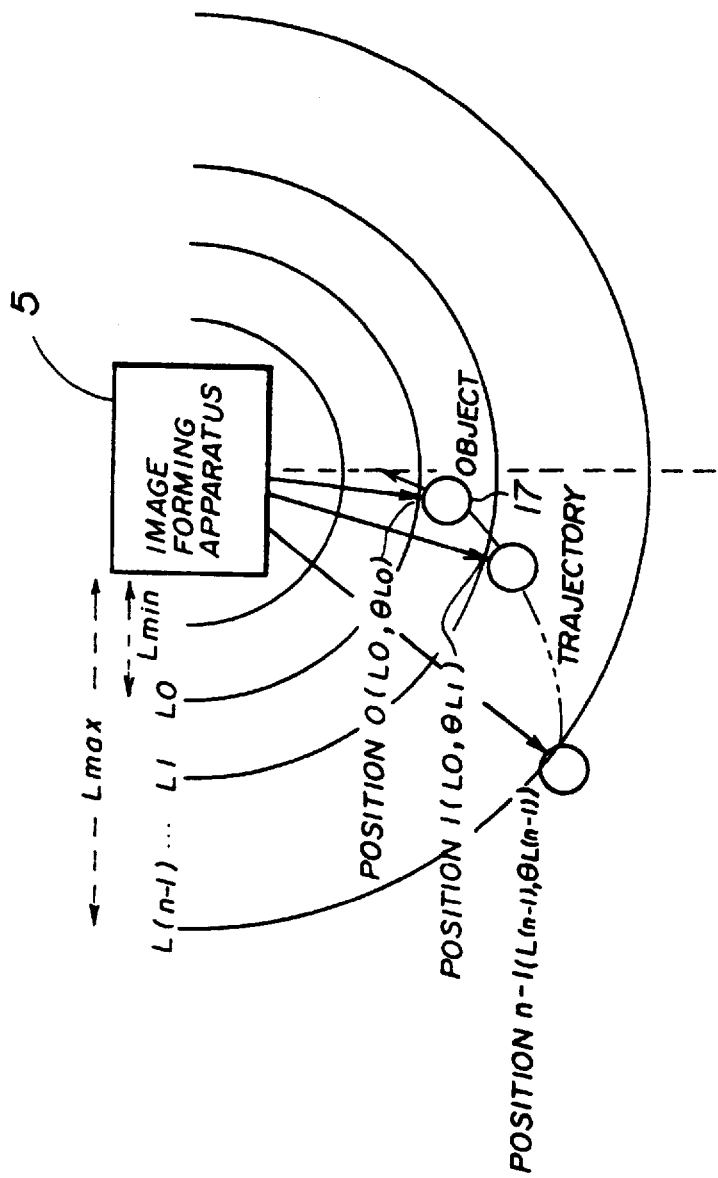
FIG. 24 illustrates recognition/determination for a moving object where the object approaches the image forming apparatus.

At least one reference distance is preset within the measurable areas of the distance sensors such as mentioned above. In one example shown in FIG. 24, n reference distances L0, L1, L2, . . . , L(n−1) are preset, where L0<L1<L2<. . . <L(n−1). There, the reference distance L0 nearest to the image forming apparatus 5 is equal to the above-mentioned Lmin. The Lmin is a distance from the image forming apparatus 5, which distance relates to a condition where the above-mentioned recognition/determination trigger is generated as mentioned above.

Parameters such as trajectory information of an object are generated with respect to each of the reference distances Lm. These parameters include: a time $t_{Lm}$ at which the relevant object exists at the position a distance Lm apart from the image forming apparatus 5; a distance $r_{Lm}$ (=Lm); a direction $\theta_{Lm}$ in which the object exists with respect to the image forming apparatus; a moving speed $v_{Lm}$ at which the object moves there, and a moving direction $\phi_{Lm}$ in which the object moves. These parameters also include: a variation quantity in the moving speed delta (indicated by a triangle in FIGS. 25 and 26) $v_{Lm}$ (=$v_{Lm}-v_{L(m-1)}$) by which the object moves between the positions of distances L(m−1) and Lm; and a variation quantity in the moving direction delta (indicated by a triangle in FIGS. 25 and 26) $\phi_{Lm}$ (=$\phi_{Lm}-\phi_{L(m-1)}$) by which the object moves between the positions of distances L(m−1) and Lm. However, in the generation of the parameters, generation of: the variation quantity in moving speed delta $v_{L0}$ and of the variation quantity in moving direction delta $\phi_{L0}$ for the distance L0 is not executed.

FIG. 25 generally shows these resulting parameters.

The generated parameters are then processed as necessary so as to convert them into a form thereof which can be used in a next step. This processing may comprise, for example, converting the parameters into corresponding group numbers which are predetermined as a result of dividing each parameter-value magnitude range into a plurality of group ranges having respective group numbers. The processing may also comprise, for example, causing the parameters to be standardized with respect to predetermined ranges.

Recognition/determination processing will now be described.

In one example of a method by which recognition/determination is executed using parameters thus generated in the above-mentioned preliminary processing step, a neural network method is utilized as follows.

Figure 26:
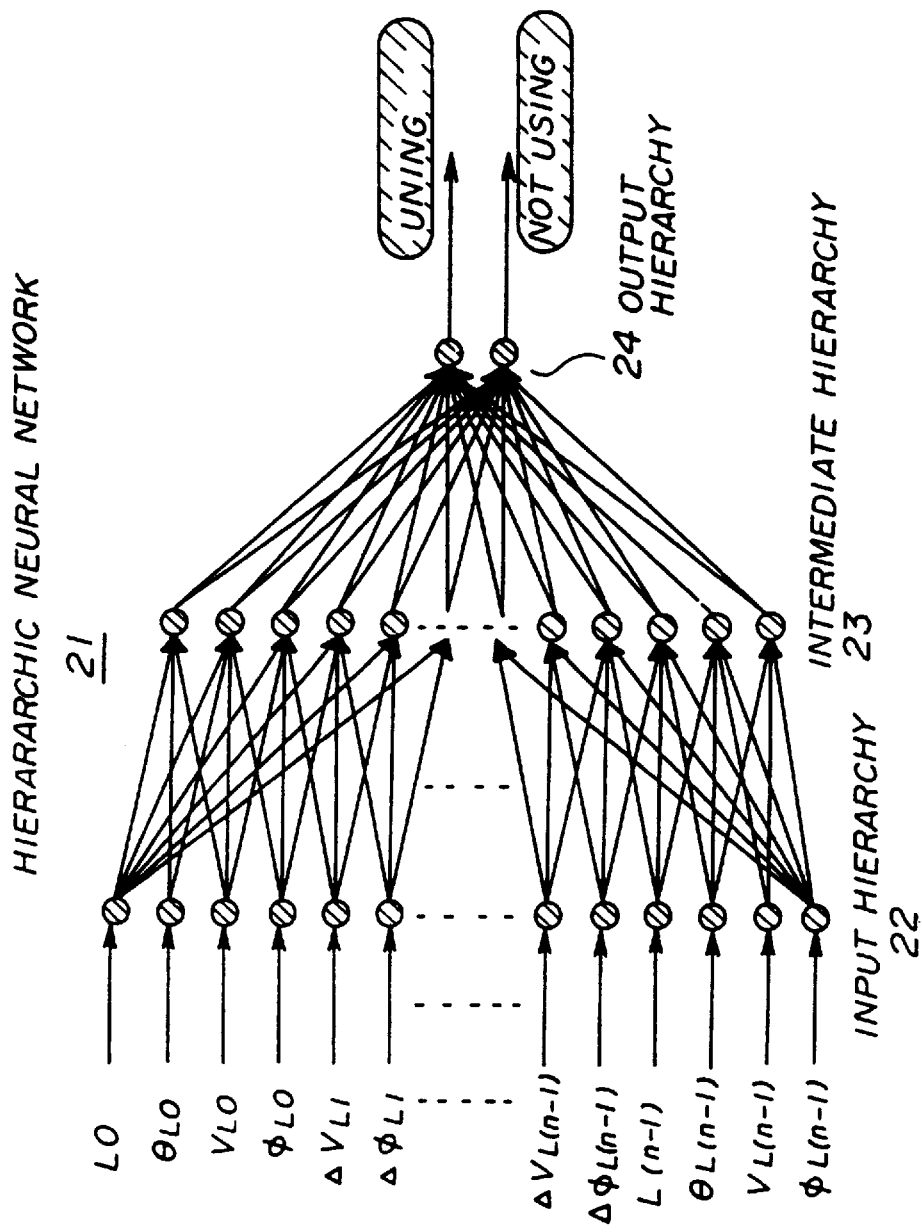
FIG. 26 shows an example of a hierarchic (or hierarchical) neural network according to the present invention.

In one example of utilization of the neural network method, the following neural network 21 as diagrammatically shown in FIG. 26 is prepared for determining whether an object will use or not use the image forming apparatus. In FIG. 26, the neural network 21 comprises a hierarchical (or hierarchic) neural network comprising three hierarchies: an input hierarchy 22, intermediate hierarchy 23, and output hierarchy 24. Each unit constituting the input hierarchy 22 corresponds to a parameter among the above-mentioned generated parameters. Each unit constituting the output hierarchy 24 corresponds to a determination result from among the results (in this case, between the results: use and not use such as mentioned above). In order to make the neural network appropriately operate so as to obtain appropriate determinations, the neural network is previously made to learn to suitably use, for example, a back propagation method. In this learning, characteristic patterns are used as teacher data, the characteristic patterns being previously collected as a result of executing relevant experiments, for example.

That is, in the experiments, various actual cases are simulated under near real conditions in which, for example, various persons working in the surroundings of the OA equipment, as if in an actual office. In the experiments various situations are simulated, for example a situation wherein a person uses the image forming apparatus while another person does not use it. In such experiments as mentioned above, an actual office may be used for such a simulations. For each case, each parameter associated with, for example, movement of a person, is input into the neural network. Then the neural network learns an actual result as to whether or not the relevant object is to be a user of the image forming apparatus.

When recognition/determination is executed, the parameters are input to the neural network 21, which parameters have been generated in response to the relevant control signal from the control unit 11 using the relevant trajectory information. As a result, a result associated with a unit that has fired most strongly (which has the greatest output value) is then sent to the following processing unit 10 as the recognition/determination result.

Similarly, another neural network is prepared for determining whether the object is using the image forming apparatus 5 or has already finished the using thereof. Then, the relevant recognition/determination result is made through this prepared neural network and the result is sent to the following processing unit 10.

Following processing will now be described.

The following processing unit 10 receives such recognition/determination results and converts them into a form appropriate to be provided outside. Then, the following processing unit 10 reports a situation change to the control unit 11 if necessary. The unit 11 then sends the resulting recognition/determination data to an appropriate unit in the image forming apparatus.

Figure 27A:
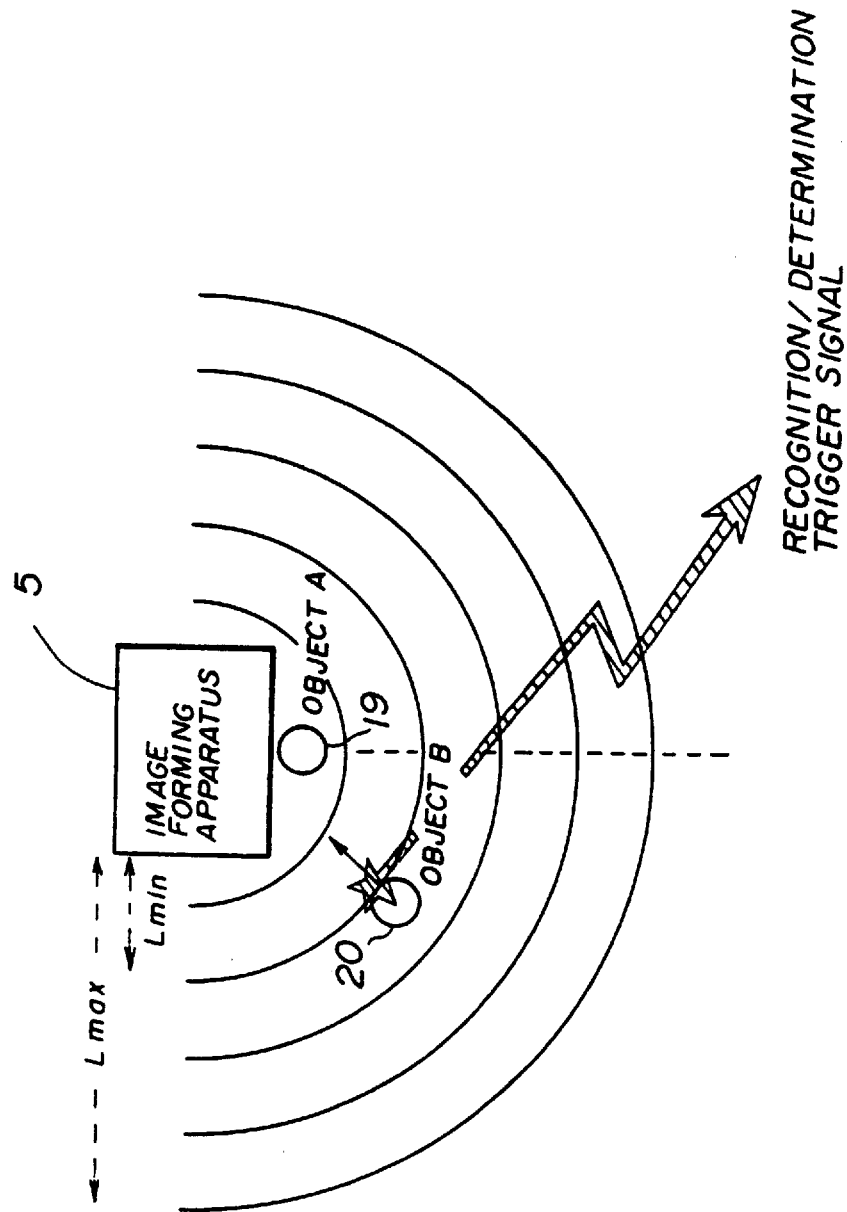
FIGS. 27A and 27B illustrate an example in which a plurality of objects exist within an area in which distance sensors are effective.
Figure 27B:
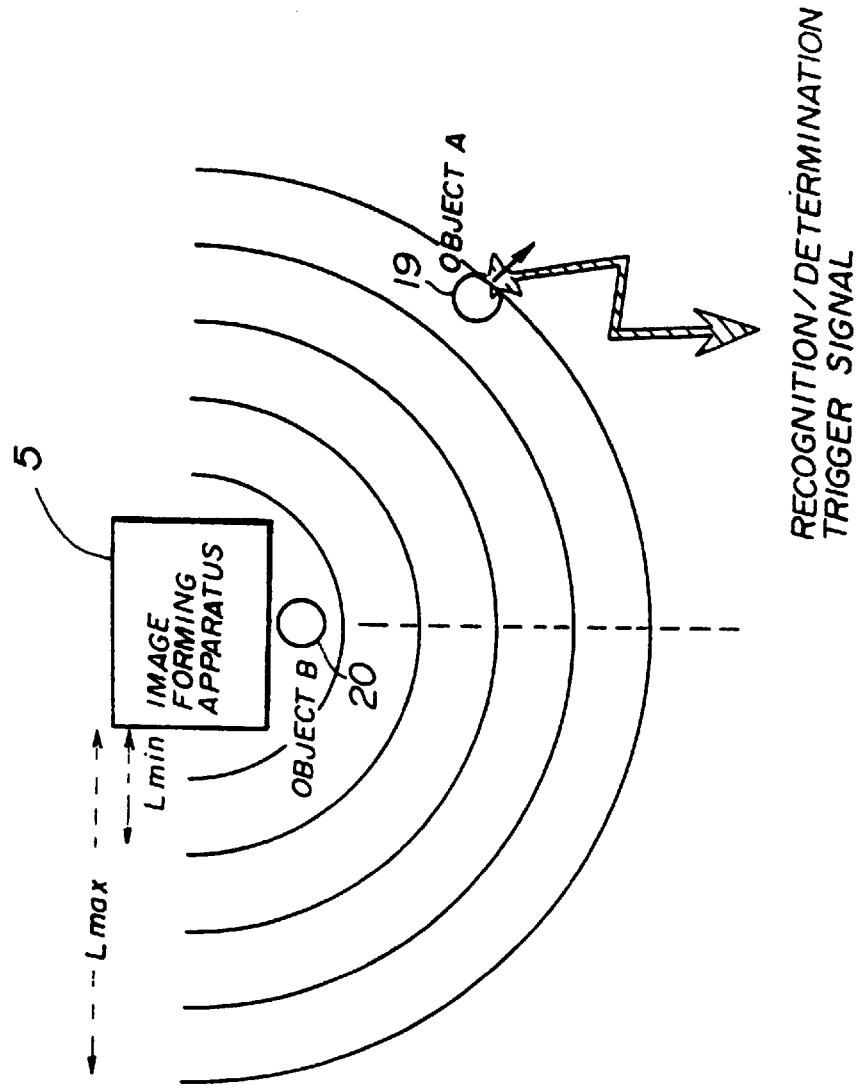

In one example of the above operations, as shown in FIGS. 27A and 27B, a plurality of objects exist within the measurable area of the distance sensors such as mentioned above. In the case of FIG. 27A, an object A has already started using of the image forming apparatus 5. Then, in the same case, another object B approaches the image forming apparatus 5 so as to use it. In this case, a recognition/determination trigger such as mentioned above is generated when the object B reaches a position a distance Lmin away from the image forming apparatus 5. Then, the recognition/determination sub-unit 9 determines that the object B will use the image forming apparatus 5. However, this determination should be either ignored or kept in an ineffective state. This is because, otherwise, the image forming apparatus 5 would provide services for the object B as a result, even though the object A is still using the image forming apparatus 5. Such a situation would result in erroneous functioning of the image forming apparatus.

In the case of FIG. 27B, an object B is using the image forming apparatus 5 while another object A which has finished using the image forming apparatus 5 recedes from the image forming apparatus 5. In this case, a recognition/determination trigger is generated when the object A reaches a position a distance Lmax apart from the image forming apparatus 5. Then, the recognition/determination sub-unit 9 determines that the object A has already finished using the image forming apparatus 5. This determination should be also ignored or kept in an ineffective state, otherwise, services for the receding object A would be provided even though the object B is still using the image forming apparatus 5. These services may comprise, for example, a pre-heating mode such as mentioned above being initiated; or an auto-reset function such as mentioned above being initiated. Such a situation would result in erroneous functioning of the image forming apparatus.

The following-processing unit 10 brings information from outside (from another part in the image forming apparatus 5) through the control unit 11 as needed. The information to be brought may comprise, for example, information as to whether or not a duplication operation is now being executed in the image forming apparatus 5. As a result, a determination executed for a object among a plurality of objects detected may be either ignored or kept in an ineffective state as appropriate so as to, for example, prevent determinations associated with the plurality of objects from conflicting with each other. Thus, the recognition/determination data is sent to the input/output control unit 12 only if a relevant situation change is required with certainty.

Functions of the control unit 11 will now be generally described.

(1) A timing process of each block:

Synchronization is established among each block (the sensor driving unit 7, parameter extraction unit 8, recognition/determination sub-unit 9, following processing unit 10, and input/output control unit 12) in the recognition/determination unit 3. This synchronization is for data transfer among the blocks. In one example where a block A transfers data to a block B in the recognition/determination unit 3, first the block A sends a data transfer request to the control unit 11. Consequently the control unit 11 sends a data receiving request signal to the block B, which indicates that data will be sent to the block B from the block A. Then, after the control unit 11 confirms that the block B has prepared for receiving data, the control unit 11 sends a data transmission request signal to the block A. As a result, after receiving the data transmission request signal from the control unit 11, the block A then initiates data transfer.

(2) A request process of each block:

Predetermined processes are performed for requests sent from each block in the recognition/determination unit 3. The requests may comprise, for example, a recognition/determination trigger signal such as mentioned above generated by the parameter extraction unit 8; a recovery request generated for a situation resulting from an occurrence of an error in a block as needed.

(3) Access control of the storing unit:

An appropriate arbitration operation is executed so as to prevent conflict of accessing operations as a result of a plurality of blocks simultaneously trying to access (reading data from and/or writing data into) the storing unit 13. Each block in the recognition/determination unit 3 can access the storing unit 13 only when the block gains an access right. Such an access right may be obtained from the control unit 11 by a block in response to the relevant request being sent by the block.

(4) Interface control of outside communications:

The control unit 11 receives signals such as a clock signal and/or a reset signal from the outside (other parts in the image forming apparatus 5) through the input/output control unit 12. Then, the control unit 11 establishes synchronization between the outside and each block in the image forming apparatus 5. The control unit 11 brings information from the outside (information as to a situation of the image forming apparatus 1, such as whether or not the image forming apparatus 1 is now working; or what information is being indicated on the input/display panel). Then, the control unit 11 transfers, to an appropriate block, the information necessary for performing recognition/determination.

The control unit 11 receives various requests from the outside through the input/output control unit 12. Then the unit 11 operates so as to respond to the requests. In one example of the operation, when the outside requests trajectory information for an object to be sent out, then the control unit 11 reads the relevant trajectory information from an appropriate area of the storing unit 13. Then, the read information is sent out through the input/output control unit 12.

An appropriate request(s) is (are) generated by the control unit 11 and then sent to the outside for exmaple to a relevant location where a situation arises such as an error occuring in the recognition/determination unit 3. The appropriate request may comprise, for example, to display an appropriate alert message on the input/display panel.

Functions of the input/output control unit will now be described.

The input/output control unit 12 acts as interface with the outside (other parts in the image forming apparatus 5) via the external I/F line 16. The unit 12 also acts as a buffer used for establishing synchronization with the outside. To establish synchronization as mentioned above, each input/output data signal is latched in the input/output control unit 12. Input/output signals transmitted through the input/output control unit 12 include various request signal(s) and timing signal(s) transferred between the recognition/determination unit 3 and the outside as well as determination data concerning an object, which data is generated by the following processing unit 10 and sent to the service provision unit 4.

The storing unit 13 comprises the RAM and ROM as mentioned above.

Functions of the service provision unit will now be generally described.

The service provision unit 4 has functions for driving various parts in the OA equipment 1 (image forming apparatus 5). The unit 4 then provides services resulting from various automatic response functions. Such automatic response functions respectively respond to various recognition/determination results generated by the recognition/determination unit 3. The service provision unit 4 also requests, as necessary, from the recognition/determination unit 3 more detailed information concerning an object.

The service provision unit 4 is a conceptual device. Thus, various methods may be devised so as to realize the unit 4. The functions of the unit 4 may comprise functions which can be realized by a software such as that originally included in a Central Processing Unit. It is preferable to realize such functions using such a software and not to provide a particular hardware for this realization.

Services that may be provided for a person will now be described.

The following services are then provided when an object (person) approaches the OA equipment 1 and determination data as to whether or not the object will use the OA equipment 1 is consequently sent from the recognition/determination unit 3.

(1) Artificial Intelligence (this term will be abbreviated AI hereinafter) pre-heating function;

(2) AI automatic power switching function;

(3) AI pressing-sheet (for pressing a draft sheet onto the platen glass on a duplicator as the OA equipment 1 when a hard copy is to be made from the draft) automatic open/close function;

(4) AI automatic interrupting function (for example, for interrupting present image forming functions so as to set other image-forming functions appropriate to an approaching person); and (5) Variable height function (for example, the height of the OA equipment 1 varies so as to be a height appropriate to the approaching person).

The following functions are then provided when a person who has been using the OA equipment 1 recedes from the OA equipment 1 and determination data relevant to the fact that the person has already finished using the OA equipment 1 is consequently sent from the recognition/determination unit 3.

(1) AI pre-heating function;

(2) AI automatic power switching function;

(3) AI pressing-sheet automatic open/close function;

(4) AI automatic interrupting function;

(5) AI auto-reset function (for example, similar to an auto-reset function such as mentioned above); and (6) AI left draft/hard-copy checking function (for example, for checking whether or not the user has forgotten a draft from which a hard copy has been made or the user has forgotten the resulting hard copy, on a duplicator such as the OA equipment 1).

Services that may be provided for an individual (person) will now be described.

The automatic response system according to the present invention may have another function that an approaching person is determined to be a corresponding individual and then an ID data concerning the individual is provided from the recognition/determination unit 3. In such system, the following services are then provided when an object (person) approaches the OA equipment 1 and determination data concerning whether or not the object, which object is an individual, will use the OA equipment 1 is consequently sent from the recognition/determination unit 3.

(1) AI automatic input-panel (or operation panel, such as an input/display unit as mentioned above) setting function (for example, for setting display thereon particular to the individual);

(2) AI guidance function (for example, guidance messages particular to the individual are displayed on the input/display unit);

(3) Managing function (for example, for performing management particular to the individual in using the OA equipment 1);

(4) AI automatic interrupting function (for example, for interrupting present image forming functions so as to set other image forming functions particular to an approaching person);

(5) AI auto-reset function; and (6) Message giving function (for example, for giving a message from a first individual to a second individual by displaying the message on the input/display unit).

User recognition/individual recognition using obtained image data will now be described.

The user recognition function will now be described.

In the automatic response system according to the present invention, described heretofore, the distance sensors such as infrared-ray sensors are used as the sensors of the system. Hereinafter, another kind of the automatic response system (this system will hence be referred to as the second automatic response system or simply the second system, and the system using the distance sensors will hence be referred to as the first automatic response system or simply the first system) according to the present invention will be described. This other kind of the system first obtains image data of an object, instead of measuring distance through distance sensors such as mentioned above. From the obtained image data, information is extracted which indicates, for example, an orientation of a body and/or a face of an object (person) who approaches the OA equipment 1. By analyzing the extracted information, the automatic response system executes recognition/determination as to whether the approaching object is a using person or a passing person.

FIGS. 1, 2, and 3 can be also used for this description since a basic construction of the second automatic response system is the same as for the first system. However, in the second system, the distance sensors 2 in the first system should be replaced by another kind of sensor such as using a CCD (Charge Coupled Device) or a MOS (Metal Oxide Semiconductor) or an image pick-up tube, for inputting image data. In the parameter extraction unit 8, necessary information is extracted from the input image data.

In one example, a person approaches the image forming apparatus 5, such as a duplicator, in which duplicator the recognition/determination unit 3 according to the second system is provided.

In particular to a case where there exist no obstruction, an ordinary person who intends to use the image forming apparatus 5 will come to the image forming apparatus 5 along a straight path. That is, the body orientation of the person is such as to face the image forming apparatus 5 head on during the person's approach.

In a case where an obstruction exists on a path toward the image forming apparatus 5, the obstruction thus preventing the person from approaching the apparatus 5 straightly. Even in such a case, by the time the person reaches the apparatus 5 the person has faced the image forming apparatus 5 at least several times. A position at which the person faces the apparatus 5 may comprise a position at which the person can view the apparatus 5. Such facing of the person's body is executed by the person so as to look straight at the apparatus 5. Thus, the face of the person usually will face the apparatus 5 straightly at least a few times.

Such a naturally occurring movement pattern of a person who approaches the apparatus 5 is previously stored as a reference rule to be used for the recognition/determination. Then the stored reference rule is used for determining whether an objective person is a user or passer-by. This determination may be executed by analyzing the movement of the objective person using the obtained image data by an appropriate method such as an appropriate image processing operation.

Figure 28:
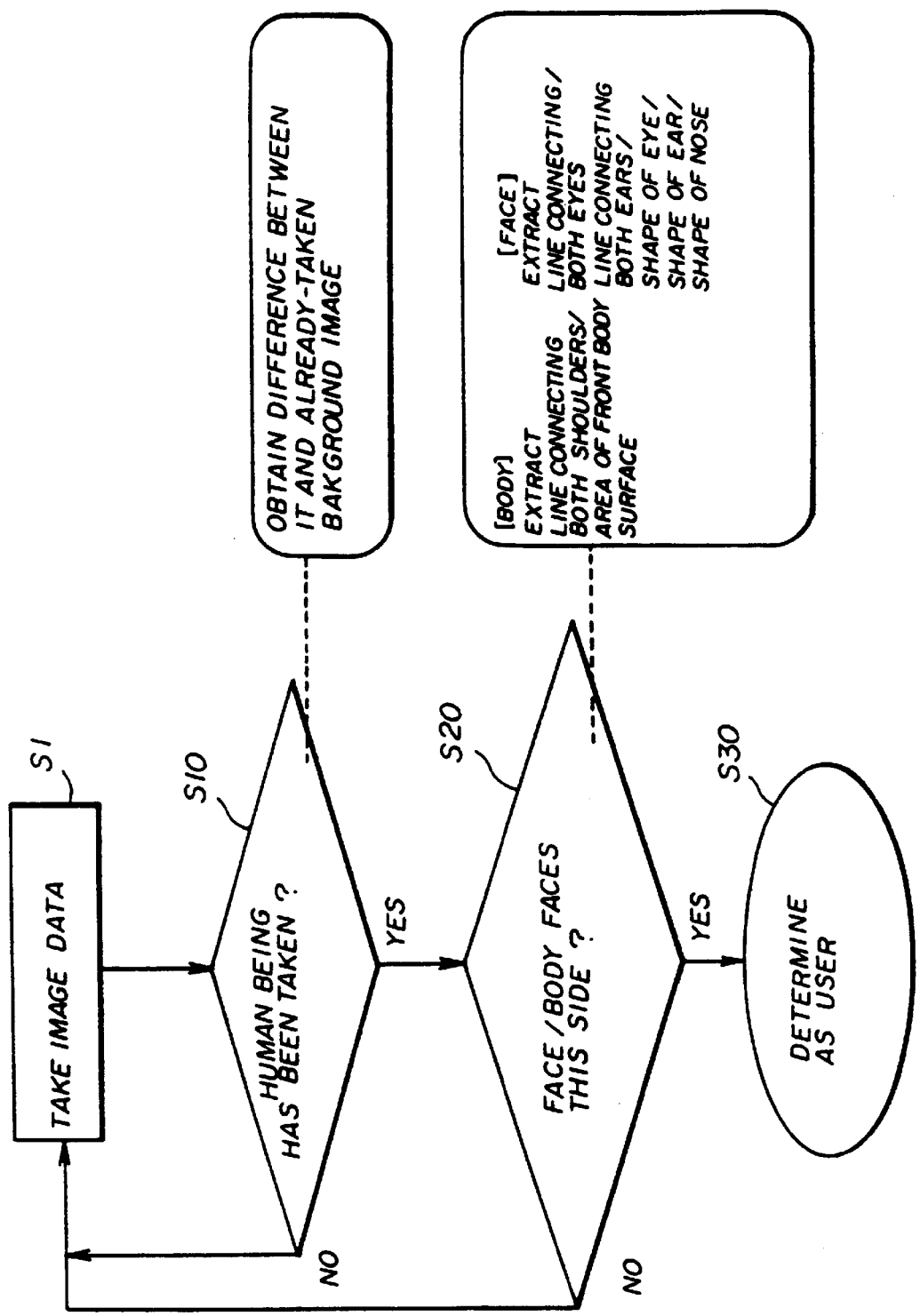
FIG. 28 shows an example of a process for determining, in accordance with the present invention, whether or not an objective person is to be a user of the image forming apparatus.

A method of such a determination will now be described for a simple example with reference to FIG. 28.

It is determined in step 10 (the term step will be omitted so that, for example, step 1 will be indicated as simply S1 hereinafter) whether or not the obtained image data includes image data concerning a human being. The obtained image data has been obtained as a result of inputting the image data using an appropriate inputting device such as mentioned above. For this determination, image data, which does not include image data concerning a human being, is previously input and stored to be used for reference data in the recognition/determination. Then, a difference is calculated between the currently input image data and the previously stored reference image data. In this method, as a result of this difference calculation, a background part is removed from the currently input image data. As a result the remaining part corresponds to a part which is not a background part and which should thus comprise a moving object, that is, an objective person.

Then a direction is detected in S20, in which direction the face or body of the objective person faces as per the thus obtained image data corresponding to the objective person. In this detection, it is sufficient to detect whether or not the face or body faces the image forming apparatus 5.

In a very simple example, a person whose image data has been obtained, may be determined as a user, as per the obtained image data, when the face or body thereof faces the image forming apparatus 5.

However, it will not be always reasonable to make this determination, for instance when the objective person faces the apparatus 5 only once. Such a simple determination method seems to not have sufficient accuracy in such a determination.

To improve such a simple determination method, a counter may be provided for counting how many times it is determined, by examining the relevant image data, that the objective person faces the image forming apparatus 5. Subsequently it may be determined that the objective person is a user when the count reaches a predetermined number i.e. a reference number of such times.

There is another way to improve the accuracy in such determination. In this way a direction in which the face or body of the objective person faces is measured so as to obtain a corresponding value such as an angle value. The determination is executed according to a series of data which indicates variation, due to time elapsing, of the direction angle (for example, 0° of a direction angle is assigned in a case where a face of an objective person faces the apparatus 5 head on, and a direction angle for a particular case is an angle formed between the 0° direction and a particular direction in which the face of the objective person faces). In this method, a series of data concerning a general movement pattern particular to a user is previously collected and stored as a table for reference. The determination may be executed by comparing the previously stored reference pattern table and the currently input series of data. Alternatively, an evaluation function may be made which uses the time and angle values such as mentioned above as parameters therefor, appropriate weighting parameters being added thereto.

Alternatively, fuzzy inference (inference using fuzzy theory) may be utilized in such determination. In this method, a movement pattern of the general user is previously defined by a natural-language reference rule such as, for example, the objective person is a user when the person faces the apparatus several times within a short time period. Such a natural-language reference rule may be used in the fuzzy inference so as to execute the determination.

Alternatively, a neural network may be utilized in such determination. In this method, a movement pattern of the general user is previously stored in the neural network. Then, data series obtained as a result of observation (data input through obtaining image) is input to the neural network so as to obtain output form the neural network as to whether or not the observed objective person is to be a user.

As mentioned above, in the recognition/determination unit 3 provided in the second automatic response system according to the present invention, the distance sensors 2 in FIG. 1 are to be replaced by an image inputting sensor such as a CCD. Further, input (obtained through the image inputting sensor) image data including an image associated with an approaching object (objective person) is then processed in the parameter extraction unit 8. Characteristic quantities (data/information) to be extracted in the unit 8 are such as concerning a direction, as mentioned above, in which direction a face or body of an objective person faces. Further, the recognition/determination sub-unit 9 executes determination operation utilizing a method(s) such as mentioned above: table reference, evaluation function, fuzzy inference, and/or neural network.

Individual recognition will now be described.

Recognizing an objective person as a particular individual is referred to as individual recognition. Such individual recognition may be categorized in two categories. One is recognition that determines an objective person to be a previously registered individual. This category of recognition will be referred to as registered individual identification. The second category is recognition that determines a currently observed objective person to be an individual the same as an objective person who was observed at a time previous time. This category of recognition will be referred to as one-by-one identification.

One example will be described for a method of such individual recognition mainly incorporated in the second automatic response system according to the present invention. Thus, in this example, image of an objective person is input and then obtained through an inputting device such as a CCD and then image data concerning the input image is appropriately processed so as to realize such individual recognition.

In this example, in FIG. 1, the distance sensors 2 are replaced by such image inputting sensor(s), and the recognition/determination unit 3 executes such individual recognition. The other construction is substantially identical to that of the first automatic response system. There, a plurality of image inputting sensors may be provided instead of the plurality of distance sensors 2. However, for the sake of simplicity in the description, simply one image inputting sensor is provided in the example described below.

In the first automatic response system a distance between an object and the image forming apparatus 5 is measured through the distance sensor such as mentioned above. It is also possible to measure a distance between an object and the image forming apparatus 5 through an image inputting sensor such as a CCD instead of the distance sensor. This distance measurement is enabled through present day image processing technique. For understanding such technique, the following literature will be referred to: a Japanese publication Robot, written by Yoshiaki Shirai, an extra number of bit, pp.711–724; and in a Journal of the Robotics Society of Japan, *Stereo Vision*, written by Kokichi Sugihara, Vol. 1, pp.30–35, 1983.

That is, such an image inputting sensor can be said to be one example of a distance sensor. One example for measuring a distance between an object and the image forming apparatus (or determining a position of the object with respect to the image forming apparatus) through a fixed image inputting (or obtaining) sensor will now be described. Image data coordinates associated with a foot position of an objective person is extracted from an image obtained through the image inputting sensor. Then the extracted coordinates are mapped on a coordinate space associated with the real space. Thus, the real space position of the object can be measured.

If a plurality of image inputting sensors may be used to measure a position of an object, a trigonometrical survey method can be applied so as to measure the distance toward the object. That is, a binocular stereo vision method is used there. Thus, a method for inputting or obtaining information concerning an object through means such as an image inputting sensor instead of a distance sensor can also act so as to enable a recognition/determination process such as used in the first automatic response system. Further, such a method inputting information concerning an object through means such as an image inputting sensor can also be effective to enable a recognition/determination process for the below-detailed individual recognition.

The above mentioned registered-individual identification will now be described.

Identification technique has been long known. Such identification technique is utilized for, for example, character (or letter) recognition or in the character reading technology field. A principle of such identification technique can be applied to the registered individual identification function.

The principle of the registered individual identification function will now be described. Previously a so-called dictionary is prepared in which characteristics are specified associated with individuals to be identified. Then, characteristics included in an observed and thus input or obtained data are extracted. Then, the extracted characteristics are compared with the characteristics previously specified for the respective individuals in the prepared dictionary. As a result, if it is determined that characteristics of an individual specified in the dictionary are identical to those of the extracted characteristics, then it can be determined that the observed person is the specified individual.

In addition to such an identificational approach, other methods may be applied, such as a table reference method such as mentioned above, an evaluation function method such as mentioned above, a calculation method of certainty factor, a fuzzy inference method such as mentioned above, or neural network method such as mentioned above.

As mentioned above, information concerning an individual or characteristics associated with an individual should be previously registered, as mentioned above, so as to be used in identification of an observed objective person. Such information may comprise any characteristics which can be obtained such as characteristics resulting from image processing operations. However, such information should comprise characteristics effective in identifying an individual. Such characteristics may comprise, for example, a height, weight (volume), sex, size and/or shape of a face and/or a body, presence or absence of eyeglasses.

When a height of an objective person is extracted from the relevant image data, a pixel number constituting the person's height (from the top of the head to the bottom of the foot) in the image are converted into real height information. In this conversion, information concerning a distance toward the observed objective person is used. Identification of the head and the foot in the relevant image can be realized using normal image processing techniques such as a binarization and filtering process, or knowledge engineering.

Identification of sex of an objective person is extracted can be realized using information concerning a hair style, footwear, presence or absence of make-up. Such information can be obtained through appropriate image processing techniques to be performed on the input or obtained image data.

Characteristics concerning a face of an objective person are considered to be effective and are often used for identifying the objective person to be an individual through image data. Such characteristics may comprise a relationship between each element and/or a shape of each element, for example, a distance between eyes, a shape of each eye, a profile of the chin, etc.

Utilization of such individual recognition function can improve user's operation efficiency and/or can reduce man power necessary in managing the relevant OA equipment.

In one example, such individual recognition function may be incorporated in an image forming apparatus such as a duplicator. In such a case, the following functions can be realized in a manner such as mentioned above: input/display panel (or operation panel) AI automatic setting function; AI guidance function; and AI automatic interruption function.

The above-mentioned one-by-one identification will now be described.

In this identification operation, characteristics are stored associated with a first objective person observed. Then, it is determined whether or not characteristics associated with a second objective person observed at a later time coincide with those associated with the first person. Thus, it is determined whether or not the first and second persons are identical to one another. In this operation, it is not necessary to previously register dictionary information including characteristics associated with each individual to be identified. However, certain information cannot be obtained from the above identification. Such information comprises information which thus needs to be manually input such as a name of the observed person.

A method for realizing the one-by-one identification is basically similar to that mentioned above for realizing the registered individual identification. As mentioned above, in registered individual identification, a comparison is executed between observed and then extracted characteristics, and characteristics associated with each individual previously stored as a dictionary. However, in the one-by-one identification, a comparison is executed between the observed/extracted characteristics and subsequent directly observed characteristics.

In the one-by-one identification, characteristics associated with an objective person observed are stored as a dictionary. Then, the stored characteristics are compared with characteristics associated with another objective person observed at a later time. In this storing of characteristics associated with an observed person, either characteristics associated with a latest observed person may only be stored or those associated with a plurality of observed person may be stored.

Utilization of the one-by-one identification enables, for example, to determine that a user of the apparatus changes. As a result, it can be then determined that a user has finished using the apparatus. It may be determined that the same person approaches the apparatus again after he or she receded from the apparatus. If so, it is determined that the same person is still using the apparatus if a time period for which the person was not located near the apparatus is within a predetermined time period. It may be determined that a second person approaches the apparatus after a first person receded from the apparatus. If so, it is determined that the first person has finished using the apparatus.

Further, if the apparatus comprises a duplicator, parameters (for example, parameters for specifying duplicating manners) may be automatically canceled (AI auto-reset function), as a result of the above-mentioned determination that the first person has finished the using thereof. Such cancellation of the preceding parameters may prevent a next user from performing an erroneous specifying (an erroneous specifying may be performed so that a next user does not know any modification having been performed on a default specification and he or she naturally expects the default specification should be set). Further, an AI automatic interrupting function such as mentioned above may also be realized using a result of the one-by-one identification even though a corresponding individual cannot be identified.

A sensor for detecting characteristics to be used in the one-by-one identification is not limited to a CCD. The sensor may comprise any type of sensor which can measure characteristics of a human being, for example, a color sensor, weight meter, or a sound sensor. A sensor for detecting characteristics to be used in the one-by-one identification may comprise a first category of sensor that is an image inputting or obtaining sensor such as a CCD, a single set of which can provide sufficient data needed for the identification. However, a second category of sensors may be used for providing data needed for the identification. A single set of a sensor of the second category may not provide sufficient data needed for the identification but a combination of sensors of the second type can provide a sufficient data for more accurate identification. In one example, the sensors comprising the distance sensors 2 shown in FIG. 1 are provided together with another type of sensors belonging the second category. These plurality of different types of sensors may be merely connected in parallel.

A method for processing recognition/determination parameters will now be described.

In this method, a method for setting initial conditions of predetermined measuring detecting areas will now be described.

As mentioned above, it is determined whether an approaching person approaches so as to use or operate a system (apparatus) incorporating the recognition/determination unit according to the present invention or whether he or she is merely a passer-by. Such determination may be executed more speedily or more reliably by using information concerning system circumstances. Such information is preferably previously recognized and stored. The term circumstance refers to circumstances associated with a position where the system is set, and comprises, for example, how an obstruction such as wall is arranged with respect to the system.

In one example of system circumstances, the system may be set at a position comprising the end of a blind-alley corridor. In this example, it can be determined that any person approaching the system is a user thereof in almost all cases.

A method for automatically recognizing a circumstance of the system, such as the system is set at the end of a blind-alley corridor will now be described.

To effect such recognition, information to be detected concerns a fixed object, such as a wall, which object interferes with or obstructs a person from going forward with respect to the image forming apparatus or OA equipment. Such a fixed object may be successfully recognized by the recognition/determination unit as follows. Such recognition may be executed by previously directly inputting/setting a relevant information to the recognition/determination unit by means of a service man or user, in an appropriate way. However, such inputting/setting must be executed every time the layout of objects around the system is varied. This may be troublesome. Alternatively, such relevant circumstance information such as mentioned above is preferably recognized automatically by the recognition/determination unit.

Such an automatic recognizing method will now be described.

The following three methods (a), (b), and (c) are considered for recognizing information or data (such data will be referred to as area data hereinafter) concerning an obstruction (fixed object) as an initial condition to be used in a active-object recognition/determination operation such as mentioned above. Such an obstruction to be recognized is one existing within a measurable detecting area of the area-data recognition/determination operation.

In a method (a), an area data to be stored comprises a value resulting from detecting at a time after a predetermined time period elapses since power was switched on in the system. Such an area data is obstruction data obtained as a result of determination due to regular light reception/data reception.

A sensor, such as mentioned above, which can at least detect a distance to an object (the term object meaning a simple object and not always meaning an active object) is initiated after a predetermined time period elapses since power was switched on in the system. Then, if any object is detected through the sensors, it is determined that the detected object is a fixed object (obstruction). Then information concerning the detected object is stored as an initial condition such as mentioned above.

At a time just after power is switched on in the system, a person who switched the power on exists there. If such detection for obtaining the circumstance information is executed then, it is determined that the person is a fixed object. To prevent such an erroneous determination, a time when the sensor is initiated is to be a time after a predetermined time period, as mentioned above, such as for example one minute.

One example will now be described where sensors such as mentioned above are used for area-data recognizing and wherein setting then takes place an initial condition such as mentioned above.

FIGS. 1 and 2 will be again referred to. The system (OA equipment 1 or image forming apparatus 5) incorporating the recognition/determination unit 3 according to the present invention also incorporates the sensors 2. The sensors are mounted in the system so that the sensors face respective directions. A user may switch power on in the system. A time of this switching on of power may be easily detected through any number of ways, for example, power switching on in the recognition/determination unit 3 may be linked with the power switching on of the entire system. An appropriate timer is provided in the recognition/determination unit so that each sensor is initiated for performing predetermined measurement after the predetermined time, such as for example one minute by a function of the timer, elapses. These sensors respectively have abilities for at least performing measurements concerning the direction in which any object exists and concerning the distance by which the object is apart from the system. In one example shown in FIGS. 4 and 5, data concerning a detected object comprises a combination of a direction and distance such as mentioned above. As a result of such measurement, it is recognized, and then the corresponding information is stored, that an obstruction(s) exists at positions indicated as #1–#13, #15–#19.

In the method (b), area data such as mentioned above is updated by current data using a value resulting from detection executed each time a predetermined time interval elapses since power was on the system and repeatedly thereafter.

The sensors are initiated repeatedly for each time when a predetermined time interval elapsing starting form the time power is switched on in the system. During this repeating detection, comparison is performed each time, between data obtained by a preceding detection of the sensors and data obtained by a current detection of the sensors. As a result comparison information as to where a fixed object exists is periodically recognized and updated.

It should be noted that a fixed object is detected as existing at a same position by every sensor's detection unless a change occurs as a result of, for example, layout change of objects in the vicinity. Further, a passer-by who is neither an obstruction nor a fixed object may be detected once. However, he or she should not be detected at the next detection chance or should not be detected at a subsequent detection because he or she should recede soon from a measurable area of the sensors such as mentioned above. Thus, it can be recognized that an object which is always detected at a fixed position is a fixed object. This can be realized by a sensor detection repeated, for example, every five minutes and a result of past detection being stored.

The above-mentioned predetermined time period may be appropriately selected. It is not necessary to always execute such detection, that is, it is not necessary to repeat such detection with a highest possible frequency merely to detect area data such as mentioned above. If the sensors are continuously driven for another purpose, it is also possible to utilize data from the continuously driven sensors, such detection providing higher reliability. However, if it is not necessary to continuously drive the sensor for any other purpose, a predetermined time interval period may be appropriately selected so as to save power.

In such a repeating detection method, at least a detection result comprising data obtained at one detection time should be stored and the stored detection result may be updated every detection time. However, it is also possible to store plural detection results comprising data obtained at respective plural detection times simultaneously. Such a storage of results of plural detections may improve reliability of the area-data recognition but may cause a rise in cost required for the area-data recognition.

In the case where only one detection result is simultaneously stored and it is updated every time such as mentioned above, a preceding detection result may comprise, for example: θ=15° and distance=3 m; and θ=80° and distance=2 m (that is, something is detected at each of these two positions). Then, a subsequent detection (after the predetermined time interval elapses since the preceding detection) result comprises: θ=30° and distance=4 m; and θ=80° and distance=2 m. It is then recognized/determined that a fixed object (obstruction) exists at the position: θ=80° and distance=2 m. Then data: θ=30° and distance=4 m; and θ=80° and distance=2 m is stored as the preceding detection with respect to the next-detection process.

In the case where results of plural detections are stored simultaneously as mentioned above, the determination is executed similarly. In one example, results from five detections are to be stored simultaneously. In this example, it is determined that a fixed subject exists there if something is detected at the same position according to three successive detections. In the example, it is determined that a candidate for a fixed object exists if something is detected at one position according to four not-always-successive detections from among six detections consisting of the five preceding detections and the current detection. As a result, accuracy in the area-data determination/recognition of an obstruction can be improved.

Such an area-data recognition/determination method is effective not only for a situation where an obstruction or fixed object comprises a real stationary object such as a wall, but, is also effective for a situation where an originally active object or moving object becomes for some reason an obstruction. This situation arises, for example, when a second apparatus such as word processor is set near the system incorporating the recognition/determination unit according to the present invention. Then, a user for the word processor may sit in front of the word processor so as to operate it. Thus, the user of the word processor becomes a substantial obstruction for a user of the first apparatus. Such effectiveness of the area-data recognition/determination method may enable obtaining an accurate setting circumstance, that is, initial conditions such as mentioned above.

In the above-mentioned method (c), area data such as mentioned above is obtained as a result of detection at a predetermined time. Then, the obtained area data may be updated by a result of subsequent detections.

In this method, a time when area data is recognized is limited to predetermined times. The predetermined times are times when there is basically no active object in the vicinity of the system incorporating the recognition/determination unit according to the present invention. The sensors may be active constantly or may be active irregularly. However, it is appropriately determined whether or not detection results from the driven sensors should be reflected on the current area-data recognition/determination results. Consequently, only appropriate detection results are recognized and stored.

Such predetermined times may comprise the following four times (i), (ii), (iii) and (iv).

(i) Not-working time:

Such area-data measurement/detection operation is executed at a time when the system incorporating the recognition/determination unit according to the present invention is not being used or is not performing work.

It can be basically assumed that while the system is not performing work, no active object is present in the vicinity of the system. As a result, executing such area-data measuring/recognition operation at the not-performing-work time should result in a determination that detected objects comprises existing obstructions.

In this method, recognition may be executed as a result of performing only one detection, in which detection it is determined that objects detected at such time comprise existing obstructions. Instead, it is also possible to execute recognition as a result of plural detections, in which recognition it is determined that an obstruction exists if objects are detected at a fixed position many times among the plural times of measurement.

(ii) Night time (using an appropriate timer):

Normally, no active object is present in the office at night. Thus, such area-data measurement/recognition may be carried out at night. Using an appropriate timer such as a one-day timer, the sensors are initiated at night. Consequently, if an object is detected somewhere, it is determined that the detected thing comprises an obstruction, such as a wall.

Instead using a timer for the above activation, it is also possible to determine that the current time is an occasion when no object is present there by detecting intensity of light in the room where the system is set. As a result of more surely determining an occasion where no object is present there, it is possible to execute the area-data measurement/ recognition operation at this occasion. This results in more reliable area data.

An appropriate time within night time, for example, three o'clock may be selected as the time to execute obstruction detection for the area-data measurement/recognition. Such setting may be preset as a default setting and then a user may change the setting. Alternatively, if an ON/OFF timer is originally provided for automatically switching power on and off in the system incorporating the recognition/ determination unit according to the present invention at an appropriate time, such a timer may be utilized. In this case, a chance when the sensors are to be active may be selected at a time such as a time when the ON/OFF timer switches power off in the system; at a time just before the timer switches power off in the system; and/or at a time at the time just after the timer switches power on in the system.

In such a method, at least once measurement is sufficient. Then, if an object is detected somewhere at the time, it can be determined that the detected thing comprises an obstruction. In addition, in order to make the result be more reliable, repetition of the detections, at night, while no object is present may be executed so that it may be determined that an obstruction exists at a position only if the detected thing is detected many times at the same position.

(iii) Weekend (using a weekly timer):

Normally no object is present in the office during weekend. Thus, an obstruction detection for the area-data measurement/recognition may be effectively executed during weekend.

The sensors are initiated during weekend while no object is present. This initiation is realized using means such as an appropriate weekly timer or a calender function. If an object is detected then, it is determined that the detected thing comprises an obstruction, such as a wall.

A day when the sensors are to be initiated may be preset as a default setting, for example, at every Sunday. Then, the default setting may be changed by a user as desired.

In such a method, at least one detection is sufficient. Then, if an object is detected somewhere at this time, it can be determined that the detected thing comprises an obstruction. In addition, in order to make the result be more reliable, several detections may be executed so that it is determined that an obstruction exist at a given position only if the detected thing is detected many times at the same position.

(iv) Arbitrary initiating of the sensors:

In this method (iv), a user may initiate the sensor as desired through, for example, pushing an initial condition setting button. Then, a user or a system-installation staff or manager may specify or may push the button at an occasion when he or she determines appropriate to set an initial condition. Such an occasion may comprise an occasion, for example, when a layout of furnitures and equipment including the system incorporating the recognition/determination unit according to the present invention in the room has been finally fixed. However, in practice he or she may be undesirably detected by the sensors at the time when he or she specifies so. To prevent such a situation a so-called self-timer or autotimer may be used so as to automatically allow a time period, for example, several seconds, between a time when he or she inputs the specification and a time when the sensors are actually initiated. Then, the user should recede from the effective range of the sensors.

Alternatively, utilizing a means such as an infrared remote controller may prevent a situation such as mentioned above where the user may be undesirably detected. Then, the user may input the relevant specification using such a remote controller in a state where the user is located outside the effective range of the sensors.

A method will now be described in which determination such as will use/will not use or using/finished using is speedily executed using area data concerning circumstances of the apparatus or machine such as mentioned above.

A machine set-circumstance data (area data) set as an initial condition as mentioned above may comprise information concerning the following situation. The machine or apparatus incorporating the automatic response system according to the present invention may be set at a corner of a room. If so, it can be determined or recognized that an object (moving object) merely approaching the machine accordingly will always use the machine. Thus, there is an occasion where a person merely coming into the vicinity of the machine accordingly will always be determined as a user, according to the machine circumstance. It can be determined that a person approaching the machine will always use the machine in the example of a machine located at the end of a blind-alley corridor for instance.

Such machine set-circumstance data (area data) can be obtained by a method mentioned above. The machine set circumstance data may be used in determining whether or not there is a possibility of a person merely passing-through near the machine. Area data may indicate that there is no possibility of a person merely passing through in front of the machine because the machine set circumstance does not physically allow it. If so, the recognition/determination unit according to the present invention can determine that a person coming near the machine will always use the machine.

There may be a case where the automatic response system according to the present invention is provided with a plurality of sensors which respectively face in a plurality of directions. In such a case, sensors of the plurality of sensors may be deactivated, the sensors measuring in directions in which it was determined an obstruction(s) exists. This deactivating may save power.

There may be a circumstance of the machine which circumstance allows a determination that approaching persons are almost always users and also which allows a determination that there is physically no possibility of a person passing through in front of the machine unless the person will be a user. Such a circumstance condition may comprise that the machine is set at the end of a blind-alley corridor or at a corner made between two walls which are continuous with one another, for instance.

There is also a case where a person can only pass in front of the machine or pass only at either the right or left side of the machine. In such a case, the recognition/determination recognizes as initial condition that persons approaching the machine are almost always users of the machine.

Thus, speedy, accurate and easy determination of users can be executed if a machine set circumstance condition allows it.

The above description indicates a method for recognition/ determination solely as to whether or not an approaching person is a person who will use or will not use the machine. However, a principle similar to the above described method can be used for a method for recognition/determination as to whether or not a person receding from the machine is a person who is using or has finished using the machine.

A method will now be described for recognition/ determination as to whether or not a plurality of active objects (moving objects) existing within a detecting measuring area will use or will not use the machine. Such a method comprises two kinds of methods. In a first method, such recognition/determination will be executed only using distance data. Both distance data and direction data are used in the second method. The first method will now be described using an example. In the example, for the sake of simplicity of description, the plurality of moving objects is limited to comprising two moving objects.

A case where two objects both approach the machine will now be described. If two moving objects approach along a same direction, the object farther from the OA equipment is hidden behind object nearer thereto when viewed from the recognition/determination unit according to the present invention. Thus, measurement for the farther object cannot be executed. As a result, the recognition/determination is executed only using data concerning the nearer object.

Figure 29A:
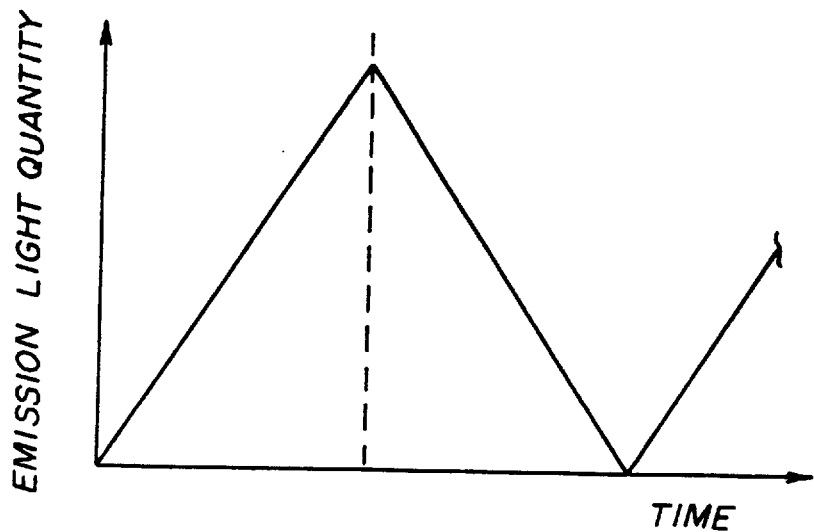
FIGS. 29A and 29B illustrate a recognition method according to the present invention, in which method a plurality of objects are recognized using rippling infrared rays being emitted.
Figure 29B:
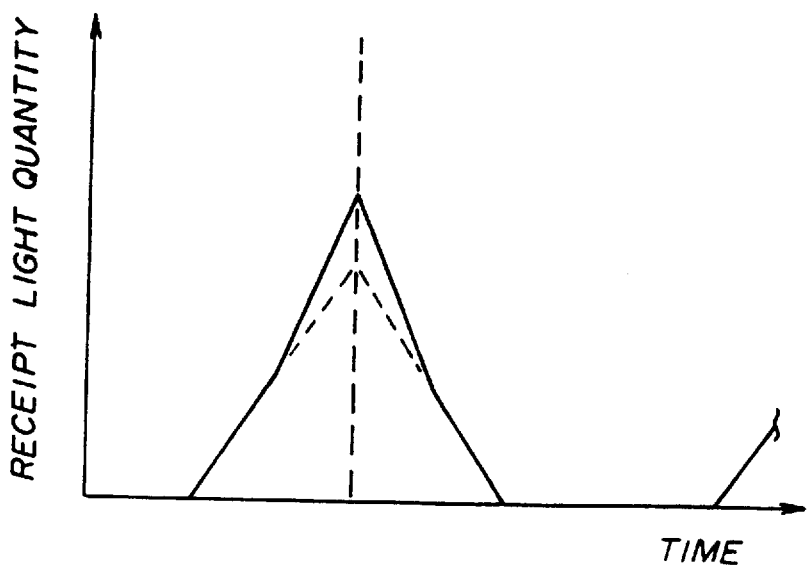

If two objects approach along different directions, for example, infrared rays are emitted in a ripple manner, as shown in FIG. 29A, by the sensor, and the reflected light quantity is measured by the light quantity meter. As a result, the receipt light quantity varies as shown in FIG. 29B. In FIG. 29B, the upward protrusion of the variation curve comprises two combined protrusions for one period of the ripple-manner light emission of infrared rays. This is because the receipt light occurs as a result of reflection by two or more objects respectively existing along different directions. Then, the variation manner of the reception light quantity is used for a determination through appropriate determination means such as a neural network. The determination is to recognize the plurality of moving objects and then determine whether or not each object of the plurality of moving objects is a user of the machine.

There another case where there may be two objects and one of the two objects approaches the machine while the other passes by. In this case, one of the two objects may be hidden by the other when viewed from the sensor. Otherwise the two moving objects can be respectively recognized. The other object may pass by so as to hide the approaching object from the sensor. In this case, the recognition/determination unit continues the determination for the passing-by object. The recognition/determination unit predicts movement of the approaching moving object while it is hidden by the passing-by object. This prediction may be executed using data taken before the approaching object was hidden. Then after the approaching object reappears from the behind the passing by object, the recognition/determination unit again traces the movement of the approaching object.

There may be another case where the passing-by object passes by behind the approaching object so as to be hidden from the sensor. The recognition/determination unit, having started tracking of the objects before this hiding took place, predicts movement of the passing-by moving object while it is hidden by the approaching object. This prediction may be executed using data taken before the passing-by object has been hidden. Then after the passing-by object appears from behind the approaching object so as to stop being hidden from the sensor, the recognition/determination unit again traces the movement of the passing-by object. However, the first priority of the recognition/determination is for the approaching moving object rather than for the passing-by object.

There may be a case where both a first moving object determines as an approaching object and a second object determined as a passing object exist within the detecting measuring area of the sensor(s). In this case, the recognition/determination unit may determine that the second object comes nearer to the machine or apparatus than the first object. Then, the object for which first priority of recognition/determination is given is changed from the first object to the second object.

A method in which both distance data and direction data is used for the recognition/determination will now be described. A case where both objects approach further has two cases: they approach along a same direction; and they approach along different directions. If they approach along the same direction, detection of the hidden object through the sensor cannot be executed because one hides the other from the sensor. Consequently the recognition/determination should be executed only using distance and direction data concerning the nearer object.

If they approach along respective different directions, the respective sensors can detect their movement. Thus the recognition/determination unit can recognize them as respective different moving objects. Consequently the recognition/determination as to whether or not each of them will use the apparatus is executed using the respective movement.

There may be a case where one approaches while the other passes by. In this case, one may be hidden from the sensor(s) by the other. Otherwise these moving objects can be recognized as the respective different objects by the method mentioned above. The other object may also pass by so as to hide the approaching object from the sensor. In this case, the recognition/determination unit continues the determination for the passing-by object. The recognition/determination unit predicts movement of the approaching moving object while it is hidden by the passing-by object. This prediction may be executed using data taken before the approaching object was hidden. Then after the approaching object appears from behind the passing-by object so as to stop being hidden passing-by object from the sensor, the recognition/determination unit again traces the movement of the approaching object.

There may be another case where a passing-by object passes behind an approaching object so as to be hidden from the sensor thereby. The recognition/determination unit predicts movement of the passing-by moving object while it is hidden by the approaching object. This prediction may be executed using data taken before the passing-by object was hidden. Then after the passing-by object reappears from behind the approaching object so as to stop being hidden from the sensor thereby, the recognition/determination unit again traces the movement of the passing-by object. However, the first priority of the recognition/determination is for the approaching moving object rather than for the passing-by object.

Such a first priority of the recognition/determination is given to the object nearest to the apparatus. If there are a plurality of nearest objects, the first priority is given to the object approaching fastest.

A method will now be described in which recognition/determination is executed as to whether or not an object who was a user of the apparatus is still using the apparatus. In one example, infrared-ray emission means and infrared-ray receiving means are provided in the image forming apparatus according to the present invention. The infrared-ray emission means emits light, then the light is reflected by the object, and then the reflected light is received by the infrared-ray receiving means. Thus the distance between the image forming apparatus and the object in the vicinity of the image forming apparatus is detected by the detecting means also provided therein. Then, the obtained distance is used for the recognition/determination. Thus it can be predicted that an actual user is a person who is located nearest the image forming apparatus. Consequently the moving object is nearest the image forming apparatus is traced so that it is determined whether or not the traced moving object is still the actual user of the image forming apparatus.

If both distance and direction data are used for above recognition/determination, a method similar to the method solely using distance data may be used. In the case where both kinds of data are used, a number of the sensors to be used may be thinned (thus reduced) or a detecting time interval may be lengthened so as to reduce a burden on the sensors. There is another recognition/determination method as follows.

Figure 30:
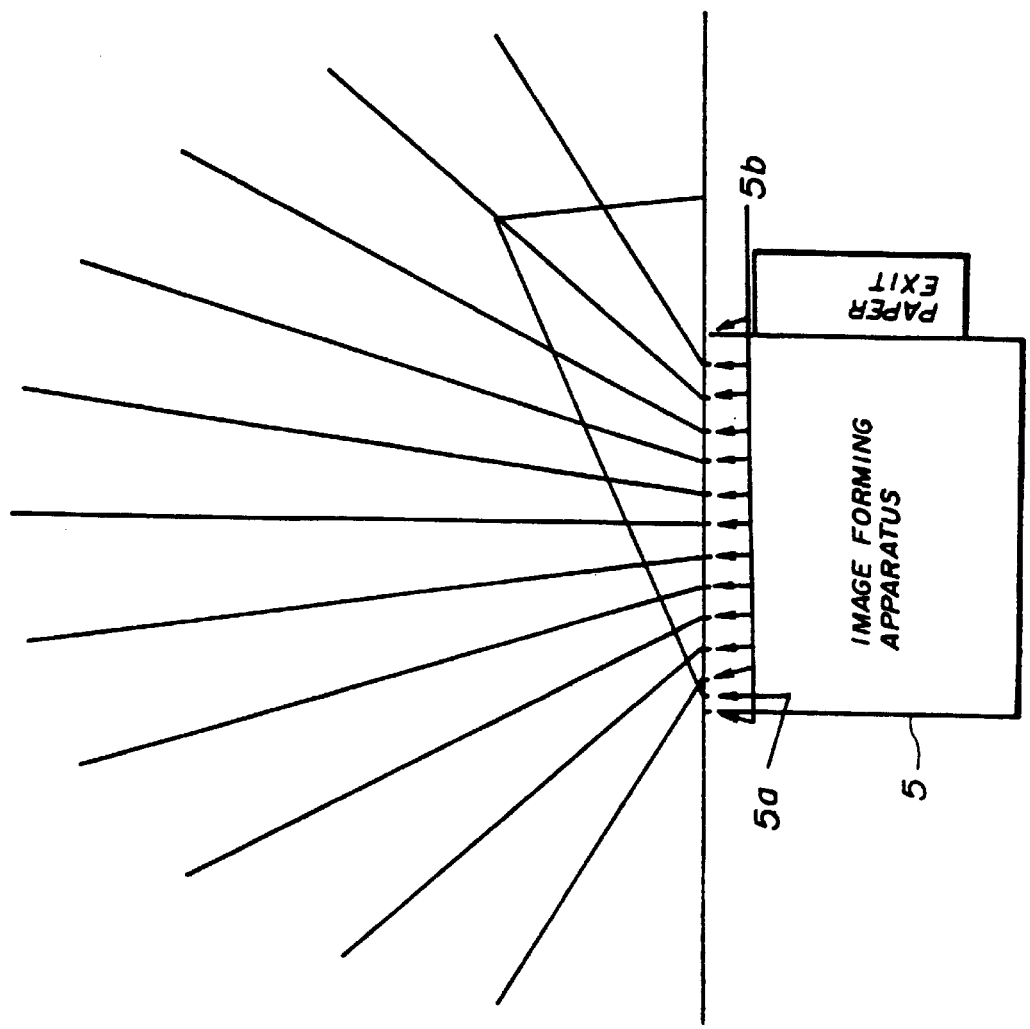
FIG. 30 illustrates an example of a determination method according to the present invention in which it is determined, using infrared-ray sensors and supersonic-wave sensors, whether or not an object is to be a user.

FIG. 30 shows an image forming apparatus according to the present invention in which distance and direction data is used for determining of user. This image forming apparatus comprises infrared-ray sensor 5a comprising infrared-ray emission means and infrared-ray receiving means. The image forming apparatus also comprises a plurality of supersonic-wave sensors 5b. The detecting range of the infrared-ray sensor 5a extends from a position in front of an end of the image forming apparatus, which end is not the end where a paper exit is provided, toward a position in front of the end where the paper exit is provided. The detecting range of the infrared-ray sensor 5a is an area near the image forming apparatus.

The infrared-ray sensor 5a is not been active, while the supersonic-wave sensors 5b detects moving object(s) for determining whether or not the detected object is a user of the image forming apparatus until the image forming apparatus is used or operated by someone.

When the image forming apparatus is used or operated, the detection by means of the supersonic-wave sensors and the consequent determination is stopped, simultaneously the infrared-ray sensor 5a becomes active and begins detecting the user. That is, the recognition/determination unit incorporated in the image forming apparatus determines that using of the apparatus is being continued while an object continuous to be detected by the infrared-ray sensor 5a. Then when no object is detected by the infrared-ray sensor 5a, the infrared-ray sensor 5a becomes inactive. Simultaneously the supersonic-wave sensors start a detecting operation and the recognition/determination unit determines that using of the apparatus is finished. Accordingly the recognition/determination unit appropriately determines whether or not the user continues to use the apparatus.

A method will now be described in which the recognition/determination unit determines whether or not a measuring object (moving object) has finished the using of the image forming apparatus.

A method where the recognition/determination unit effect determination using only distance data will now be described. In this method, various cases may be concerned. First if only a user exists within the detecting area, the recognition/determination unit determines that the user has finished the using when the user goes so as to become apart from the apparatus by more than a predetermined distance or completely recedes from the detecting area. That is, the detecting means determines that the user has finished the using when the detected user goes so as to become apart from the apparatus by more than a predetermined distance or completely recedes from the detecting area. Such determination by the detecting means is executed in the case where only the user of the apparatus exists within the detectable area where the distance to the object can be detected.

There may be a case where the current user is replaced by a waiting person. In this case, the waiting person may not be detected by the sensors associated with the recognition/determination unit while the current user is using the apparatus. If so, the recognition/determination unit determines that the current user has finished the using when the user goes so as to become apart from the apparatus by a predetermined distance and then another object approaches the apparatus so as to be nearer than the current user is. Consequently the recognition/determination unit switches the object to be measured from the current user to the approaching object. That is, there is a case where a plurality of persons, including the current user, exist within the detectable area where a distance to an object can be detected. Then the detected current user may go apart from the apparatus by the predetermined distance. Then after that, another person may be detected who approaches the apparatus so as to be nearer than the current user is. If so, an object to be detected is changed to the new approaching person and it is determined that the current user has finished the using.

A method will be now described in which such a determination is executed using both distance and direction data. There are also various cases to be considered. First if only a user exists within the detecting area, the recognition/determination unit determines that the user has finished the using when the user goes so as to become apart from the apparatus by more than a predetermined distance or completely recedes from the detecting area. That is, the detecting means determines that the user has finished the using when the user goes so as to become apart from the apparatus by more than a predetermined distance or recedes from the detecting area. Such determination by the detecting means is executed in the case where the user of the apparatus solely exists within the detectable area where the distance to the object can be detected.

There may be a case where there is a person other than the current user. In this case, the recognition/determination unit determines that the current user has finished the using when the user goes so as to become apart from the apparatus by a predetermined distance and then the other person approaches the apparatus so as to be nearer than the current user is. Consequently the recognition/determination unit switches the object to be detected from the current user to the thus approaching person. That is, there is a case where only the user exists within the detectable area where a distance to an object can be detected. There, the detected current user may go apart from the apparatus by the predetermined distance. After that, another person may be detected who approaches the apparatus so as to be nearer than the current user is. If so, it is determined that the current user has finished the using.

Utilization of such a determination method enables detection of a time when a current user has finished the using and enables proceeding to various operations carried out in the apparatus, which operations are to carry out consequent to this detection smoothly and surely.

Each embodiment of an image forming apparatus, according to the present invention, such as mentioned above and which has an AI pre-heating function and/or an AI automatic power switching function such as mentioned above will now be described.

Such an AI pre-heating function comprises basic two functions A and B, and other two functions C and D, as described below.

A: If it is determined that there is a person, among person(s) approaching the machine, who approaches the apparatus or machine so as to use it, a display on the input/display unit or operation panel is automatically changed to a displayable condition, or the pre-heating function such as mentioned above is automatically canceled or switched to an OFF state.

B: If it is determined that there is a person, among person(s) receding from the machine, who recedes from the apparatus or machine because he or she has finished the using, a display on the input/display unit or operation panel is automatically changed to an un-displayable condition, or the pre-heating function such as mentioned above is automatically switched to an ON state.

C: A pre-heating temperature economy function (a function by which a pre-heating temperature is controlled so as to save power consumption).

D: A pre-heating time variable control function (a function by which a time when the pre-heating is controlled so as to save power consumption).

Such an AI automatic power switching function comprises two basic functions A and B, and other function C, described below.

A: If it is determined that there is a person, among person(s) approaching the machine, who approaches the apparatus or machine so as to use it, power is automatically switched on in the machine for the approaching person.

B: If it is determined that there is a person, among person(s) receding from the machine, who recedes from the apparatus or machine because he or she has finished the using, power is automatically switched off in the machine.

C: Power ON time variable control function.

The OA equipment 1 shown in FIG. 1 (or the image forming apparatus 5 shown in FIG. 2) is provided with the recognition/determination unit 3. The equipment 1 can determine whether or not there is a person approaching so as to use the equipment 1, among persons approaching the equipment 1. The equipment 1 can also determine whether or not there is a person, who recedes from the equipment 1 because he or she has finished the using of the equipment 1, among persons who recede from the equipment 1. As a result of such determination, the equipment 1 can perform, for each of the above-mentioned functions, an input/display control, pre-heating temperature control, and power-switching control, described below.

The input/display control will now be described.

[Basic function A]

This basic function A comprises functions described as the items (1), (2) and (3) in the SUMMARY OF THE INVENTION mentioned above. However, a functional apparatus described therein acts as the above equipment 1.

[Basic function B]

This basic function B comprises functions described as the item (4) in the SUMMARY OF THE INVENTION mentioned above. However, a functional apparatus described therein acts as the above equipment 1.

The pre-heating temperature control will now be described.

[Basic function A]

This basic function A comprises functions described as the item (5) in the SUMMARY OF THE INVENTION mentioned above. However, a functional apparatus described therein acts as the above equipment 1.

[Other function D]

This other function D comprises functions described as the items (6) and (7) in the SUMMARY OF THE INVENTION mentioned above. However, a functional apparatus described therein acts as the above equipment 1.

[Basic function B]

This basic function B comprises functions described as the item (8) in the SUMMARY OF THE INVENTION mentioned above. However, a functional apparatus described therein acts as the above equipment 1.

[Other function C]

This other function C comprises functions described as the items (9), (10), (11), (12), (13) and (14) in the SUMMARY OF THE INVENTION mentioned above. However, a functional apparatus described therein acts as the above equipment 1.

The power switching control will now be described.

[Basic function A]

This basic function A comprises functions described as the item (15) in the SUMMARY OF THE INVENTION mentioned above. However, a functional apparatus described therein acts as the above equipment 1.

[Basic function B]

This basic function B comprises functions described as the item (16) in the SUMMARY OF THE INVENTION mentioned above. However, a functional apparatus described therein acts as the above equipment 1.

[Basic function C]

This basic function C comprises functions described as the items (1), (2) and (3) in the SUMMARY OF THE INVENTION mentioned above. However, a functional apparatus described therein acts as the above equipment 1.

Operations in the above-mentioned present invention will now be described in detail.

Figure 31:
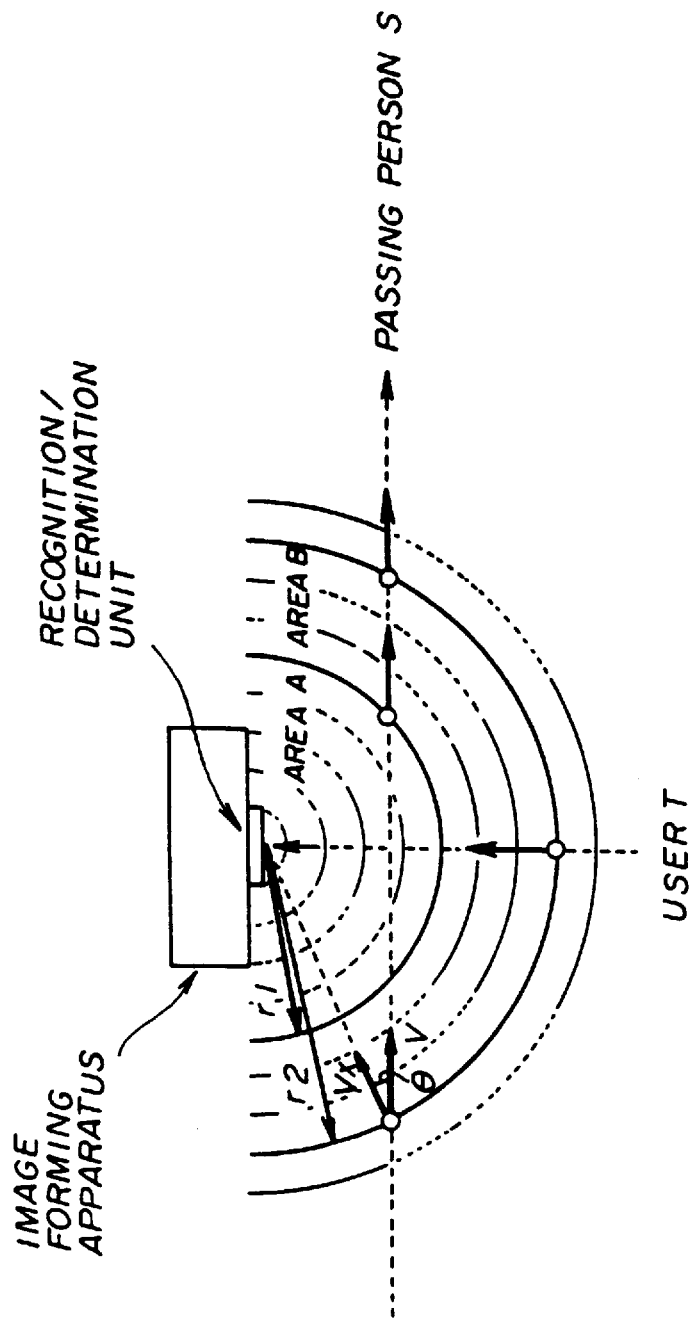
FIG. 31 illustrates a principle of operation according to the present invention.

FIG. 31 is used for describing a principle of the operations in the present invention. As mentioned above, the image forming apparatus 5 is provided with the sensor unit. Then the recognition/determination unit 3 receives the signal from the sensor unit. Then, using the received signal, the recognition/determination unit 3 determines existence of a person(s) around the image forming apparatus 5. The recognition/determination unit 3 also determines distance between the detected person(s) and the image forming apparatus 5. There, an area within a distance $r_1$ from the image forming apparatus 5 will referred to as an area A; and an area between distances $r_1$–$r_2$ from the image forming apparatus 5 will be referred to as an area B. The recognition/determination unit 3 then determines whether or not the detected person(s) is using or has finished the using the image forming apparatus 5; and whether the detected person (s) will use or will not use. This determination is executed using the distance information received from the sensor unit.

Figure 32:
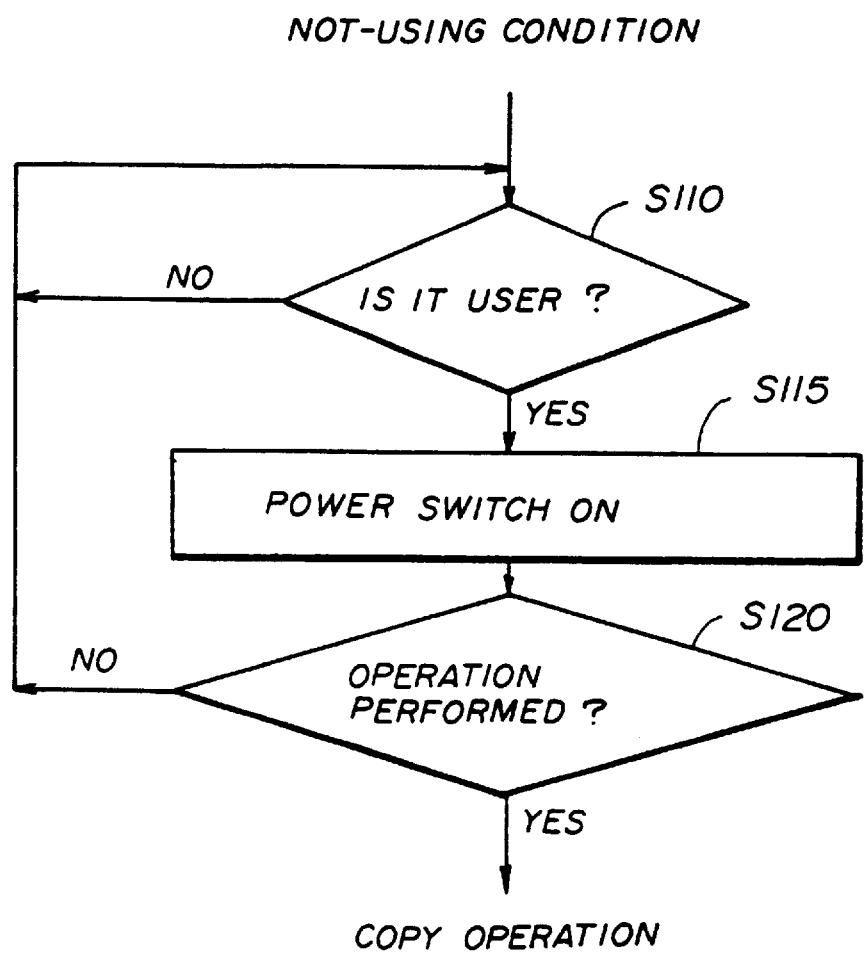
FIG. 32 illustrates an operation flow for the operation in which it is determined whether or not a detected approaching object is approaching so as to use the apparatus.

FIG. 32 shows an operation flow according to which the recognition/determination unit 3 determines whether or not an approaching motion detected for the person means to use the apparatus 5. First, the display unit of the apparatus 5 is in the un-displayable state or in the pre-heating state or in the power-OFF state while the apparatus 5 is in the not-used state. In S110 the recognition/determination unit 3 determines whether or not the detected person is to be a user. In this determination, the result is to be YES if a centripetal (using the OA equipment as the center) speed Vx (Vx=V cos θ) is equal to or more than a reference speed Vref when the object enters the area B. If the speed Vx is less than the reference speed, then, the result is to be YES when the object enters the area A; otherwise the result is to be NO. In this example the determination is to be executed in two stages as mentioned above. However such stages for the determination may comprise more than two stages. If the result is NO, the step 110 is repeated. If the result is YES, then the display unit is changed to the displayable state, the pre-heating state is canceled, or power is switched ON in S115.

In S120, it is determined whether or not any operation is performed by the user on the apparatus 5. If the result is NO, a learning function is used so as to improve the recognition accuracy. Then power is switched OFF and then the S110 is initiated. If the result is YES, then the apparatus 5 enters into the normal duplication (to take a photo-copy) operation mode.

Figure 33:
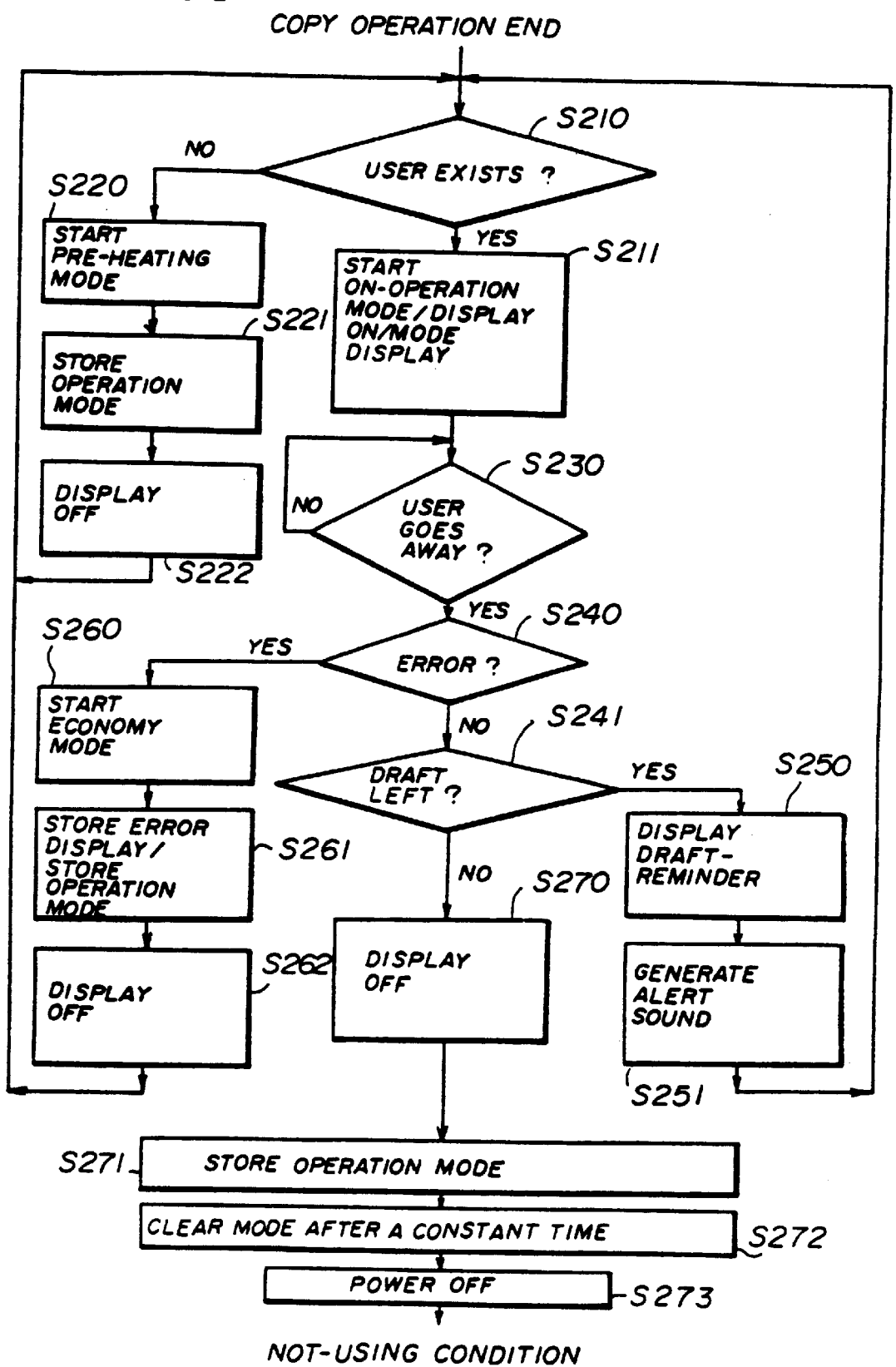
FIG. 33 shows an operation flow for operation after the duplicating operation has finished.

FIG. 33 shows an operation flow according to which determination is executed after finishing the duplicating (taking photo-copy) operation. First in S210 it is determined whether or not the operator or user still exists there. If the result is NO, the pre-heating mode is initiated in S220. Simultaneously, contents of the current set operation mode are temporarily stored in a memory in S221. The contents of the current set operation mode comprise, for example, information as to how the duplication is executed. Then, display on the display unit (for displaying, for example, the information of the current set operation mode) is canceled in S222. Then S210 is repeated, until an operator (user) comes. If an operator (user) comes, the result of S210 becomes YES. Then, the fixing unit assumes into the main-heating temperature (active-heating temperature rather than the pre-heating temperature) in S211. Simultaneously, the temporarily stored contents of the operation mode are then displayed on the display unit in S211.

In S230 it is determined whether or not the operator recedes. If the result is NO, S230 is repeated. During this repeating, the image forming apparatus 5 executes other photo-copy-duplication operations if the operator specifies to do so. If the result of S230 is YES, then it is determined why the operator recedes in S240. If the reason is due to an error (for example, paper running short, or paper jamming in draft-paper feeding) occurring, then the result of S240 is YES. Then, a below described economy mode is initiated in S260. Then a corresponding error message, for example, paper has run out is stored in a display memory in S261. Simultaneously the contents of the current set operation mode are also stored in a memory in S261. Then, in S262, the display is canceled or power is switched off in the display unit in S262 and then S210 is initiated. Then, after an operator comes, the error message paper has run short is displayed on the display unit. By such an error message display another operator can be appropriately alerted.

There may be another case in S250 (determined in S241) where the current operator recedes while he or she forgets the draft paper used to take a photocopy therefrom, or forgets the resulting photocopy on the image forming apparatus 5. In such a case, an appropriate alert message such as alerting draft-paper reminder alert, or photocopy reminder alert, is displayed in S250. Simultaneously an alert sound is generated in S251. Then S210 is initiated if an operator comes. Then, while the above-mentioned steps are appropriately executed, an operation performed by the operator on the image forming apparatus finishes normally (if there is no error in the apparatus or no paper forgetting mistake) finished. If so, the result of S241 becomes NO. Then, in S270, the current display on the display unit is canceled or power is switched off therein, while the contents of the current set operation mode are temporarily stored in a memory In S271 for a case where an operator or user will come soon. Then the temporarily stored contents are canceled, in S272, after a predetermined time period elapses and then power is switched off in the image forming apparatus 5 in S273. This condition is a not-using condition; S110 in FIG. 32 is then initiated.

Thus consolidation of information obtained through the human-being detection unit enables saving power consumption without degrading an efficiency and convenience in using the image forming apparatus 5.

Further consolidation of information obtained through the human-being detection unit provides automatic specified-mode clearing (specified-mode is automatically canceled and then the default [initial preset] mode is reset) executed when the apparatus thus determines that the operator has finished the using. As a result erroneous operation is prevented, which erroneous operation is such as, for example, another operator coming and he or she driving the apparatus while he or she believes the operation mode should be in the default mode even though the preceding specified mode still remains there.

Further the image forming apparatus or recognition/determination unit according to the present invention can flexibly deal with a condition where circumstances thereof as mentioned above, may vary after the image forming apparatus has initially been set. Such a dealing with is executed through a method such as mentioned above.

Figure 34:
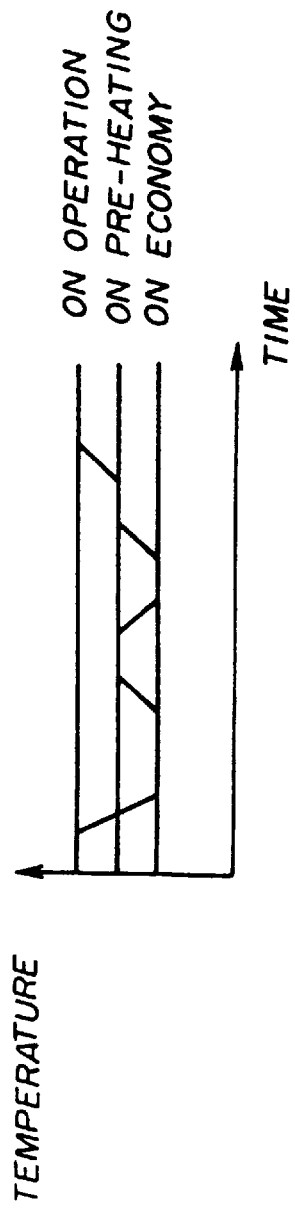
FIG. 34 illustrates an example of temperature control associated with a fixing unit according to the present inventions.

FIG. 34 shows one example of temperature variation due to temperature control for the fixing unit in the image forming apparatus according to the present invention. The set temperatures may normally comprise two stages thereof: a pre-heating temperature and a main heating temperature (or active heating temperature). The pre-heating temperature (shown as on operation in FIG. 34) is not sufficiently high for an actual fixing operation such as mentioned above in the fixing unit of the photocopier or in a duplicating process such as used in a duplicator. The active heating temperature (shown as pre-heating in FIG. 34) enables the fixing operation. However another third set temperature which is further lower than the pre-heating temperature is provided in the present invention. An operation mode in the image forming apparatus 5 in which mode the fixing unit is to be in the third set temperature (show as on economy in FIG. 34) is referred to as an economy mode.

Figure 35:
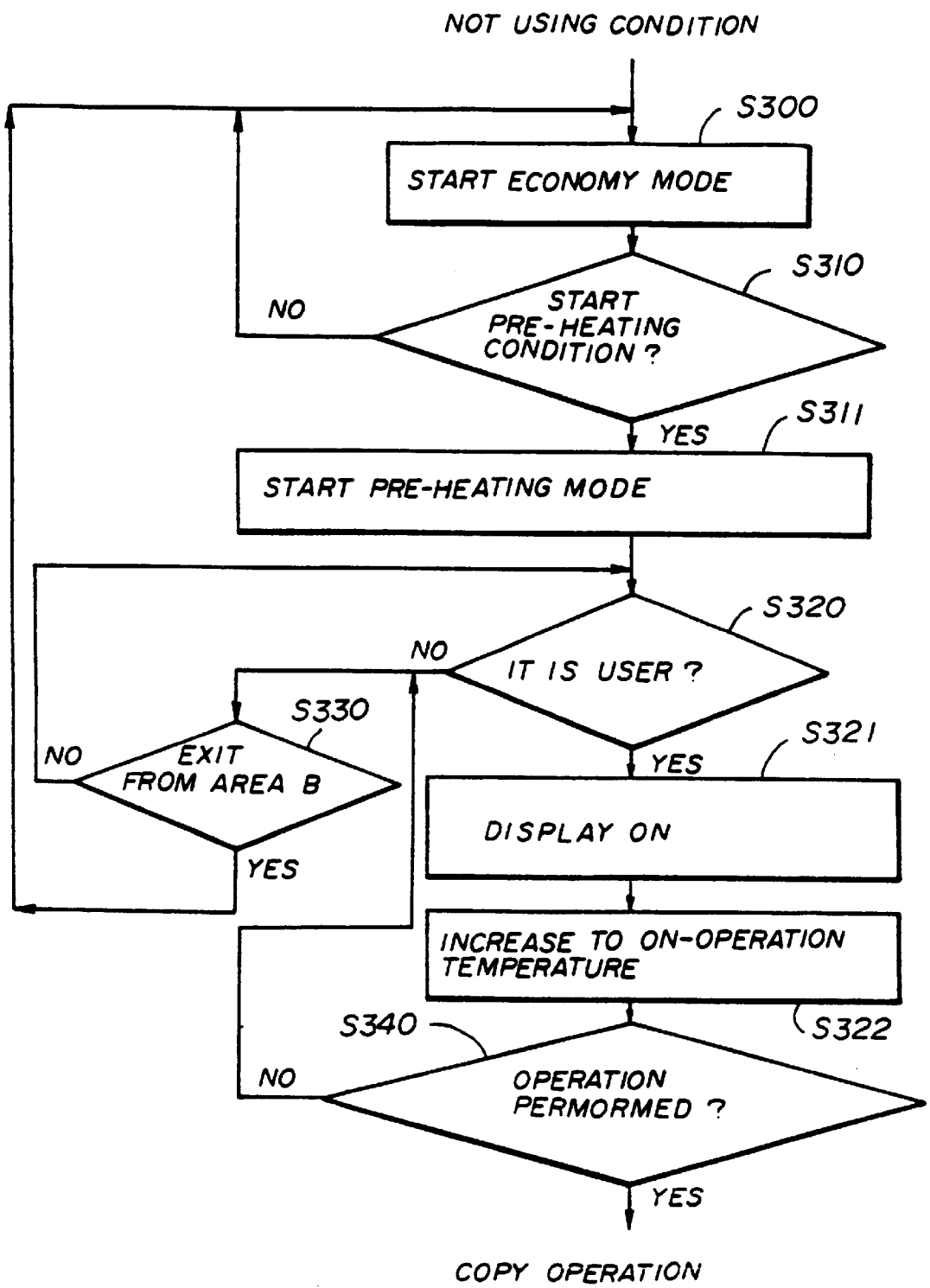
FIG. 35 shows an operation flow in which the temperature control shown in FIG. 34 is used.

FIG. 35 shows an operation flow according to which determination is executed in the above-mentioned economy mode. In a not-using condition an operation mode of the image forming apparatus 5 is set as the economy mode in S300. At this time no contents are displayed on the display unit.

In S310 it is determined whether or not the operation condition of the apparatus is to be a pre-heating condition where the fixing unit is in the pre-heating temperature. The pre-heating temperature is such as that transference from the pre-heating temperature to the active heating temperature can be rapidly realized.

The result of S310 is YES if a centripetal speed Vx of the moving object such as mentioned above, when the object enters the area B of FIG. 31, is equal to or more than a reference speed Vref such as mentioned above. If the centripetal speed Vx is less than the reference speed Vref, the result of S310 becomes YES when the object enters the area A. The result of S310 is NO otherwise. If the result is NO, S310 is repeated and the pre-heating mode is initiated in S311 if the result there is YES.

In S320 it is determined whether or not the detected moving object is a user. This determination is based on a result of recognition/determination using the human-being detecting unit. If the result is NO, it is then determined in S330 whether or not the moving object or moving object recedes from the area B. The result of S330 is NO, then S320 is again initiated. If the result of S320 is YES, then power is switched on in the display unit in S321. Then the fixing unit switches to the active heating temperature in S322.

In S340 it is determined whether or not any operation is performed by the operator on the image forming apparatus. If the result is NO, then S330 is initiated; and if the result is YES, then the image forming apparatus enters into a normal photocopy duplication operation mode.

Figure 36:
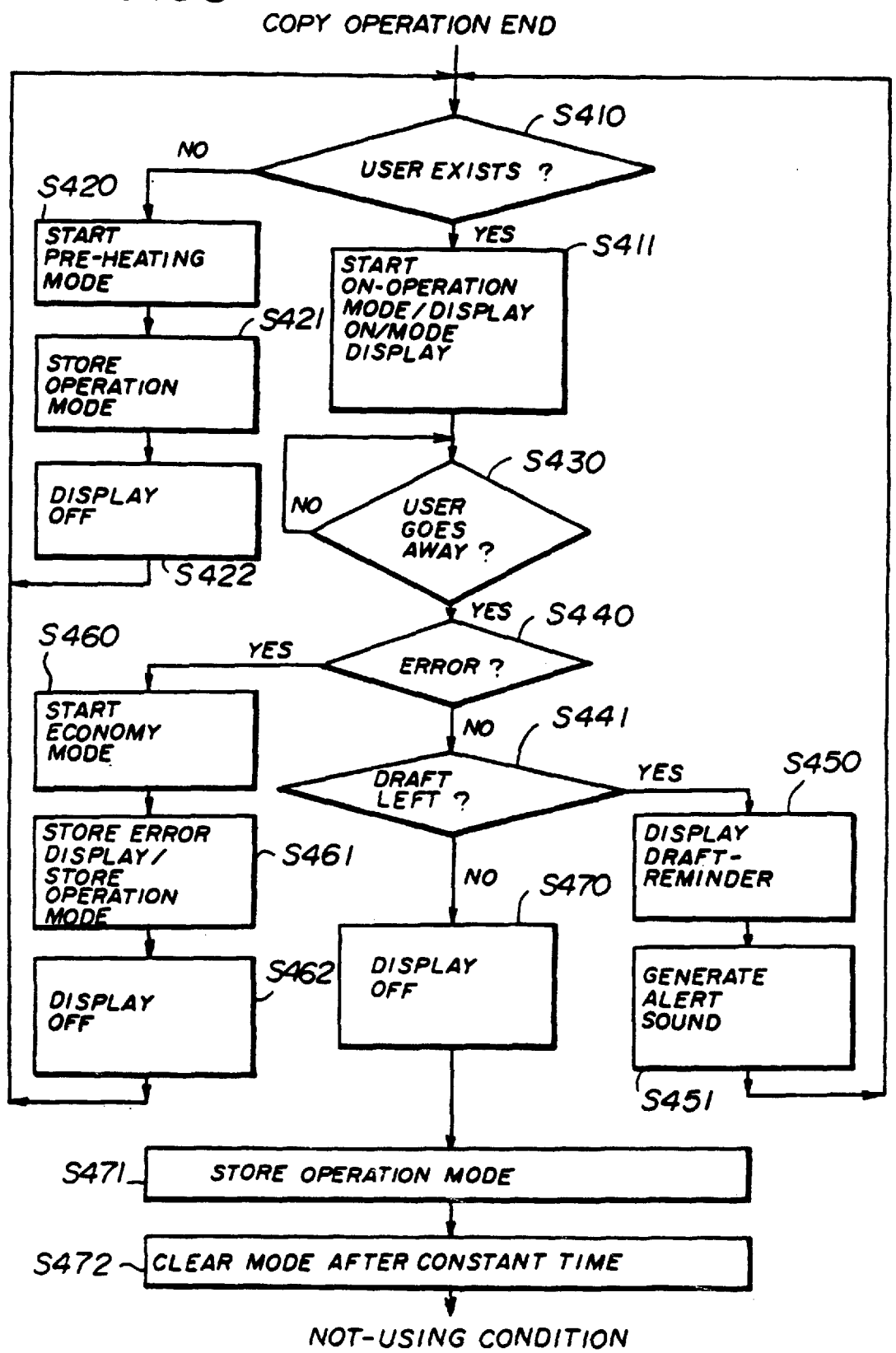
FIG. 36 shows an operation flow for operation after the duplicating operation has finished.

FIG. 36 shows an operation flow according to which determination is executed after finishing the duplicating (taking photo-copy) operation. First in S410 it is determined whether or not the operator or user is still present there. If the result is NO, the pre-heating mode is initiated in S420. Simultaneously contents of the current set operation mode are temporarily stored in a memory in S421. The contents of the current set operation mode comprise, for example, information as to how the duplication is executed. Then, display on the display unit (for displaying, for example, the information of the current set operation mode) is canceled in S422. Then S410 is repeated until an operator comes. If an operator comes, the result of S410 becomes YES. Then, the fixing unit switches to the main-heating temperature (active-heating temperature rather than the pre-heating temperature) in S411. Simultaneously the temporarily stored contents of the operation mode are then displayed on the display unit in S411.

In S430 it is determined whether or not the operator recedes. If the result is NO, S430 is repeated. During this repeating, the image forming apparatus 5 executes other photo-copy-duplication operations if the operator specifies to do so. If the result of S430 is YES, then it is determined why the operator recedes in S440. If the reason is due to an error (for example, paper running out, or paper jamming in the draft-paper feeding) occurring, then the result of S440 is YES. Then, the economy mode is initiated in S460. Then a corresponding error message, for example, paper has run out is stored in a display memory in S461. Simultaneously the contents of the current set operation mode are also stored in a memory in S461. Then, in S462, the display is canceled or power is switched off in the display unit and then S210 is initiated. Then after an operator comes, the error message paper has run out is displayed on the display unit. By such an error message display another operator can be appropriately alerted.

There may be another case in S450 (determined in S441) where the current operator recedes while forgetting the draft paper used to take a photocopy from, or while forgetting the resulting photocopy, on the image forming apparatus 5. In such a case, an appropriate alert message such as draft-paper reminder alert, or hardcopy reminder alert, is displayed in S450. Simultaneously an alert sound is generated in S451. Then S410 is initiated if an operator comes. Then, while the above-mentioned steps are appropriately executed, an operation performed by the operator on the image forming apparatus may have finished normally (if no error occurs in the apparatus and if there is no paper leaving mistake). If so, the result of S441 becomes NO. Then, in S470, the current display on the display unit is canceled or power is switched off in the apparatus while the contents of the current set operation mode are temporarily stored in a memory, in S471, for a case where an operator comes soon. Then the temporarily stored contents are canceled after a predetermined time period elapses in S472.

This condition is a not-using condition and thus S310 in FIG. 35 is initiated so as to enter into the economy mode.

Thus consolidation of information obtained through the human-being detection unit enables appropriate switching to the economy mode so as to save power consumption without degrading efficiency and convenience in using the image forming apparatus 5.

Further consolidation of information obtained through the human-being detection unit provides automatic specified-mode clearing (specified-mode is automatically canceled and then the default [initial preset] mode is reset) executed when the apparatus thus determines that the operator has finished the using. As a result erroneous operation is prevented, which erroneous operation is such as, for example, another operator coming and driving the apparatus while he or she believes the operation mode should be in the default mode even though the preceding specified mode still remains there.

Further such consolidation of information obtained through the human-being detection unit may prevent a draft paper or taken hardcopy from being forgotten or left on the image forming apparatus after the operator has finished the using.

Further the image forming apparatus or recognition/determination unit according to the present invention can flexibly deal with a condition where circumstances thereof, may vary after the image forming apparatus has initially been set. Such a dealing with is executed through a method such as mentioned above.

Further, the present invention is not limited to the above described embodiments, and variations and modifications may be made without departing from the scope of the present invention.

What is claimed is:

1. A determination unit, used in a functional apparatus, for determining whether or not an external object will use said functional apparatus, said determining unit comprising:

detecting means for detecting a number of positions of said external object over a time;

determining means for interpolating said detected positions for generating interpolated movements with respect to said functional apparatus, and determining based on said interpolated movements whether or not said external object will approach said functional apparatus so as to commence use of said functional apparatus and whether or not said external object will depart said functional apparatus so as to end the use of said functional apparatus; and service providing means for providing a service which is appropriate based on the determination performed by said determining means, said functional apparatus having a input/display unit for inputting to said functional apparatus specifications concerning usage of said functional apparatus, by an external object wherein said input/display unit is also for displaying information associated with said functional apparatus, in response to said determining means determining that an external object will use said functional unit, said service providing means then changing, prior to said external object reaching said functional apparatus, a condition of said input/display unit from a no-input condition to an input condition, wherein the external object can input specifications concerning usage of said functional apparatus through said input/display unit in said input condition whereas the external object cannot input specifications concerning usage of said functional apparatus through said input/display unit in said no-input condition.

2. A determination unit, used in a functional apparatus, for determining whether or not an external object will use said functional apparatus, said determining unit comprising:

detecting means for detecting a number of positions of said external object over a time;

determining means for interpolating said detected positions for generating interpolated movements with respect to said functional apparatus, and determining based on said interpolated movements whether or not said external object will approach said functional apparatus so as to commence use of said functional apparatus and whether or not said external object will depart said functional apparatus so as to end the use of said functional apparatus; and service providing means for providing a service which is appropriate based on the determination performed by said determining means, said functional apparatus having an input/display unit for inputting to said functional unit specifications concerning usage of said functional apparatus, by an external object wherein said input/display unit is also for displaying information associated with said functional apparatus, in response to said determining means determining that an external object has finished using said functional unit, said service providing means then changing a condition of said input/display unit from an input condition to a no-input condition, wherein the external object can input specifications concerning usage of said functional apparatus through said input/display unit in said input condition whereas the external object cannot input specifications concerning usage of said functional apparatus through said input/display unit in said no-input condition.

3. A determination unit, used in a functional apparatus, for determining whether or not an external object will use said functional apparatus, said determining unit comprising:

detecting means for detecting a number of positions of said external object over a time;

determining means for interpolating said detected positions for generating interpolated movements with respect to said functional apparatus, and determining based on said interpolated movements whether or not said external object will approach said functional apparatus so as to commence use of said functional apparatus and whether or not said external object will depart said functional apparatus so as to end the use of said functional apparatus; and service providing means for providing a service which is appropriate based on the determination performed by said determining means, said functional apparatus, including said image forming apparatus, having a fixing unit for fixing an objective image on a recording sheet, said objective image having been previously represented thereon in response to said determining means determining that an external object will use said functional unit, then said service providing means changing, prior to said external object reaching said functional apparatus, a condition of said fixing unit from a non-fixing condition to a fixing condition, wherein said functional apparatus fixes an objective image on a recording sheet through said fixing unit in said fixing condition whereas said functional apparatus is disabled to fix an objective image on a recording sheet through said fixing unit in said non-fixing condition.

4. The image forming apparatus according to claim 3, wherein:

said fixing unit fixes an objective image on a recording sheet by means of heat; and a temperature of said fixing unit is in a first temperature in said non-fixing condition whereas the temperature of said fixing unit is at a second temperature in said fixing condition, wherein said second temperature is higher than said first temperature.

5. A determination unit, used in a functional apparatus, for determining whether or not an external object will use said functional apparatus, said determining unit comprising:

detecting means for detecting a number of positions of said external object over a time;

determining means for interpolating said detected positions for generating interpolated movements with respect to said functional apparatus, and determining based on said interpolated movements whether or not said external object will approach said functional apparatus so as to commence use of said functional apparatus and whether or not said external object will depart said functional apparatus so as to end the use of said functional apparatus; and service providing means for providing a service which is appropriate based on the determination performed by said determining means, said functional apparatus, including said image forming apparatus, having a fixing unit for fixing an objective image on a recording sheet, said objective image having been previously represented thereon in response to said determining means determining that an external object has finished using said functional unit, said service providing means then changing a condition of said fixing unit from a fixing condition to a non-fixing condition, wherein said functional apparatus fixes an objective image on a recording sheet through said fixing unit in said fixing condition whereas said functional apparatus is disabled to fix an objective image on a recording sheet through said fixing unit in said non-fixing condition.

6. The image forming apparatus according to claim 5, wherein:

said fixing unit fixes an objective image on a recording sheet by means of heat; and the temperature of said fixing unit is at a first temperature in said non-fixing condition whereas the temperature of said fixing unit is in a second temperature in said fixing condition, wherein said second temperature is higher than said first temperature.

7. A determination unit, used in a functional apparatus, for determining whether or not an external object will use said functional apparatus, said determining unit comprising:

detecting means for detecting a number of positions of said external object over a time;

determining means for interpolating said detected positions for generating interpolated movements with respect to said functional apparatus, and determining based on said interpolated movements whether or not said external object will approach said functional apparatus so as to commence use of said functional apparatus and whether or not said external object will depart said functional apparatus so as to end the use of said functional apparatus; and service providing means for providing a service which is appropriate based on the determination performed by said determining means, said determining means determining that an external object will use said functional unit, said service providing means then changing, prior to said external object reaching said functional apparatus, a condition of said functional apparatus from a non-operation condition to an operation condition.

8. The determination unit according to claim 7, wherein said functional apparatus is in an on-operation mode and a display unit of said functional apparatus is on in said operation condition whereas said functional apparatus is in an economy mode and said display unit is off in said non-operation condition.

9. A determination unit, used in a functional apparatus, for determining whether or not an external object will use said functional apparatus, said determining unit comprising:

detecting means for detecting a number of positions of said external object over a time;

determining means for interpolating said detected positions for generating interpolated movements with respect to said functional apparatus, and determining based on said interpolated movements whether or not said external object will approach said functional apparatus so as to commence use of said functional apparatus and whether or not said external object will depart said functional apparatus so as to end the use of said functional apparatus; and service providing means for providing a service which is appropriate based on the determination performed by said determining means, in response to said determining means determining that an external object has completed using said functional unit, then said service providing means changing a condition of said functional apparatus from an operation condition to a non-operation condition.

10. The determination unit according to claim 9, wherein said functional apparatus is in an on-operation mode and a display unit of said functional apparatus is on in said operation condition whereas said functional apparatus is in an economy mode and said display unit is off in said non-operation condition.

11. A determination unit, used in a functional apparatus, for determining whether or not an external object will use said functional apparatus, said determining unit comprising:

detecting means for detecting a number of positions of said external object over a time;

determining means for interpolating said detected positions for generating interpolated movements with respect to said functional apparatus, and determining based on said interpolated movements whether or not said external object will approach said functional apparatus so as to commence use of said functional apparatus and whether or not said external object will depart said functional apparatus so as to end the use of said functional apparatus; and service providing means for providing a service which is appropriate based on the determination performed by said determining means, said functional apparatus having an image reading unit for reading an objective image represented on a draft, said draft to be read being put on in a reading portion provided for said image reading unit, said functional apparatus further having a left-draft detecting unit for detecting a draft left on said reading portion of said image reading unit; and said service providing means alerting an external object when said determining means determines that said external object has completed using said functional unit and further determines that said left-draft detecting unit detects a draft left on said reading portion of said image reading unit.

12. A determination unit, used in a functional apparatus, for determining whether or not an external object will use said functional apparatus, said determining unit comprising:

detecting means for detecting a number of positions of said external object over a time;

determining means for interpolating said detected positions for generating interpolated movements with respect to said functional apparatus, and determining based on said interpolated movements whether or not said external object will approach said functional apparatus so as to commence use of said functional apparatus and whether or not said external object will depart said functional apparatus so as to end the use of said functional apparatus; and service providing means for providing a service which is appropriate based on the determination performed by said determining means, said functional apparatus having an image recording unit for recording an objective image on a recording sheet, wherein a recording sheet, that is, a recording sheet having an objective image recorded thereon is then put on a sheet receiving portion also provided for said functional apparatus, said functional apparatus further having a left-recorded-sheet detecting unit for detecting the recorded sheet left on said sheet receiving portion, said service providing means alerting an external object when said determining means determines that said external object has finished using said functional unit and further determines that said left-recorded-sheet detecting unit detects the recorded sheet left on said sheet receiving portion.

13. A determination unit, used in a functional apparatus, for determining whether or not an external object will use said functional apparatus, said determining unit comprising:

detecting means for detecting a number of positions of said external object over a time;

determining means for interpolating said detected positions for generating interpolated movements with respect to said functional apparatus, and determining based on said interpolated movements whether or not said external object will approach said functional apparatus so as to commence use of said functional apparatus and whether or not said external object will depart said functional apparatus so as to end the use of said functional apparatus; and service providing means for providing a service which is appropriate based on the determination performed by said determining means, said functional apparatus having an input unit for inputting to said functional unit specifications concerning usage, by an external object, of said functional apparatus, wherein said input unit has a predetermined initial specifications concerning usage of said functional apparatus, which specifications are preset therein before an external object inputs other specifications concerning usage of said functional apparatus so as to thereby update said predetermined initial specification, in response to said determining means determining that an external object has finished using said functional unit, said service providing means then resetting said predetermined initial specifications concerning usage of said functional apparatus in said input unit.

* * * * *